US00RE48574E

(19) United States
(12) Reissued Patent
Seem et al.

(10) Patent Number: US RE48,574 E
(45) Date of Reissued Patent: Jun. 1, 2021

(54) SYSTEMS AND METHODS FOR ESTIMATING A RETURN TIME

(71) Applicant: Johnson Controls Technology Company, Auburn Hills, MI (US)

(72) Inventors: John E. Seem, Glendale, WI (US); John M. House, St. Leonard (CA)

(73) Assignee: Johnson Controls Technology Company, Auburn Hills, MI (US)

(21) Appl. No.: 16/548,552

(22) Filed: Aug. 22, 2019

Related U.S. Patent Documents

Reissue of:
(64) Patent No.: 9,739,496
Issued: Aug. 22, 2017
Appl. No.: 14/107,978
Filed: Dec. 16, 2013

(51) Int. Cl.

| | |
|---|---|
| ***F24F 11/00*** | (2018.01) |
| ***G06N 99/00*** | (2019.01) |
| ***F24F 11/30*** | (2018.01) |
| *F24F 120/10* | (2018.01) |
| *F24F 11/61* | (2018.01) |
| *G06N 20/00* | (2019.01) |

(52) U.S. Cl.
CPC ..... *F24F 11/30* (2018.01); *F24F 11/61* (2018.01); *F24F 2120/10* (2018.01); *G06N 20/00* (2019.01)

(58) Field of Classification Search
CPC ..... F24F 11/30; F24F 11/61; F24F 2120/10; G06N 20/00
USPC ..... 700/276
See application file for complete search history.

(56) References Cited

U.S. PATENT DOCUMENTS

| | | | | |
|---|---|---|---|---|
| 4,522,336 | A | 6/1985 | Culp | |
| 4,660,759 | A | 4/1987 | Barnard et al. | |
| 4,897,798 | A * | 1/1990 | Cler | F24F 11/0009 165/239 |
| 5,025,984 | A | 6/1991 | Bird et al. | |
| 5,219,119 | A | 6/1993 | Kasper et al. | |
| 5,270,952 | A | 12/1993 | Adams et al. | |
| 5,402,333 | A * | 3/1995 | Cardner | G05B 13/042 700/31 |
| 6,594,554 | B1 * | 7/2003 | Seem | F24F 11/006 62/181 |
| 7,099,748 | B2 | 8/2006 | Rayburn | |
| 2005/0267606 | A1 * | 12/2005 | Bartlett, Jr. | G05D 23/1931 700/29 |

(Continued)

OTHER PUBLICATIONS

Yang, et al., "Application of Artificial Neural Network to Predict the Optimal Start Time for Heating System in Building", Oct. 1, 2003, Energy Conversion and Management, vol. 44, Issue 17. (Year: 2003).*

(Continued)

*Primary Examiner* — B. James Peikari
(74) *Attorney, Agent, or Firm* — Foley & Lardner LLP

(57) ABSTRACT

Systems and methods for estimating a time to cool down or warm up a building zone from a temperature setback condition are provided. A described method includes determining, by a controller for the building zone, at least one of a cooling demand for the building zone and a heating demand for the building zone for a time period corresponding to the temperature setback condition. The method further includes estimating a return time using at least one of the cooling demand and the heating demand. The return time is the time to cool down or warm up the building zone from the temperature setback condition.

40 Claims, 14 Drawing Sheets

(56) References Cited

U.S. PATENT DOCUMENTS

| | | | | |
|---|---|---|---|---|
| 2008/0099570 | A1* | 5/2008 | Krebs | F23N 5/203 236/46 R |
| 2012/0305661 | A1* | 12/2012 | Malchiondo | F24F 11/30 236/44 A |

OTHER PUBLICATIONS

Alcalá, et al., "A Genetic Rule Weighting and Selection Process for Fuzzy Control of Heating, Ventilating and Air Conditioning Systems", Apr. 2005, Engineering Applications of Artificial Intelligence vol. 18, Issue 3, pp. 279-296. (Year: 2005).*

Moon, et al., "Application of Ann (Artificial-Neural-Network) in Residential Thermal Control", 2009, International Building Performance Simulation Association, Eleventh International IBPSA Conference, Glasgow, Scotland, Jul. 27-30. (Year: 2009).*

Tony Fadell, The Next Generation Nest Thermostat, Oct. 2, 2012, pp. 8 (Year: 2012).

U.S. Notice of Allowance on U.S. Appl. No. 14/107,978 dated Apr. 4, 2017. 9 pages.

U.S. Notice of Allowance on U.S. Appl. No. 14/107,978 dated Jul. 19, 2017. 2 pages.

U.S. Office Action on U.S. Appl. No. 14/107,978 dated Sep. 23, 2016. 26 pages.

Saiita, S. Standardization vs. normalization [online], Jul. 10, 2007 [retrieved Sep. 12, 2016], Retrieved from the internet <URL: http://www.dataminingblog.com/standardization-vs-normalization->.*

* cited by examiner

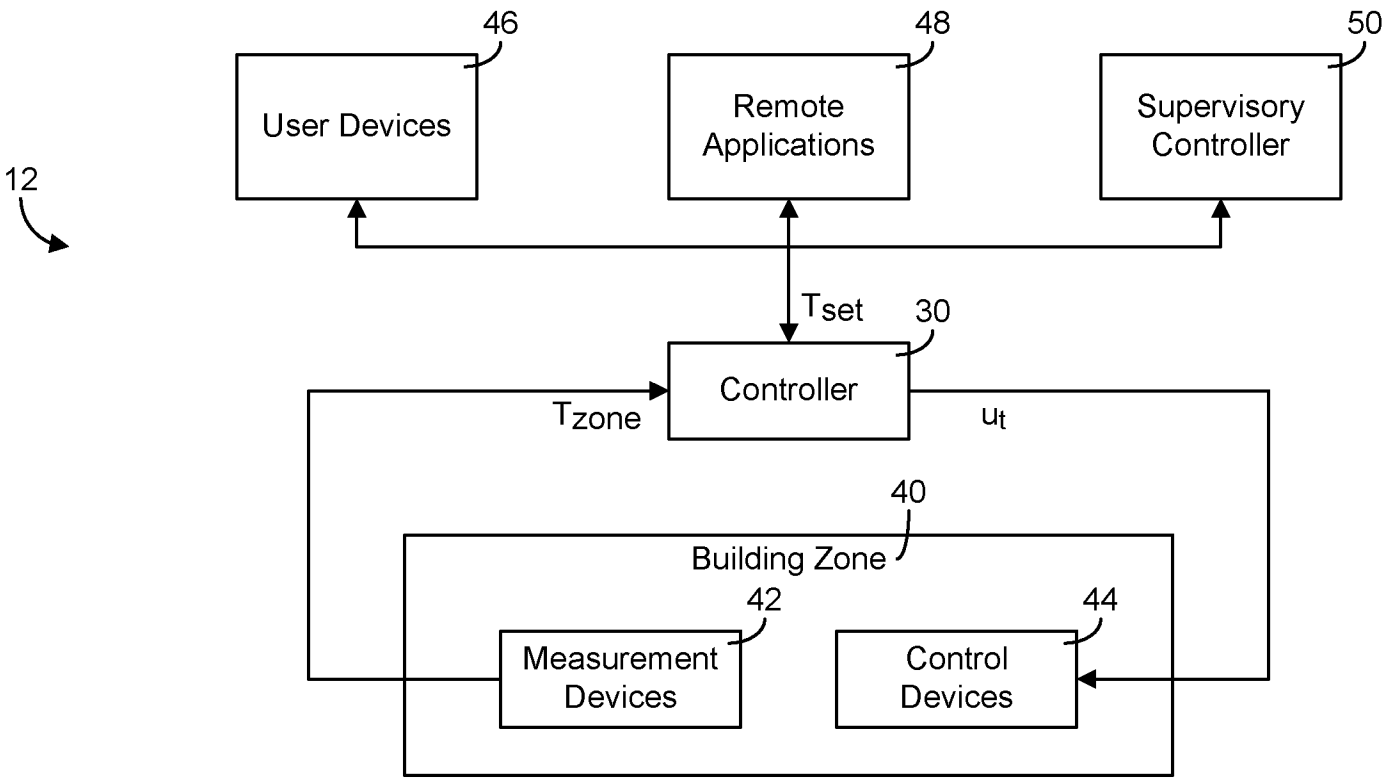
FIG. 2
(Amended)

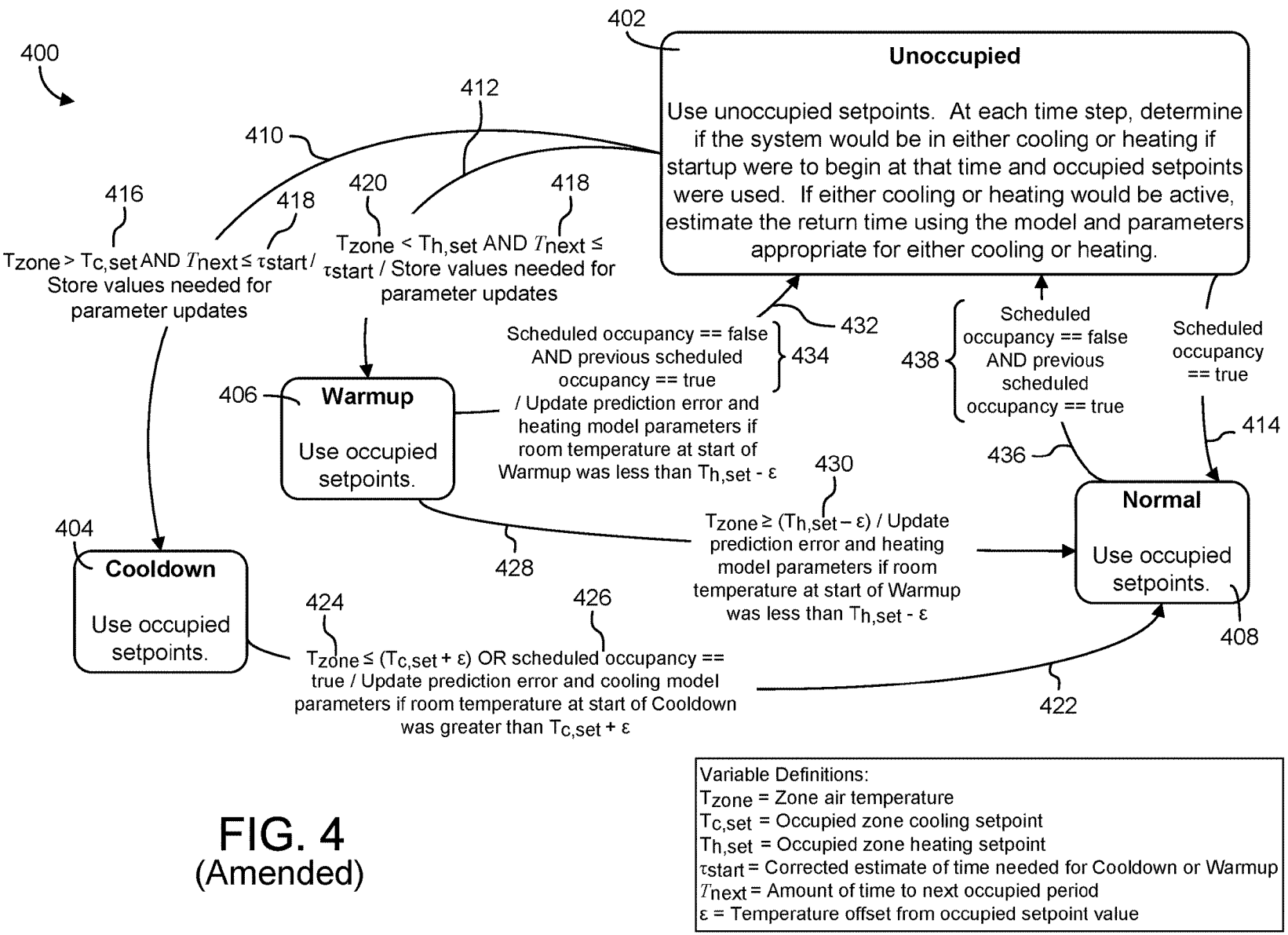
FIG. 4
(Amended)

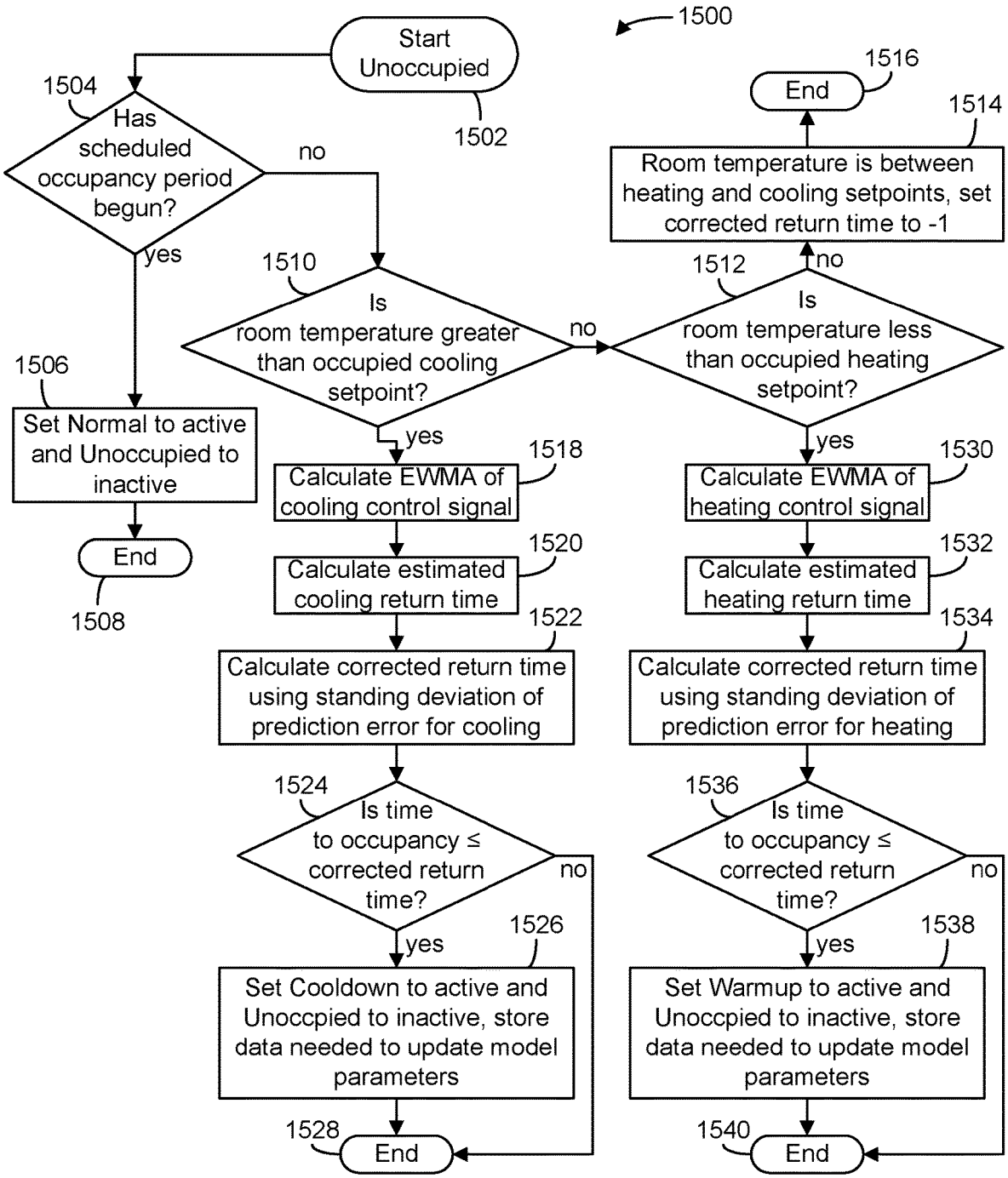
FIG. 15
(Amended)

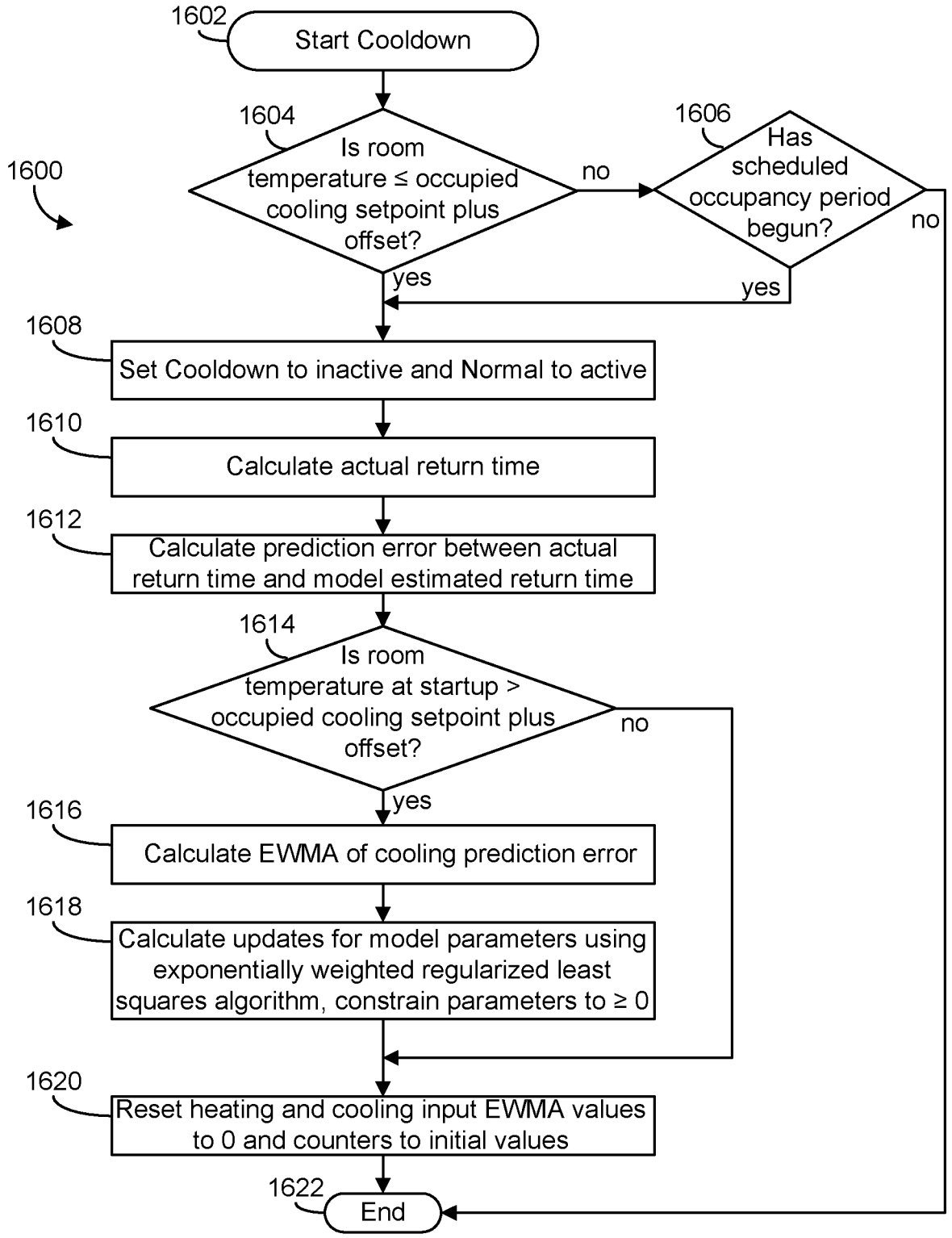
FIG. 16
(Amended)

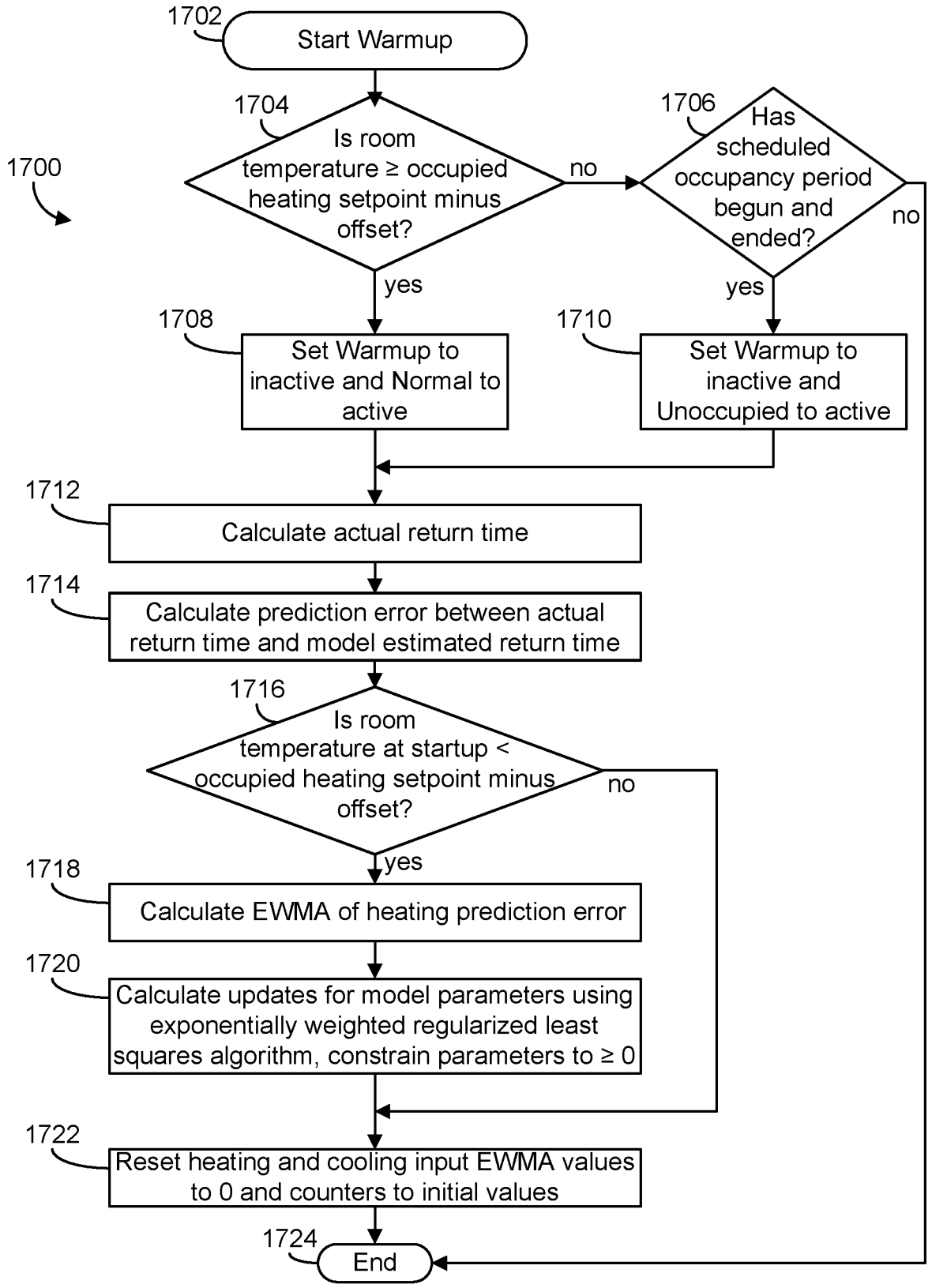
FIG. 17
(Amended)

SYSTEMS AND METHODS FOR ESTIMATING A RETURN TIME

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*CROSS-REFERENCE TO RELATED APPLICATION*

*This application is an application for reissue of U.S. Pat. No. 9,739,496, filed Dec. 16, 2013, the entire disclosure of which is incorporated by reference herein.*

FIELD

The present disclosure relates generally to the field of heating, ventilation, and air conditioning (HVAC) systems. The present disclosure relates more particularly to systems and methods for estimating a time required for a HVAC system to cool down or warm up a building or building zone from an unoccupied setback condition.

BACKGROUND

HVAC control systems are used to monitor and control temperature, humidity, air flow, air quality, and other conditions within a building or building system. Some HVAC control systems use an unoccupied setback strategy to reduce energy consumption. Unoccupied setback generally involves increasing a cooling setpoint or decreasing a heating setpoint applied to a building zone for time periods during which the building zone is unoccupied (e.g., at night, over a weekend, etc.). However, to ensure occupant comfort, the zone temperature should be within a temperature range defined by occupied cooling and heating setpoints at the time of occupancy.

The time required for a HVAC system to cool down or warm up a zone from an unoccupied setback condition is referred to as the return time. An estimate of the return time allows a HVAC control system to determine when to begin heating or cooling such that the building zone temperature is within the occupied setpoint range by the time of occupancy. It is difficult and challenging to accurately estimate the return time.

SUMMARY

One implementation of the present disclosure is a method for estimating a time to cool down or warm up a building zone from a temperature setback condition. The method includes determining, by a controller for the building zone, at least one of a cooling demand for the building zone and a heating demand for the building zone for a time period corresponding to the temperature setback condition. The method further includes estimating a return time using at least one of the cooling demand and the heating demand, wherein the return time is the time to cool down or warm up the building zone from the temperature setback condition.

In some embodiments, the method further includes identifying a current temperature of the building zone and estimating the return time using the current temperature of the building zone and at least one of the cooling demand and the heating demand.

In some embodiments, the method further includes comparing the estimated return time with a difference between a current time and a time of next scheduled occupancy for the building zone. The method may further include transitioning from an unoccupied state into at least one of a cool down state and a warm up state in response to the estimated return time being greater than or equal to the difference between the current time and the time of next scheduled occupancy.

In some embodiments, determining at least one of the cooling demand and the heating demand includes identifying an output signal from a controller for the building zone for at least a portion of the time period corresponding to the temperature setback condition and filtering the controller output signal using a signal filter to determine at least one of the cooling demand and the heating demand. At least one of the cooling demand and the heating demand may be a function of the controller output signal.

In some embodiments, the signal filter is at least one of an analog filter, a digital filter, a low pass filter, a band pass filter, a smoothing filter, a time window filter, a normalizing filter, and an averaging filter. In some embodiments, the function of the controller output signal is at least one of: a last value of the controller output signal, an average of the controller output signal, a normalized value of the controller output signal, an integral of the controller output signal, and a transformation of the controller output signal.

In some embodiments, at least one of the cooling demand and the heating demand is an exponentially weighted moving average based on the controller output signal for at least a portion of the time period corresponding to the temperature setback condition.

In some embodiments, determining at least one of the cooling demand and the heating demand includes identifying an output signal from a controller for the building zone for at least a portion of the time period corresponding to the temperature setback condition, calculating a normalized controller output by comparing the output signal from the controller with a controller output that provides maximum cooling or maximum heating for the building zone, and determining an exponentially weighted moving average of the normalized controller output using the calculated normalized controller output and an exponentially weighted moving average of the normalized controller output for a previous sampling time.

In some embodiments, the return time is estimated using an empirical model having one or more model parameters learned from previous data. The estimated return time may be a function of the one or more learned model parameters. In some embodiments, the empirical model is at least one of a statistical model, a parametric model, a regression model, a neural network model, a state space model, and a fuzzy logic model. In some embodiments, the method further includes initializing values for the one or more model parameters to provide default parameters for the empirical model. At least one of the model parameters may be initialized to a non-zero value.

In some embodiments, the method further includes determining a return time prediction error. The return time prediction error may be a difference between the estimated return time and an actual return time. The method may further include estimating a deviation of the return time prediction error using a plurality of return time prediction errors and correcting the estimated return time by adding a function of the estimated deviation to the estimated return time.

In some embodiments, the method further includes determining a multiplier for the estimated deviation of the return time prediction error. The multiplier may be based on a probability of achieving an occupied setpoint temperature at a time of occupancy. The method may further include calculating the function of the estimated deviation of the return time prediction error by multiplying the estimated deviation of the return time prediction error by the determined multiplier.

In some embodiments, the method further includes receiving a user selection between a level of energy savings and a level of comfort for the building zone. The user selection may correspond to a probability of achieving an occupied setpoint temperature at a time of occupancy. The method may further include calculating a correction factor based on the user selection and adjusting the estimated return time by applying the correction factor to the estimated return time.

In some embodiments, the method further includes comparing a measured temperature of the building zone with an offset temperature setpoint. The offset temperature setpoint may be at least one of a heating setpoint minus a temperature offset and a cooling setpoint plus the temperature offset. The method may further include updating learned model parameters of an empirical model for estimating the return time in response to at least one of the measured temperature of the building zone being less than the heating setpoint minus the temperature offset, or the measured temperature of the building zone being greater than the cooling setpoint plus the temperature offset.

In some embodiments, updating the learned model parameters of the empirical model includes calculating updated model parameters using at least one of partial least squares regression, ridge regression, principal component regression, weighted least squares regression, ordinary least squares regression, least mean linear regression, and exponentially weighted regularized least squares regression.

In some embodiments, the method further includes determining whether an updated model parameter has a value that violates a constraint condition and setting the updated model parameter to a value that satisfies the constraint condition in response to a positive determination. The constraint condition may be based on physical realities of the empirical model.

Another implementations of the present disclosure is a method for adjusting an estimated time to cool down or warm up a building zone from a temperature setback condition. The method includes receiving a user selection between a level of energy savings and a level of comfort for the building zone, calculating a correction factor based on the user selection, and adjusting an estimated return time by applying the correction factor to the estimated return time. The return time is the time to cool down or warm up the building zone from the temperature setback condition.

In some embodiments, adjusting the estimated return time includes at least one of increasing the estimated return time in response to a user selection of a level of comfort for the building zone and decreasing the estimated return time in response to a user selection of a level of energy savings for the building zone.

In some embodiments, calculating a correction factor based on the user selection includes identifying a probability of achieving an occupied setpoint temperature at a time of occupancy, the probability corresponding to the user selection, and using the identified probability of achieving the occupied setpoint temperature at the time of occupancy to determine the correction factor.

Another implementation of the present disclosure is a system for estimating a time to cool down or warm up a building zone from a temperature setback condition. The system includes a controller configured to determine at least one of a cooling demand for the building zone and a heating demand for the building zone for a time period corresponding to the temperature setback condition. The controller is configured to estimate a return time using at least one of the cooling demand and the heating demand. In some embodiments, the controller also uses the temperature of the building zone to estimate the return time. The return time is the time to cool down or warm up the building zone from the temperature setback condition.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

BRIEF DESCRIPTION OF THE DRAWINGS

FIG. 2 is a schematic diagram of the HVAC system of FIG. 1, showing a controller receiving a temperature signal from temperature sensor of a building zone and providing a control signal to one or more control devices of the building zone, according to an exemplary embodiment.

FIG. 4 is a state transition diagram illustrating a normal operating state, an unoccupied operating state, a cool down operating state, and a warm up operating state as well as the conditions for transitioning between the various operating states, according to an exemplary embodiment.

FIG. 15 is a flowchart of a process for operating the controller of FIG. 3 in the unoccupied operating state, according to an exemplary embodiment.

FIG. 16 is a flowchart of a process for operating the controller of FIG. 3 in the cool down operating state, according to an exemplary embodiment.

FIG. 17 is a flowchart of a process for operating the controller of FIG. 3 in the warm up operating state, according to an exemplary embodiment.

DETAILED DESCRIPTION

Figure 1:
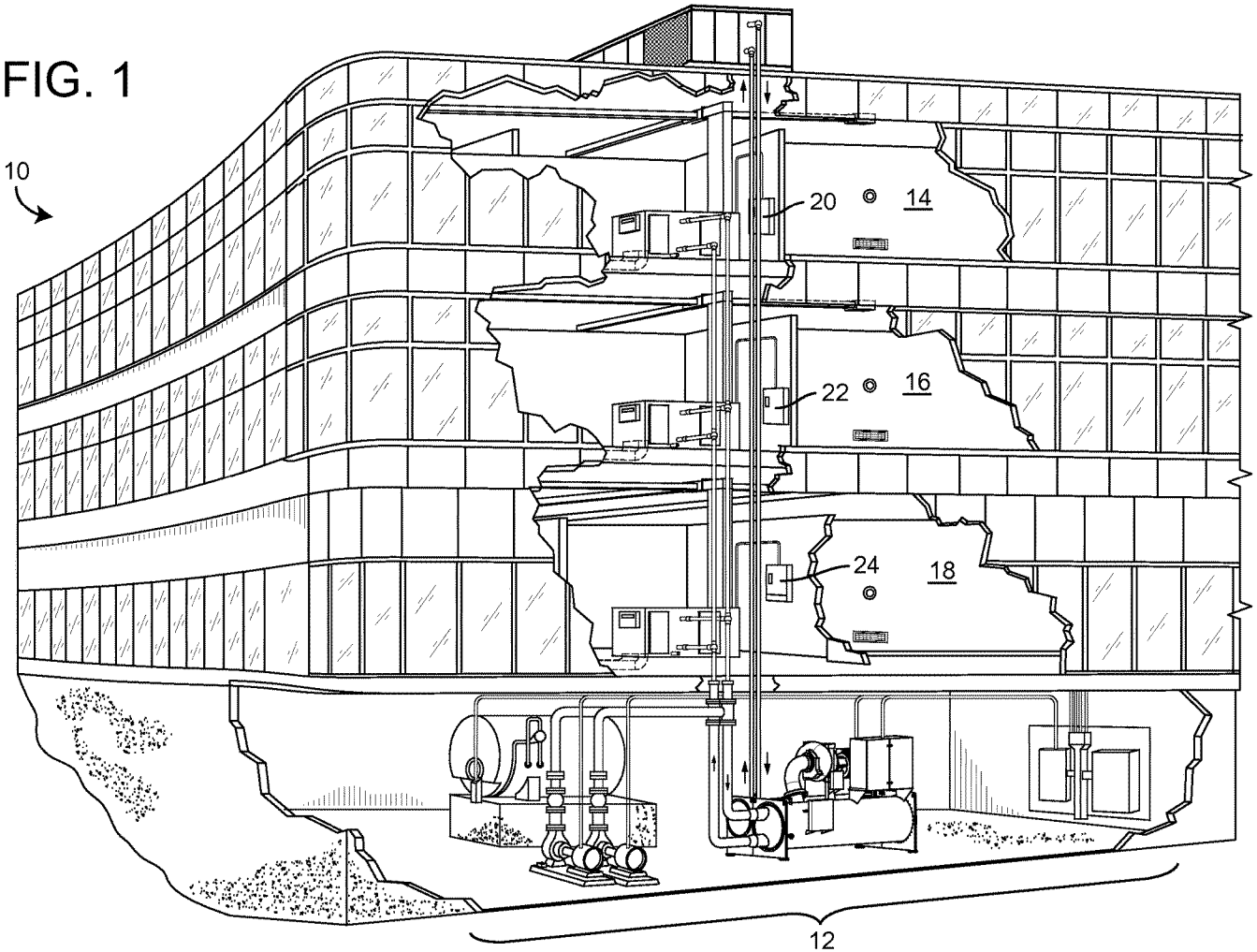
FIG. 1 is a perspective view of a building having multiple building zones and a HVAC system servicing the multiple building zones, according to an exemplary embodiment.

Before turning to the figures, which illustrate the exemplary embodiments in detail, it should be understood that the disclosure is not limited to the details or methodology set forth in the description or illustrated in the figures. It should also be understood that the terminology is for the purpose of description only and should not be regarded as limiting.

Referring generally to the FIGURES, systems and methods for estimating a return time are shown, according to various exemplary embodiments. The systems and methods described herein may be used to estimate the time required for a HVAC system to warm up or cool down a building or building zone from an unoccupied setback condition (i.e., the "return time"). Unoccupied setback generally involves increasing a cooling setpoint or decreasing a heating setpoint applied to a building zone for time periods during which the building zone is unoccupied (e.g., at night, over a weekend, etc.). However, to ensure occupant comfort, the zone temperature should be within a temperature range defined by occupied cooling and heating setpoints at the time of occupancy. The systems and methods described herein may be used to estimate the return time and to determine when to begin heating or cooling the building so that the temperature is within an occupied setpoint range at the time of occupancy.

Previous techniques for estimating the return time suffer from a variety of disadvantages. For example, many previous techniques rely on a measurement of the outside air temperature. Obtaining a measurement of the outside air temperature typically requires additional temperature sensors or data inputs to the HVAC control system and can be difficult to achieve in some implementations. Additionally, many previous techniques are computationally expensive (e.g., using non-linear optimization and/or a large number of variable parameters) or use fixed parameter values. Using fixed parameter values reduces adaptability and places a large burden on an installer/programmer to select appropriate parameter values.

Advantageously, the systems and methods of the present disclosure use a measured zone temperature and an exponentially weighted moving average (EWMA) of the zone heating or cooling demand to estimate the return time. The zone heating or cooling demand may be determined by monitoring an output from a controller for the building zone (e.g., a control signal provided to HVAC equipment). Both the zone temperature and the heating/cooling demand can be obtained from an existing thermostat or local controller for the building zone without relying on a measurement of the outside air temperature.

In some embodiments, the estimated return time is corrected (e.g., modified, adjusted, etc.) using a correction term based on the standard deviation of a return time prediction error. The return time prediction error may be calculated using an EWMA and/or an arithmetic mean of a history of differences between estimated return times and actual return times. The correction term may result in a more accurate estimate of the return time, thereby helping to ensure that the occupied heating or cooling setpoint is achieved at occupancy. In some embodiments, the correction term can be adjusted to provide various levels of assurance (e.g., 80% probability, 99% probability, etc.) that the setpoint temperature will be achieved at occupancy.

The systems and methods described herein may use one or more models for predicting the return time (e.g., a heating return time model, a cooling return time model, etc.). The models may have two parameters that depend on the dynamic characteristics of an individual building. Initial parameter values may be provided and a learning method may be used to adaptively adjust the initial parameters over time (e.g., in response to changes in the building, etc.). Adaptively adjusting the model parameters may allow the described systems and methods to be deployed and used in a wide variety of implementations without any additional configuration effort by an installer or field technician (e.g., without requiring the installer to determine or select appropriate parameter values).

Referring now to FIG. 1, a perspective view of a building 10 is shown, according to an exemplary embodiment. Building 10 may be a commercial building (e.g., an office building, a retail store, a shipping facility, etc.), a residential building (e.g., an apartment building, a single-family residence, etc.), an industrial building (e.g., a manufacturing facility, a warehouse, etc.), or any other type of building (e.g., a hospitality facility, a data center, a school, a government building, etc.).

Building 10 is shown to include a HVAC system 12. HVAC system 12 may include a cooling system, a heating system, a ventilation system, an air circulation system, or any combination thereof. HVAC system 12 may include one or more measurement devices (e.g., temperature sensors, pressure sensors, flow sensors, etc.), control devices (e.g., actuators, chillers, boilers, air handling units, variable air volume units, etc.), control units (e.g., a main control unit, an auxiliary control unit, a process controller, a supervisory controller, etc.), or other HVAC equipment/devices for monitoring and controlling any variable state or condition of building 10.

In some embodiments, HVAC system 12 is part of a comprehensive building management system (BMS). The BMS may include, for example, HVAC system 12, a security system, a lighting system, a fire alerting system, an elevator system, a water management system, a food storage system, a telephone system, or any combination thereof. In some embodiments, the BMS is a METASYS® brand building management system as sold by Johnson Controls, Inc. In other embodiments, HVAC system 12 is a standalone HVAC system configured to operate independently.

Still referring to FIG. 1, building 10 is shown to include a plurality of zones 14-18 corresponding to various areas within building 10. For example, zone 14 may include the top floor of building 10, zone 16 may include the middle floor of building 10, and zone 18 may include the bottom floor of building 10. In some embodiments, zones 14-18 are monitored and controlled independently. For example, zone 14 may be controlled by controller 20, zone 16 may be controlled by controller 22, and zone 18 may be controlled by controller 24. Controllers 20-24 may receive input from one or more temperature sensors located within zones 14-18. In some embodiments, zones 14-18 are controlled by a single supervisory controller (e.g., a BMS controller) located within building 10 or at a remote location.

Referring now to FIG. 2, a schematic diagram of HVAC system 12 is shown, according to an exemplary embodiment. HVAC system 12 is shown to include a controller 30. Controller 30 may be configured to monitor and control any number of conditions, states, or variables within a building or building zone. For example, controller 30 may be a HVAC controller configured to control the temperature of a building zone 40. Building zone 40 may include one or more of building zones 14-18, or the entirety of building 10. In some embodiments, controller 30 is a local controller (e.g., a field controller, a zone controller, a device controller, etc.). In other embodiments, controller 30 is a supervisory controller for an entire building or building system (e.g., a BMS controller). Controller 30 may by located within building zone 40 or remote from building zone 40.

Controller 30 may receive input signals from various measurement devices 42 (e.g., temperature sensors, pressure sensors, humidity sensors, etc.) and provide control signals to various HVAC control devices 44 (e.g., a chiller, a boiler, an air handling unit, an actuator, a damper, etc.). For example, in FIG. 2, controller 30 is shown receiving a temperature measurement $T_{zone}$ from measurement devices 42. $T_{zone}$ may represent the temperature of building zone 40 and may be obtained by a temperature sensor within building zone 40.

In some embodiments, controller 30 receives a temperature setpoint $T_{set}$ from user devices 46, remote applications 48, and/or a supervisory controller 50. The temperature setpoint may be a cooling temperature setpoint $T_{c,set}$ (i.e., a maximum temperature threshold above which cooling is required), a heating temperature setpoint $T_{h,set}$ (i.e., a minimum temperature threshold below which heating is required), or both a cooling temperature setpoint and a heating temperature setpoint. Controller 30 may operate to maintain $T_{zone}$ between the heating setpoint and the cooling setpoint (e.g., $T_{h,set} \leq T_{zone} \leq T_{c,set}$).

Controller 30 may utilize any type of control methodology (e.g., feedback control, model predictive control, pattern recognition adaptive control, PID control, feed-forward control, open loop control, etc.) to translate one or more inputs into a control signal for one or more HVAC devices. For example, controller 30 may translate the zone temperature $T_{zone}$ and the temperature setpoint $T_{set}$ into a control signal $u_t$ for control devices 44.

In some embodiments, controller 30 is part of a thermostat or other integrated temperature measurement and control system. For example, controller 30 may be implemented as part of a local thermostat configured to measure the temperature of the zone or room in which the thermostat is located (e.g., combined with measurement devices 42 and located within building zone 40). Controller 30 may provide control signal $u_t$ to a heating system and/or a cooling system to maintain the temperature of building zone 40 $T_{zone}$ at the temperature setpoint $T_{set}$ or within the temperature setpoint range (e.g., $T_{h,set} \leq T_{zone} \leq T_{c,set}$).

Controller 30 may be configured to operate in multiple states and to transition therebetween. For example, controller 30 may be configured to operate in a normal state, an unoccupied state, a cool down state, and a warm up state. In the normal state, controller 30 may operate to maintain $T_{zone}$ between an occupied heating setpoint (i.e., $T_{h,set}$) and an occupied cooling setpoint (i.e., $T_{c,set}$). In the unoccupied state, controller 30 may operate to maintain $T_{zone}$ between an unoccupied heating setpoint $T_{h,set,unocc}$ and an unoccupied cooling setpoint $T_{c,set,unocc}$ (e.g., $T_{h,set,unocc} \leq T_{zone} \leq T_{c,set,unocc}$). In some embodiments, the unoccupied heating setpoint is lower than the occupied heating setpoint (i.e., $T_{h,set,unocc} < T_{h,set}$) and the unoccupied cooling setpoint is higher than the occupied cooling setpoint (i.e., $T_{c,set,unocc} > T_{c,set}$).

Controller 30 may be configured to estimate a time $\hat{\tau}$ required to transition from the unoccupied state to the occupied state (i.e., the estimated return time). In some embodiments, controller 30 uses a model of building zone 40 (e.g., a parametric model) to determine the estimated return time $\hat{\tau}$ (described in greater detail below). Controller 30 may use the estimated return time $\hat{\tau}$ to determine when to begin heating building zone 40 (by transitioning into the warm up state) or cooling building zone 40 (by transitioning into the cool down state) so that $T_{zone}$ will be between the occupied heating setpoint $T_{h,set}$ and the occupied cooling setpoint $T_{c,set}$ when occupancy begins (e.g., at the beginning of a work day, etc.).

Figure 3:
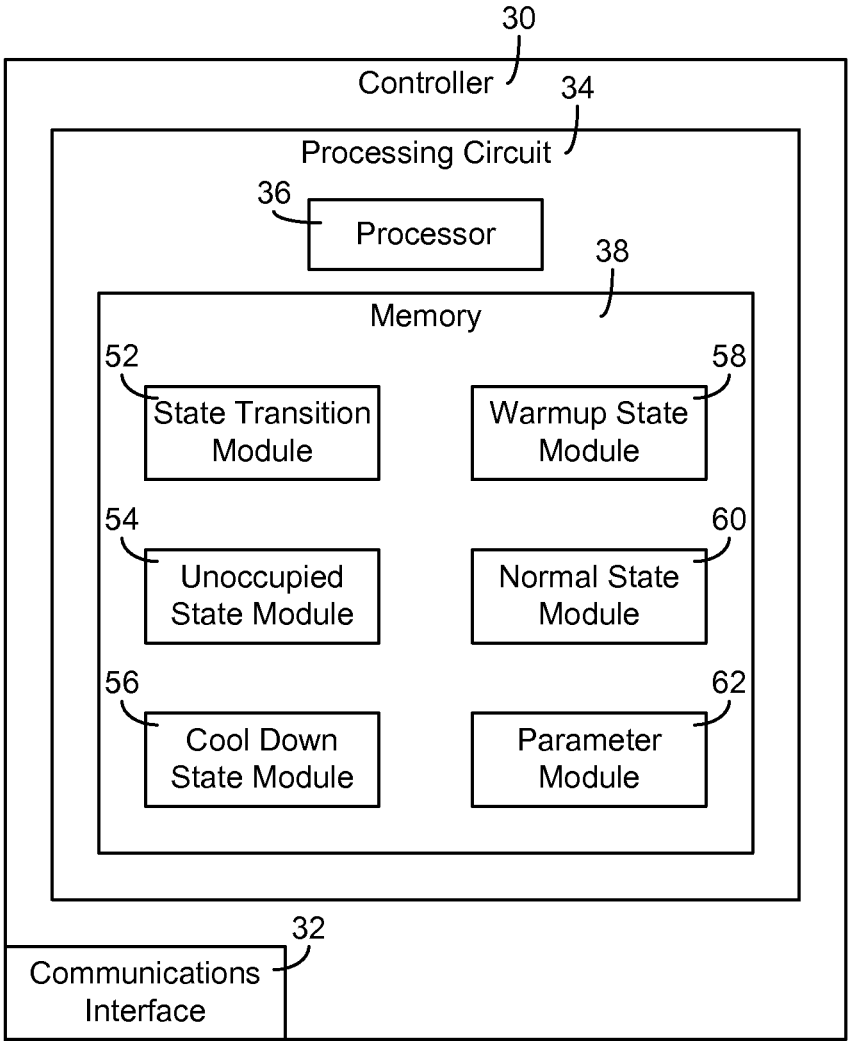
FIG. 3 is a block diagram illustrating the controller of FIG. 2 in greater detail. The controller is shown to include a state transition module, an unoccupied state module, a cool down state module, a warm up state module, a normal state module, and a parameter module, according to an exemplary embodiment.

Referring now to FIG. 3, a block diagram illustrating controller 30 in greater detail is shown, according to an exemplary embodiment. Controller 30 is shown to include a communications interface 32 and a processing circuit 34. Communications interface 32 may include wired or wireless interfaces (e.g., jacks, antennas, transmitters, receivers, transceivers, wire terminals, etc.) for conducting electronic data communications with external systems, devices, or data sources.

Communications interface 32 may be configured to communicate via a direct connection or an indirect/network connection (e.g., an Internet connection, a LAN, WAN, or WLAN connection, etc.). For example, communications interface 32 can include an Ethernet card and port for sending and receiving data via an Ethernet-based communications link or network. In some embodiments, communications interface 32 includes a WiFi transceiver and/or a cellular or mobile phone transceiver for communicating via a wireless communications network.

Communications interface 32 may be used to receive input signals from various measurement devices (e.g., temperature sensors, pressure sensors, humidity sensors, etc.) and to provide control signals to various HVAC control devices (e.g., a chiller, a boiler, an air handling unit, an actuator, a damper, etc.). For example, communications interface 32 may be used to receive zone temperature $T_{zone}$ from measurement devices 42 and to provide control signal $u_t$ to control devices 44. In some embodiments, communications interface 32 may use the Building Automation and Control networks (BACnet) communications protocol to send and receive data between controller 30 and building zone 40.

Still referring to FIG. 3, processing circuit 34 is shown to include a processor 36 and memory 38. Processor 36 can be implemented as one or more microprocessors (e.g., CPUs, GPUs, etc.), an application specific integrated circuit (ASIC), one or more field programmable gate arrays (FPGAs), a circuit containing one or more processing components, a group of distributed processing components (e.g., processing components in communication via a data network or bus), circuitry for supporting a microprocessor, or other hardware configured for processing data. Processor 36 may be configured to execute computer code stored in memory 38 to complete and facilitate the activities described herein.

Memory 38 may include one or more devices (e.g., RAM, ROM, solid state memory, hard disk storage, etc.) for storing data and/or computer code for completing or facilitating the various processes, layers, and modules of the present disclosure. Memory 38 may include volatile memory or non-volatile memory. Memory 38 may include database components, object code components, script components, or any other type of information structure for supporting the various activities and information structures of the present disclosure. According to an exemplary embodiment, memory 38 is communicably connected to processor 36 via processing circuit 34 and includes computer code for executing (e.g., by processing circuit 34 and/or processor 36) one or more processes described herein. In brief overview, memory 38 is shown to include a state transition module 52, an unoccupied state module 54, a cool down state module 56, a warm up state module 58, a normal state module 60, and a parameter module 62.

Still referring to FIG. 3, memory 38 is shown to include a state transition module 52. State transition module 52 may be configured to determine an appropriate operating state for controller 30 and to transition between operating states. The operating states may include an unoccupied state, a cool down state, a warm up state, and a normal state. In some embodiments, state transition module 52 determines the appropriate operating state at each time step t. (e.g., once per minute, once every five minutes, once per hour, etc.).

State transition module 52 may use one or more variable inputs to determine the appropriate operating state. Variable inputs may include, for example, the zone temperature $T_{zone}$, the occupied heating setpoint $T_{h,set}$, the occupied cooling setpoint $T_{c,set}$, a temperature offset $\in$ from an occupied setpoint value, the unoccupied heating setpoint $T_{h,set,unocc}$, the unoccupied cooling setpoint $T_{c,set,unocc}$, a current occupancy status O (e.g., true or false, based on a stored occupancy schedule), and/or a time to the next occupied period $T_{next}$. The variable inputs may be stored in memory (e.g., in parameter module 62) and retrieved by state transition module 52 at the beginning of each time step t. The variable inputs may be specified by a user (e.g., heating and cooling setpoints), received from another system or process (e.g., a supervisory controller, another module of controller 30, etc.), or automatically calculated by state transition module 52 based on stored values. For example, state transition module 52 may calculate the time to the next occupied period $T_{next}$ by subtracting the current time from the time of the next scheduled occupancy (e.g., based on a stored occupancy schedule).

State transition module 52 may use one or more persistent variables to determine the appropriate operating state. Persistent variables may include values that are stored or set by various modules of controller 30. For example, unoccupied state module 54 may determine a corrected estimate of the time $\tau_{start}$ required to cool down or warm up building zone 40 and store the corrected estimate $\tau_{start}$ in parameter module 62. Other persistent variables include, for example, a previous occupancy status $O_{prev}$ (e.g., true or false, based on an occupancy schedule) and one or more variables indicating the current operating state (e.g., unoccupied state status U, the cool down state status C, the warm up state status W, and the normal state status N). Unoccupied state status U, cool down state status C, warm up state status W, and normal state status N may be Boolean variables (e.g., true or false) set by state transition module 52 and/or other memory modules 54-60.

State transition module may retrieve the variable inputs and persistent variables from memory (e.g., from parameter module 62) and use them to determine the appropriate operating state. In some embodiments, the appropriate operating state is based on the current operating state and a system of rules specifying one or more conditions to transition from one operating state to another. State transition module 52 may determine whether the conditions to transition from the current operating state to another operating state are satisfied by applying the variable inputs and persistent variables to the transition conditions. For example, the state transition conditions may require state transition module 52 to compare various mathematical combinations of variable inputs and persistent variables to determine whether the state transition conditions are satisfied.

In some embodiments, state transition module 52 determines the current operating state (e.g., using unoccupied state status U, cool down state status C, warm up state status W, and normal state status N). Once the current operating state is known, state transition module 52 may check whether the conditions to transition out of the current operating state are satisfied. If all of the conditions to transition from the current operating state to another operating state are satisfied, state transition module 52 may transition the system into the other operating state. The various conditions (e.g., rules and transition logic) used by state transition module 52 to transition between operating states are described in greater detail with reference to FIG. 4.

Upon determining the appropriate operating state (and performing a state transition if necessary) state transition module 52 may determine whether to use the unoccupied setpoints (i.e., $T_{h,set,unocc}$ and $T_{c,set,unocc}$) or the occupied setpoints (i.e., $T_{h,set}$ and $T_{c,set}$). In some embodiments, state transition module 52 uses the unoccupied setpoints in the unoccupied state and uses the occupied setpoints in the normal state, the warm up state, and the cool down state. State transition module 52 may output and/or store a variable $S_{occ}$ indicating whether to use the unoccupied setpoints or the occupied setpoints. In some embodiments, the variable $S_{occ}$ is a Boolean variable (e.g., true=use occupied setpoints, false=use unoccupied setpoints). Once the appropriate operating state is determined, control may pass to one of unoccupied state module 54, cool down state module 56, warm up state module 58, and normal state module 60, based on the determination of the operating state.

Still referring to FIG. 3, memory 38 is shown to include an unoccupied state module 54. Unoccupied state module 54 may control system operation in the unoccupied operating state. Unoccupied state module 54 may be used in response to a determination (e.g., by state transition module 52) that the unoccupied operating state is the appropriate operating state. Unoccupied state module 54 may use the unoccupied setpoints $T_{h,set,unocc}$ and $T_{c,set,unocc}$ to control the temperature of zone 40 $T_{zone}$. For example, unoccupied state module 54 may determine a control signal $u_t$ to provide to control devices 44 to maintain $T_{zone}$ between $T_{h,set,unocc}$ and $T_{c,set,unocc}$.

In some embodiments, unoccupied state module 54 is configured to determine whether heating or cooling would be required if the occupied setpoints $T_{h,set}$ and $T_{c,set}$ were used. For example, if the current zone temperature is less than the occupied heating setpoint (i.e., $T_{zone}<T_{h,set}$), unoccupied state module 54 may determine that heating would be necessary if the occupied setpoints were used. If the current zone temperature is greater than the occupied cooling temperature (i.e., $T_{zone}>T_{c,set}$), unoccupied state module 54 may determine that cooling would be necessary if the occupied setpoints were used. If the current zone temperature is between the occupied heating setpoint and the occupied cooling setpoint (i.e., $T_{h,set}\leq T_{zone}\leq T_{c,set}$), unoccupied state module 54 may determine that neither heating nor cooling would be necessary if the occupied setpoints were used.

If either heating or cooling would be needed based on the occupied setpoints, unoccupied state module 54 may use an empirical model of building zone 40 to estimate the return time $\hat{\tau}$ required to raise or lower $T_{zone}$ to be within the occupied setpoint range (i.e., $T_{h,set} \leq T_{zone} \leq T_{c,set}$). In some embodiments, unoccupied state module 54 corrects the estimated return time $\hat{\tau}$ (e.g., using the standard deviation of the return time prediction error) to generate a corrected return time $\tau_{start}$. Unoccupied state module 54 may store the corrected return time $\tau_{start}$ in parameter module 62. If the corrected return time is greater than or equal to the time remaining until the next occupied period (i.e., $\tau_{start} \geq T_{next}$), unoccupied state module 54 may determine that heating or cooling should be started in order to raise or lower $T_{zone}$ to be within the occupied setpoint range by the time of occupancy.

In some embodiments, unoccupied state module 54 updates the current state parameter values in parameter module 62 (e.g., by setting unoccupied state status U to false and setting either cool down state status C or warm up state status W to true, based on whether cooling or heating is required). In other embodiments, state transition module 52 determines whether the corrected return time is greater than or equal to the time remaining until the next occupied period (i.e., $\tau_{start} \geq T_{next}$) based on the values of $\tau_{start}$ and $T_{next}$ stored in parameter module 62 and updates the current state parameter values at the beginning of the next time step.

If the conditions for transitioning to the cool down state or the warm up state are satisfied, unoccupied state module 54 may store one or more variables used to update the empirical model. Parameter module 62 may update the model parameters using the variables stored by unoccupied state module 54.

In some embodiments, if unoccupied state module 54 determines that neither heating nor cooling would be necessary (i.e., if $T_{h,set} \leq T_{zone} \leq T_{c,set}$), unoccupied state module 54 may check whether the scheduled occupancy period has begun. If the scheduled occupancy period has begun, unoccupied state module 54 may update the current state parameter values in parameter module 62 (e.g., by setting unoccupied state status U to false and setting normal state status N to true). In other embodiments, state transition module 52 determines whether the scheduled occupancy period has begun and updates the current state parameter values at the beginning of the next time step.

If neither heating nor cooling would be necessary and the scheduled occupancy period has not begun, operation may continue in the unoccupied state. Conditions may be assessed again at the beginning of the next time step. Unoccupied state module 54 is described in greater detail with reference to FIG. 10.

Still referring to FIG. 3, memory 38 is shown to include a cool down state module 56. Cool down state module 56 may control system operation in the cool down operating state. Cool down state module 56 may be used in response to a determination (e.g., by state transition module 52) that the cool down operating state is the appropriate operating state. Cool down state module 56 may use the occupied setpoints $T_{h,set}$ and $T_{c,set}$ to control the temperature $T_{zone}$ of zone 40. For example, cool down state module 56 may determine a control signal $u_t$ to provide to control devices 44 to maintain $T_{zone}$ between $T_{h,set}$ and $T_{c,set}$. Cool down state module 56 may operate HVAC system 12 to lower the zone temperature $T_{zone}$ to the occupied cooling setpoint $T_{c,set}$.

In the cool down state, cool down state module 56 may monitor the zone temperature $T_{zone}$. In some embodiments, cool down state module 56 determines whether the zone temperature $T_{zone}$ is less than or equal to the occupied cooling setpoint $T_{c,set}$ plus the temperature offset $\in$ (i.e., $T_{zone} \leq T_{c,set} + \in$). If so, cool down state module 56 may update the current state parameter values in parameter module 62 (e.g., by setting cool down state status C to false and setting normal state status N to true). In other embodiments, state transition module 52 determines whether the zone temperature $T_{zone}$ is less than or equal to the occupied cooling setpoint $T_{c,set}$ plus the temperature offset $\in$ and updates the current state parameter values at the beginning of the next time step.

In some embodiments, cool down state module 56 determines whether the next scheduled occupancy period has begun. If the scheduled occupancy period has begun, cool down state module 56 may update the current state parameter values in parameter module 62 (e.g., by setting cool down state status C to false and setting normal state status N to true). In other embodiments, state transition module 52 determines whether the scheduled occupancy period has begun and updates the current state parameter values at the beginning of the next time step.

If either the zone temperature $T_{zone}$ is less than or equal to the occupied cooling setpoint $T_{c,set}$ plus the temperature offset $\in$ or the next occupancy period has begun, the system may transition into the normal operating state. In some embodiments, the cool down operating state terminates upon the beginning of an occupancy period, regardless of the zone temperature $T_{zone}$.

Cool down state module 56 may be configured to determine a duration of the time spent in the cool down operating state. The amount of time spent in the cool down operating state may define the actual cooling return time $\tau_c$. Cool down state module 56 may be configured to calculate the cooling prediction error based on the difference between the actual cooling return time $\tau_c$ and the estimated cooling return time $\hat{\tau}_c$. Cool down state module 56 may use the cooling prediction error to determine an average cooling prediction error $\overline{\Delta}_c$(e.g., an exponentially weighted moving average, an arithmetic mean, etc.) and an estimate of the standard deviation of the cooling prediction error $\hat{\sigma}_c$. Cool down state module 56 may store the standard deviation of the cooling prediction error $\hat{\sigma}_c$ in parameter module 62 for subsequent use by unoccupied state module 54 in determining a corrected estimate of the return time $\tau_{start}$. Cool down state module 56 is described in greater detail with reference to FIG. 11.

Still referring to FIG. 3, memory 38 is shown to include a warm up state module 58. Warm up state module 58 may control system operation in the warm up operating state. Warm up state module 58 may be used in response to a determination (e.g., by state transition module 52) that the warm up operating state is the appropriate operating state. Warm up state module 58 may use the occupied setpoints $T_{h,set}$ and $T_{c,set}$ to control the temperature $T_{zone}$ of zone 40. For example, warm up state module 58 may determine a control signal $u_t$ to provide to control devices 44 to maintain $T_{zone}$ between $T_{h,set}$ and $T_{c,set}$. Warm up state module 58 may operate HVAC system 12 to raise the zone temperature $T_{zone}$ to the occupied heating setpoint $T_{h,set}$.

In the warm up state, warm up state module 58 may monitor the zone temperature $T_{zone}$. In some embodiments, warm up state module 58 determines whether the zone temperature $T_{zone}$ is greater than or equal to the occupied heating setpoint $T_{h,set}$ minus the temperature offset $\in$ (i.e., $T_{zone} \geq T_{h,set} - \in$). If so, warm up state module 58 may update the current state parameter values in parameter module 62 (e.g., by setting warm up state status W to false and setting either normal state status N or unoccupied state status U to true). In other embodiments, state transition module 52 determines whether the zone temperature $T_{zone}$ is greater than or equal to the occupied heating setpoint $T_{h,set}$ minus the temperature offset $\in$ and updates the current state parameter values at the beginning of the next time step.

In some embodiments, warm up state module 58 determines whether the next scheduled occupancy period has begun and/or ended. If the scheduled occupancy period has begun but not yet ended (i.e., the current time is within an occupancy period), warm up state module 58 may update the current state parameter values in parameter module 62 by setting warm up state status W to false and setting normal state status N to true in response to a determination that the zone temperature $T_{zone}$ is greater than or equal to the occupied heating setpoint $T_{h,set}$ minus the temperature offset $\in$. However, if the scheduled occupancy period has already begun and ended, warm up state module 58 may set warm up state status W to false and unoccupied state status U to true. In other embodiments, state transition module 52 determines whether the scheduled occupancy period has begun and/or ended and updates the current state parameter values at the beginning of the next time step.

From the warm up operating state, the system may transition into either the normal operating state or the unoccupied operating state. If the zone temperature $T_{zone}$ is greater than or equal to the occupied heating setpoint $T_{h,set}$ minus the temperature offset $\in$ (i.e., $T_{zone} \geq T_{h,set} - \in$) and the current time is prior to the beginning of the scheduled occupancy period or during the scheduled occupancy period, the system may transition into the normal operating state. If the scheduled occupancy period has already begun and ended, the system may transition into the unoccupied operating state. Unlike the cool down operating state, the warm up operating state may not terminate upon the beginning of an occupancy period. The warm up operating state may continue until either the zone temperature $T_{zone}$ is greater than or equal to the occupied heating setpoint $T_{h,set}$ minus the temperature offset $\in$ (i.e., $T_{zone} \geq T_{h,set} - \in$) or until the scheduled occupancy period has both begun and ended. The various operating states and state transition conditions are described in greater detail with reference to FIGS. 4-9.

Warm up state module 58 may be configured to determine a duration of the time spent in the warm up operating state. The amount of time spent in the warm up operating state may define the actual heating return time $\tau_h$. Warm up state module 58 may be configured to calculate the heating prediction error based on the difference between the actual heating return time $\tau_h$ and the estimated heating return time $\hat{\tau}_h$. Warm up state module 58 may use the heating prediction error to determine an average heating prediction error $\overline{\Delta}_h$(e.g., an exponentially weighted moving average, an arithmetic mean, etc.) and an estimate of the standard deviation of the heating prediction error $\hat{\sigma}_h$. Warm up state module 58 may store the standard deviation of the heating prediction error $\hat{\sigma}_h$ in parameter module 62 for subsequent use by unoccupied state module 54 in determining a corrected estimate of the return time $\tau_{start}$.

Still referring to FIG. 3, memory 38 is shown to include a normal state module 60. Normal state module 60 may control system operation in the normal operating state. Normal state module 60 may be used in response to a determination (e.g., by state transition module 52, by cool down state module 56, by warm up state module 58, etc.) that the normal operating state is the appropriate operating state. Normal state module 60 may use the occupied setpoints $T_{h,set}$ and $T_{c,set}$ to control the temperature $T_{zone}$ of zone 40. For example, normal state module 60 may operate HVAC system 12 (e.g., by determining a control signal $u_t$ and providing the control signal $u_t$ to control devices 44) to maintain $T_{zone}$ between $T_{h,set}$ and $T_{c,set}$.

In the normal operating state, normal state module 60 may determine whether the current time is within an occupancy period. If the current time is within an occupancy period, normal state module 60 may continue to operate HVAC system 12 to maintain $T_{zone}$ between $T_{h,set}$ and $T_{c,set}$. However, if the current time is not within an occupancy period (e.g., the occupancy period has ended), normal state module may update the current state parameter values in parameter module 62 (e.g., by setting normal state status N to false and setting unoccupied state status U to true). In other embodiments, state transition module 52 determines whether the current time is within an occupancy period and updates the current state parameter values at the beginning of the next time step.

Still referring to FIG. 3, memory 38 is shown to include a parameter module 62. Parameter module 62 may be configured to store the various parameters and parameter values used by controller 30 to estimate the return time $\hat{\tau}$ and the corrected estimate of the return time $\tau_{start}$. For example, parameter module 62 may be configured to store values for variable inputs such as the occupied temperature setpoints $T_{h,set}$ and $T_{c,set}$ and the unoccupied temperature setpoints $T_{h,set,unocc}$ and $T_{c,set,unocc}$. Parameter module 62 may store values of a current occupancy status O (e.g., true or false, based on a stored occupancy schedule), and/or a time to the next occupied period $T_{next}$. The variable inputs may be specified by a user (e.g., heating and cooling setpoints), received from another system or process (e.g., a supervisory controller, another module of controller 30, etc.), or automatically calculated and stored by various modules of controller 30 (e.g., by state transition module 52, unoccupied state module 54, cool down state module 56, warm up state module 58, etc.).

Parameter module 62 may store one or more persistent variables that are calculated and/or set by various modules of controller 30. For example, unoccupied state module 54 may determine a corrected estimate of the time $\tau_{start}$ required to cool down or warm up building zone 40 and store the corrected estimate $\tau_{start}$ in parameter module 62. Other persistent variables include, for example, a previous occupancy status $O_{prev}$ (e.g., true or false, based on an occupancy schedule) and one or more variables indicating the current operating state (e.g., unoccupied state status U, the cool down state status C, the warm up state status W, and the normal state status N).

Parameter module 62 may be configured to update learned model parameters in an empirical model for estimating the return time $\hat{\tau}$. The empirical model may be a statistical model, a parametric model, a regression model, a neural network model, a state space model, a fuzzy logic model, or any other type of model from which the return time $\hat{\tau}$ can be estimated. The estimated return time $\hat{\tau}$ may be a function of one or more learned model parameters.

In some embodiments, parameter module 62 uses a regression algorithm (e.g., a partial least squares regression, ridge regression, principal component regression, weighted least squares regression, ordinary least squares regression, least mean linear regression, exponentially weighted regularized least squares regression, etc.) to update the learned model parameters based on previous data values. The data values may be measured by various sensors of HVAC system 12 and/or calculated from measured values. For example, parameter module 62 may use the prediction error (e.g., the cooling prediction error calculated by cool down module 56, the heating prediction error calculated by warm up module 58, etc.) or a function of the prediction error to update the model parameter values. In some embodiments, parameter module 62 updates the model parameters in response to zone temperature $T_{zone}$ being less than the heating setpoint minus the temperature offset (i.e., $T_{zone}<T_{h,set}-\in$) at the beginning of warm up state or greater than the cooling setpoint plus the temperature offset (i.e., $T_{zone}>T_{c,set}+\in$) at the beginning of the cool down state.

Parameter module 62 may be configured to initialize values for the one or more learned model parameters to provide default parameters for the empirical model. In some embodiments, parameter module 62 initializes at least one of the model parameters to a non-zero value.

In some embodiments, parameter module 62 is configured to determine whether an updated parameter value has a value that violates a constraint condition. The constraint condition may be based on physical realities of the empirical model. If an updated parameter value violates a constraint condition, parameter module 62 may be configured to replace the parameter value with a value that satisfies the constraint condition. Parameter module 62 is described in greater detail with reference to FIG. 13.

Referring now to FIGS. 4-9, several state transition drawings are shown, according to an exemplary embodiment. FIG. 4 is a state transition diagram showing the various operating states (i.e., the unoccupied state, the cool down state, the warm up state, and the normal state) and the conditions for transitioning therebetween. FIGS. 5-9 are temperature vs. time graphs illustrating various state transitions as a function of zone temperature $T_{zone}$ and zone occupancy status O.

Referring specifically to FIG. 4, a state transition diagram 400 is shown, according to an exemplary embodiment. State transition diagram 400 is shown to include an unoccupied state 402, a cool down state 404, a warm up state 406, and a normal state 408. In unoccupied state 402, the unoccupied temperature setpoints $T_{h,set,unocc}$ and $T_{c,set,unocc}$ may be used (e.g., by controller 30) to control zone temperature $T_{zone}$. In cool down state 404, warm up state 406, and normal state 408, the occupied (normal) temperature setpoints $T_{h,set}$ and $T_{c,set}$ may be used to control zone temperature $T_{zone}$.

State transition diagram 400 illustrates exemplary criteria for transitioning between the various operating states. State transition module 52 and/or other modules of controller 30 may use the criteria illustrated in FIG. 4 for determining an appropriate operating state and for transitioning HVAC system 12 from one operating state to another.

Still referring to FIG. 4, state transition diagram 400 is shown to include an unoccupied state 402. In unoccupied state 402, controller 30 may be configured to monitor the zone temperature $T_{zone}$ and to determine whether heating or cooling would be required if the occupied temperature setpoints $T_{h,set}$ and $T_{c,set}$ were used. Controller 30 may determine that heating or cooling would be required if the zone temperature is less than the occupied heating setpoint (i.e., $T_{zone}<T_{h,set}$) or greater than the occupied cooling setpoint (i.e., $T_{zone}>T_{c,set}$). If heating or cooling would be required, controller 30 may estimate the return time $\hat{\tau}$ and/or the corrected estimate of the return time $\tau_{start}$. In unoccupied state 402, controller 30 may calculate the time $T_{next}$ until the beginning of the next scheduled occupancy period. Values for $T_{zone}$, $\hat{\tau}$, $\tau_{start}$, $T_{h,set}$, and/or $T_{c,set}$ may be stored in parameter module 62 and retrieved to conduct the comparisons performed in unoccupied state 402.

From unoccupied state 402, controller 30 can transition HVAC system 12 into any of cool down state 404, warm up state 406, and normal state 408. For example, state transition diagram 400 is shown to include a transition 410 from unoccupied state 402 to cool down state 404, a transition 412 from unoccupied state 402 to warm up state 406, and a transition 414 from unoccupied state 402 to normal state 408. Transition 410 may be performed when the zone temperature is greater than the occupied cooling setpoint (i.e., $T_{zone}>T_{c,set}$, condition 416) and when the time until the beginning of the next occupancy period is less than or equal to the corrected estimate of the return time (i.e., $T_{next}\leq\tau_{start}$, condition 418). Transition 412 may be performed when the zone temperature is less than the occupied heating setpoint (i.e., $T_{zone}<T_{h,set}$, condition 420) and when the time until the beginning of the next occupancy period is less than or equal to the corrected estimate of the return time (i.e., $T_{next}\leq\tau_{start}$, condition 418). In some embodiments, transition 410 is performed only when both of conditions 416 and 418 are satisfied and transition 412 is performed only when both of conditions 420 and 418 are satisfied. Transition 414 may be performed when unoccupied state 402 is active (i.e., U=true) and the current time is during a scheduled occupancy period (e.g., O=true).

Still referring to FIG. 4, state transition diagram 400 is shown to include a cool down state 404. In cool down state 404, controller 30 may monitor the zone temperature $T_{zone}$ and operate HVAC system 12 to lower the zone temperature $T_{zone}$ to the occupied cooling setpoint $T_{c,set}$. From cool down state 404, controller 30 can transition HVAC system 12 into normal state 408. For example, state transition diagram 400 is shown to include a transition 422 from cool down state 404 to normal state 408.

In some embodiments, transition 422 may be performed when the zone temperature is less than or equal to the occupied cooling setpoint plus a temperature offset $\in$ (i.e., $T_{zone}\leq T_{c,set}+\in$, condition 424). Offset $\in$ raises the temperature at which transition 422 is performed by a small amount (e.g., one degree, two degrees, half a degree, etc.). Offset $\in$ may be important for systems in which the temperature asymptotically approaches the setpoint (e.g., in an overdamped system). Without offset $\in$, transition 422 may not occur until significantly later than it would otherwise occur if offset $\in$ were used, thereby extending the duration of cool down state 404. For example, without offset $\in$, the actual return time $\tau$ may include a substantial period of time during which the zone temperature $T_{zone}$ is nearly equal to the occupied cooling setpoint $T_{c,set}$, but approaching $T_{c,set}$ very slowly. The extended duration of cool down state 404 may cause subsequent estimations of return time $\hat{\tau}$ to be longer than necessary with a minimal impact on zone temperature at the time of occupancy. Advantageously, offset $\in$ may slightly increase the temperature at which controller 30 determines that cool down is complete, thereby reducing or eliminating the effects of a slow asymptotic change in zone temperature $T_{zone}$ near the occupied cooling setpoint $T_{c,set}$.

In some embodiments, transition 422 may be performed when a scheduled occupancy period begins (condition 426). For example, controller 30 may be configured to monitor the occupancy period status O during cool down state 404 and transition into normal state 408 when the occupancy period begins (e.g., when O=true). The beginning of an occupancy period may trigger the end of cool down state 404. In some embodiments, transition 422 may be performed when either (or both) of conditions 424 and 426 are satisfied (i.e., only condition 424, only condition 426, both conditions 424 and 426). In other words, controller 30 may be configured to transition HVAC system 12 from cool down state 404 to normal state 408 when the zone temperature is less than or equal to the occupied cooling setpoint plus a temperature offset $\in$ (i.e., $T_{zone} \leq T_{c,set} + \in$) and/or when the occupancy period begins (e.g., O=true). Transition 422 is described in greater detail with reference to FIGS. 5-6.

Still referring to FIG. 4, state transition diagram 400 is shown to include a warm up state 406. In warm up state 406, controller 30 may monitor the zone temperature $T_{zone}$ and operate HVAC system 12 to raise the zone temperature $T_{zone}$ to the occupied heating setpoint $T_{h,set}$. From warm up state 406, controller 30 can transition HVAC system 12 into either normal state 408 or unoccupied state 402. For example, state transition diagram 400 is shown to include a transition 428 from warm up state 406 to normal state 408 and a transition 432 from warm up state 406 to unoccupied state 402. Unlike cool down state 404, warm up state 406 can transition into either normal state 408 or unoccupied state 402.

Controller 30 may be configured to transition HVAC system 12 from warm up state 406 to normal state 408 (transition 428) when the zone temperature is greater than or equal to the occupied heating setpoint minus a temperature offset $\in$ (i.e., $T_{zone} \geq T_{h,set} - \in$, condition 430). Offset $\in$ lowers the temperature at which transition 428 is performed by a small amount (e.g., one degree, two degrees, half a degree, etc.). Advantageously, offset $\in$ may slightly decrease the temperature at which controller 30 determines that warm up is complete, thereby reducing or eliminating the effects of a slow asymptotic change in zone temperature $T_{zone}$ near the occupied heating setpoint $T_{h,set}$. Transition 428 may be performed when condition 430 is satisfied prior to the beginning of a scheduled occupancy period (i.e., O=false and $O_{prev}$=false) or during a scheduled occupancy period (i.e., O=true). Transition 428 is described in greater detail with reference to FIGS. 7-8.

In warm up state 406, controller 30 may be configured to monitor the occupancy period status O. Controller 30 may be configured to transition HVAC system 12 from warm up state 406 to unoccupied state 402 (transition 432) when a scheduled occupancy ends (e.g., when O=false and $O_{prev}$=true, condition 434). Transition 432 is described in greater detail with reference to FIG. 9.

In some embodiments, warm up state 406 is treated differently than cool down state 404. For example, warm up state 406 may be allowed to continue beyond the beginning of a scheduled occupancy period whereas cool down state 404 may end when an occupancy period begins. Warm up state 406 may be allowed to continue until the end of the occupancy period, at which time controller 30 transitions HVAC system into unoccupied state 402 (transition 432). The reason for treating cool down state 404 and warm up state 406 differently stems from the realization that the loads on building zone 40 will tend to help $T_{zone}$ increase to the target temperature in warm up state 406 (i.e., toward $T_{h,set} - \in$), but tend to cause $T_{zone}$ to move away from the target temperature in cool down state 404 (i.e., away from $T_{c,set} + \in$). In fact, for cooling, if the target temperature has not been reached by the beginning of occupancy, it is possible that the target temperature will not be reached at any time during the occupancy period (e.g., due to the increased loads caused by building occupancy). If cool down state 404 were allowed to continue into the scheduled occupancy period, the estimate for return time $\hat{\tau}$ could be unrealistically long and could skew the values for the empirical model parameters in way that could result in significant over-predictions of return time $\hat{\tau}$. Advantageously, limiting the duration of cool down state 404 prevents cool down state 404 from extending into the scheduled occupancy period and improves the accuracy of the estimated return time $\hat{\tau}$.

Figure 5:
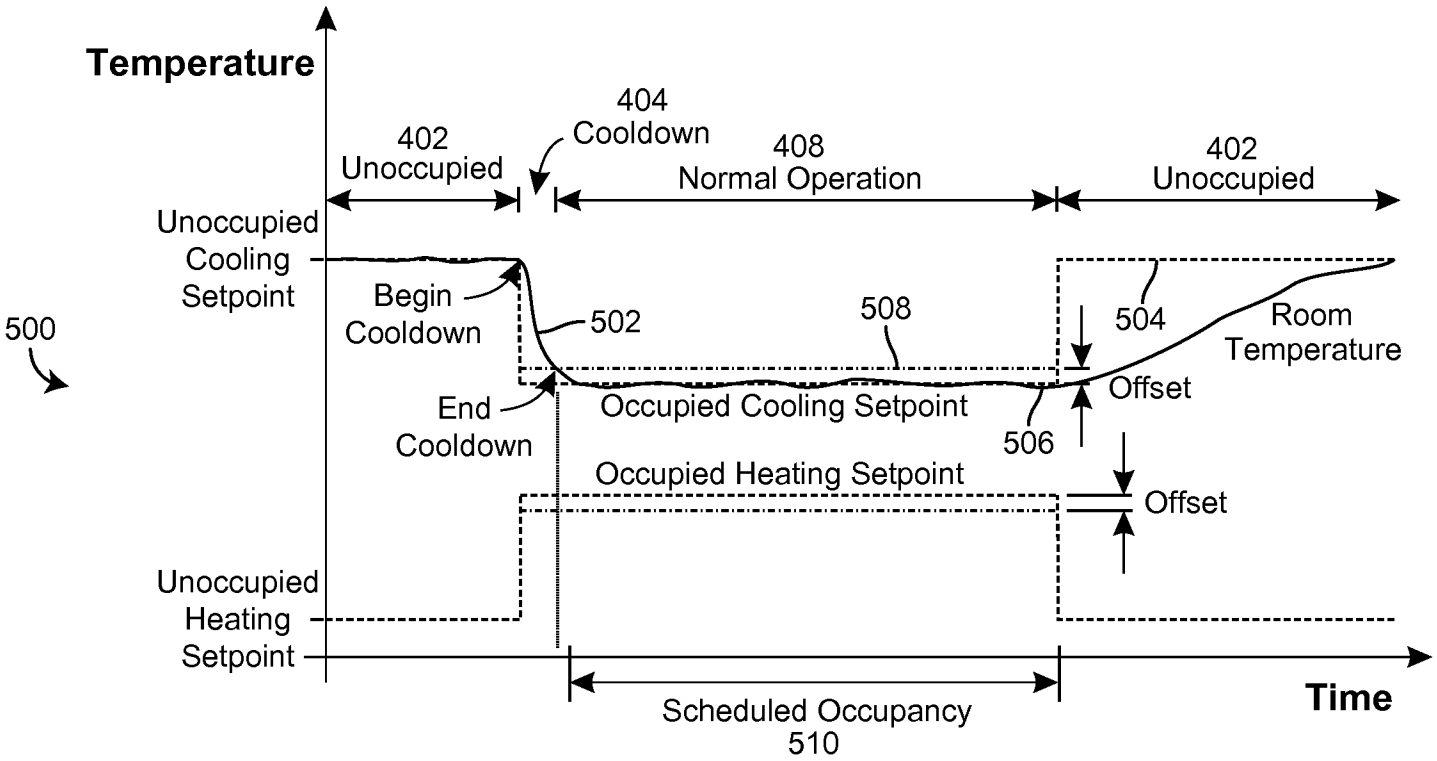
FIGS. 5-6 are temperature v. time graphs illustrating transitions from the cool down operating state to the normal operating state, according to an exemplary embodiment.
Figure 6:
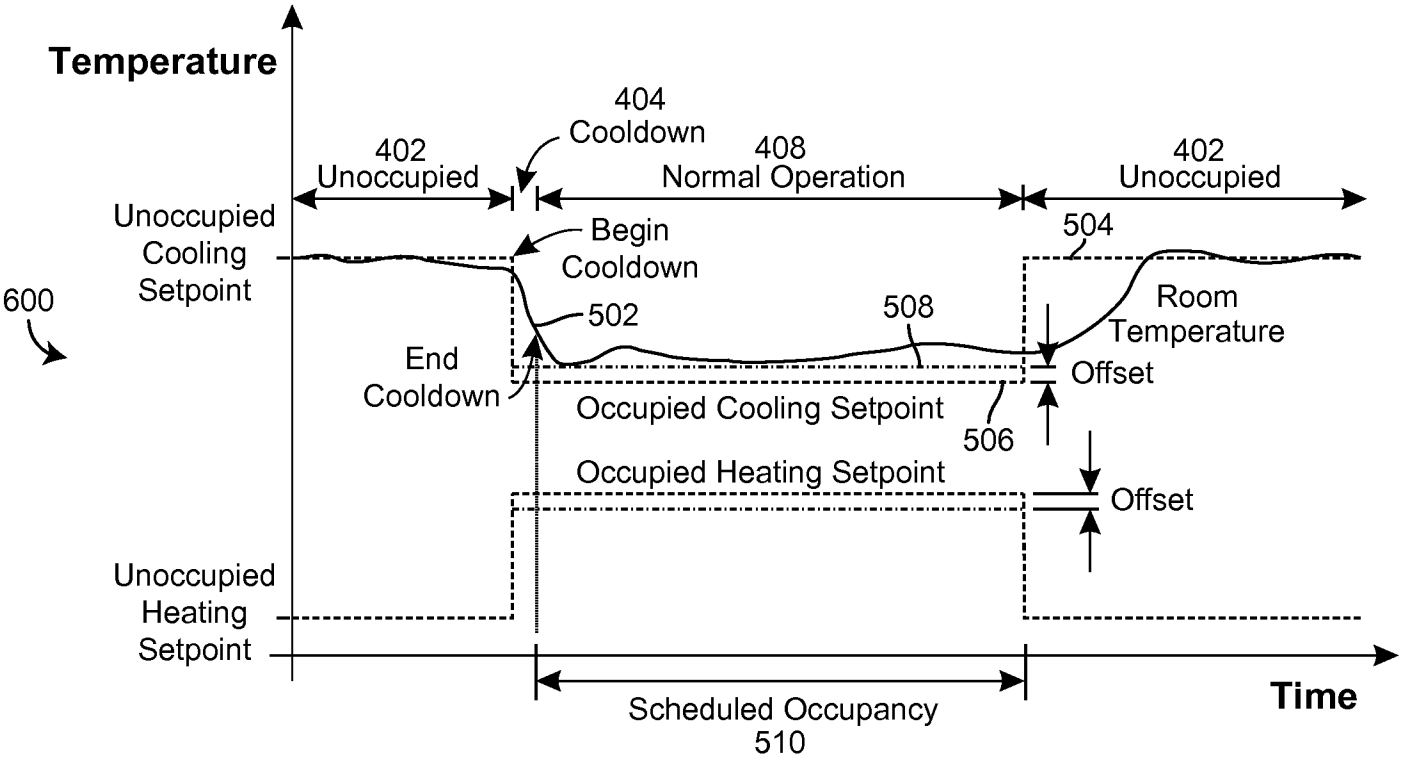

Referring now to FIGS. 5-6, temperature v. time graphs 500 and 600 are shown, according to an exemplary embodiment. Graphs 500 and 600 illustrate transition 422 from cool down state 404 to normal state 408 as a function of zone temperature $T_{zone}$ and occupancy period status O. Referring specifically to FIG. 5, graph 500 is shown to include a line 502 representing the zone temperature $T_{zone}$, a line 504 representing the unoccupied cooling setpoint $T_{c,set,unocc}$, a line 506 representing the occupied cooling setpoint $T_{c,set}$, and a line 508 representing the occupied cooling setpoint plus the temperature offset (i.e., $T_{c,set} + \in$). In graph 500, transition 422 is caused by the zone temperature decreasing to a temperature less than or equal to the occupied cooling setpoint plus the temperature offset (i.e., $T_{zone} \leq T_{c,set} + \in$) prior to the beginning of the scheduled occupancy period 510. For example, in graph 500, line 502 is shown crossing line 508 before occupancy period 510 begins. Graph 500 illustrates a circumstance in which transition 422 is caused by the satisfaction of condition 424.

Referring specifically to FIG. 6, in graph 600, transition 422 is caused by the start of scheduled occupancy period 510. In some circumstances, zone temperature $T_{zone}$ (line 502) may not reach the occupied cooling setpoint plus the temperature offset (line 508) prior to the beginning of occupancy period 510. Graph 600 illustrates a circumstance in which transition 422 is caused by the satisfaction of condition 426. For example, transition 422 may be caused by the beginning of a scheduled occupancy period, regardless of the zone temperature $T_{zone}$. In graph 600, cool down period 404 ends at the same time that scheduled occupancy period 510 begins.

Figure 7:
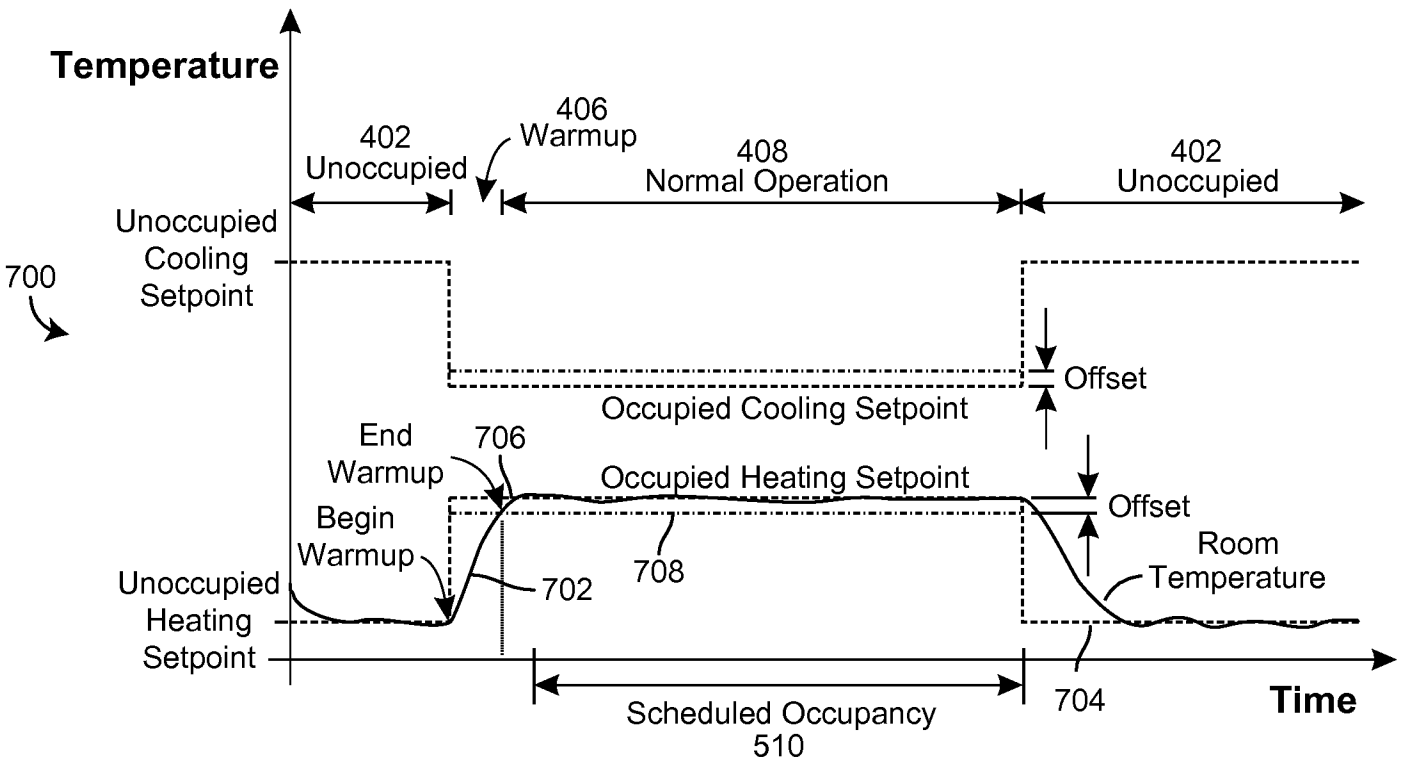
FIGS. 7-8 are temperature v. time graphs illustrating transitions from the warm up operating state to the normal operating state, according to an exemplary embodiment.
Figure 8:
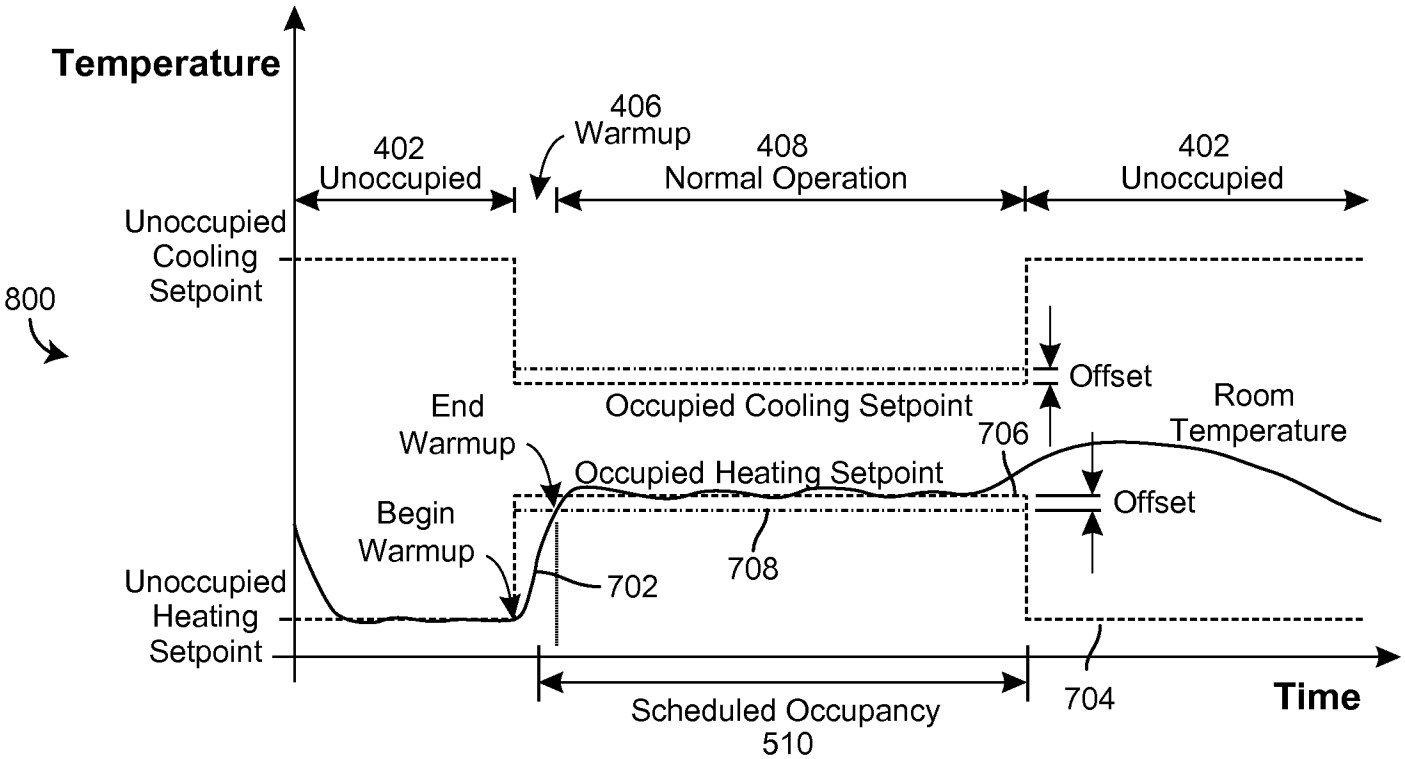

Referring now to FIGS. 7-8, temperature v. time graphs 700 and 800 are shown, according to an exemplary embodiment. Graphs 700 and 800 illustrate transition 428 from warm up state 406 to normal state 408 as a function of zone temperature $T_{zone}$ and occupancy period status O. Referring specifically to FIG. 7, graph 700 is shown to include a line 702 representing the zone temperature $T_{zone}$, a line 704 representing the unoccupied heating setpoint $T_{h,set,unocc}$, a line 706 representing the occupied heating setpoint $T_{h,set}$, and a line 708 representing the occupied heating setpoint minus the temperature offset (i.e., $T_{h,set} - \in$). In graph 700, transition 428 is caused by the zone temperature increasing to a temperature greater than or equal to the occupied heating setpoint minus the temperature offset (i.e., $T_{zone} \geq T_{h,set} - \in$) prior to the beginning of the scheduled occupancy period 510. For example, in graph 700, line 702 is shown crossing line 708 before occupancy period 510 begins.

Referring specifically to FIG. 8, graph 800 illustrates a transition from warm up state 406 to normal state 408 after occupancy period 510 begins. In some circumstances, zone temperature $T_{zone}$ (line 702) may not reach the occupied heating setpoint minus the temperature offset (line 708) prior to the beginning of occupancy period 510. However, because warm up state 406 may be allowed to continue into occupancy period 510, transition 428 may occur before or after the beginning of occupancy period 510. In graph 800, the zone temperature $T_{zone}$ reaches the occupied heating setpoint minus the temperature offset at a time during scheduled occupancy period 510. In some embodiments, if an occupancy period is active (i.e., O=true) and the zone temperature is greater than or equal to the occupied heating setpoint minus the temperature offset (i.e., $T_{zone} \geq T_{h,set} - \in$), controller 30 may cause HVAC system 12 to transition from warm up state 406 to normal state 408.

Figure 9:
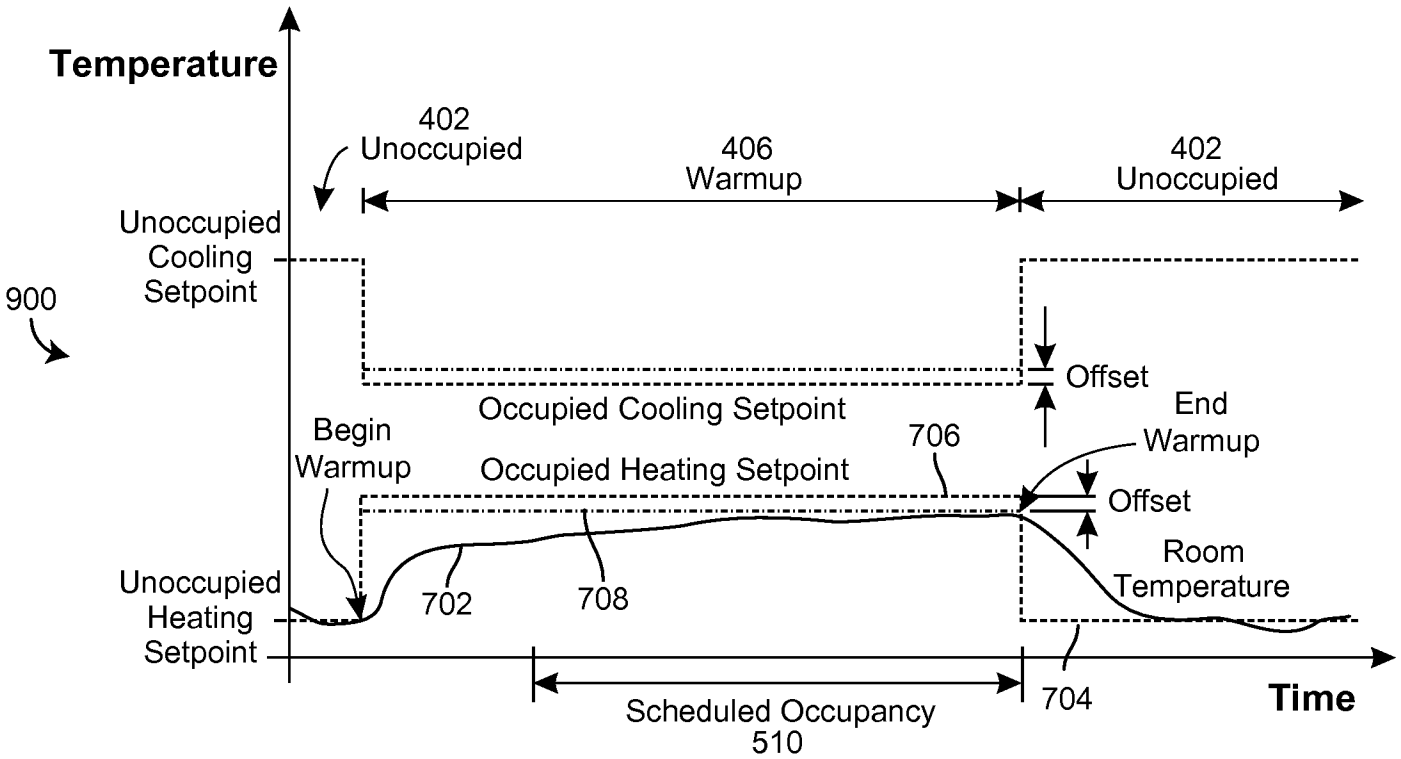
FIG. 9 is a temperature v. time graphs illustrating a transitions from the warm up operating state to the unoccupied operating state, according to an exemplary embodiment.

Referring now to FIG. 9, temperature v. time graph 900 is shown, according to an exemplary embodiment. Graph 900 illustrates transition 432 from warm up state 406 to unoccupied state 402. In some circumstances, zone temperature $T_{zone}$ (line 702) may not reach the occupied heating setpoint minus the temperature offset (line 708) at any time before or during occupancy period 510. If occupancy period 510 ends (e.g., O=false and $O_{prev}$=true) with HVAC system 12 still in warm up state 406, controller 30 may cause transition 432 to occur. The transition from warm up state 406 to unoccupied state 402 may occur without an intermediate transition into normal state 408.

Figure 10:
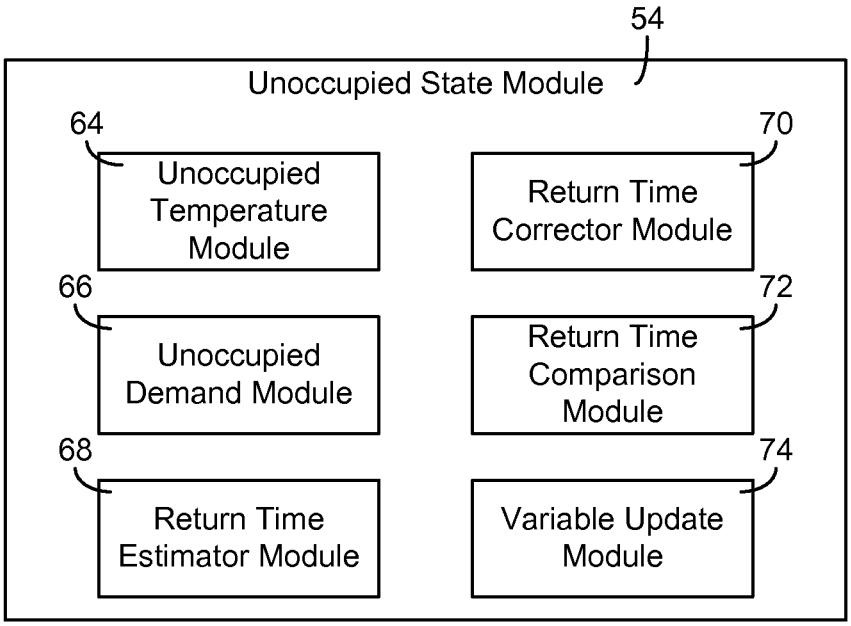
FIG. 10 is a block diagram illustrating the unoccupied state module of FIG. 3 in greater detail, according to an exemplary embodiment.

Referring now to FIG. 10, a block diagram illustrating unoccupied state module 54 in greater detail is shown, according to an exemplary embodiment. Unoccupied state module 54 may control system operation in unoccupied state 402. Unoccupied state module 54 may be activated (e.g., triggered, called, run, etc.) in response to a transition into unoccupied state 402 as described with reference to FIG. 4. Unoccupied state module 54 is shown to include an unoccupied temperature module 64, an unoccupied demand module 66, a return time estimator module 68, a return time corrector module 70, a return time comparison module 72, and a variable update module 74.

Unoccupied temperature module 64 may be configured to monitor the temperature $T_{zone}$ of building zone 40 in unoccupied state 402. Unoccupied temperature module 64 may use the unoccupied temperature setpoints $T_{h,set,unocc}$ and $T_{c,set,unocc}$ to control the temperature $T_{zone}$ of building zone 40. For example, unoccupied temperature module 64 may determine a control signal $u_t$ to provide to control devices 44 to maintain $T_{zone}$ between $T_{h,set,unocc}$ and $T_{c,set,unocc}$.

In some embodiments, unoccupied temperature module 64 is configured to determine whether heating or cooling would be required for building zone 40 if the occupied setpoints $T_{h,set}$ and $T_{c,set}$ were used. For example, if the current zone temperature is less than the occupied heating setpoint (i.e., $T_{zone}<T_{h,set}$), unoccupied temperature module 64 may determine that heating would be necessary if the occupied setpoints were used. If the current zone temperature is greater than the occupied cooling temperature (i.e., $T_{zone}>T_{c,set}$), unoccupied temperature module 64 may determine that cooling would be necessary if the occupied setpoints were used. If the current zone temperature is between the occupied heating setpoint and the occupied cooling setpoint (i.e., $T_{h,set}\leq T_{zone}\leq T_{c,set}$), unoccupied temperature module 64 may determine that neither heating nor cooling would be necessary if the occupied setpoints were used.

If unoccupied temperature module 64 determines that either heating or cooling would be necessary if the occupied temperature setpoints were used, unoccupied temperature module 64 may trigger one or more of modules 66-74 to estimate return time $\tau$ and/or calculate corrected return time $\tau_{start}$. If unoccupied temperature module 64 determines that neither heating nor cooling would be necessary, the estimated return time $\hat{\tau}$ and/or corrected return time $\tau_{start}$ may not be determined. Unoccupied temperature module 64 may assess temperature conditions again at the beginning of the next time step.

Still referring to FIG. 10, unoccupied state module 54 is shown to include an unoccupied demand module 66. Unoccupied demand module 66 may be configured to determine a heating or cooling demand for building zone 40 during unoccupied state 402. In some embodiments, unoccupied demand module 66 uses the output signal $u_t$ from controller 30 to determine the heating demand or the cooling demand for building zone 40. Advantageously, the output signal $u_t$ may be highly correlated to the actual return time $\tau$ and can be used to significantly improve the estimated return time $\hat{\tau}$ relative to traditional return time estimation techniques. The output signal $u_t$ provides an indication of the recent history of the cooling load or the heating load on building zone 40 and can account for intermittent heating or cooling that is required to maintain $T_{zone}$ between the unoccupied temperature setpoints $T_{h,set,unocc}$ and $T_{c,set,unocc}$. The output signal $u_t$ may provide a significantly better estimate of the actual heating or cooling load than the predictor variables used by traditional return time estimation techniques (e.g., outside air temperature, a difference between $T_{zone}$ and outside air temperature, etc.). Additionally, because output signal $u_t$ is directly available from controller output data, no additional temperature sensors to measure the outside air temperature are required.

In some embodiments, unoccupied demand module 66 may identify and use a portion of output signal $u_t$ produced by controller 30 during unoccupied state 402 to determine the heating or cooling demand for building zone 40. Unoccupied demand module 66 may filter the controller output signal $u_t$ (e.g., using a signal filter) to determine at least one of the cooling demand and the heating demand. For example, the heating or cooling demand may be a function of output signal $u_t$. In various embodiments, the signal filter may be at least one of an analog filter, a digital filter, a low pass filter, a band pass filter, a smoothing filter, a time window filter, a normalizing filter, and an averaging filter. The function of output signal $u_t$ may be at least one of a last value of $u_t$, an average of $u_t$, a normalized value of $u_t$, an integral of $u_t$, and a transformation of $u_t$. Unoccupied demand module 66 may determine the heating or cooling demand from control signal $u_t$ using any type and/or combination of filters, functions, transformations, or operations in addition to or in place of the exemplary filters and functions listed above.

In one embodiment, unoccupied demand module 66 determines the unoccupied heating or cooling demand by calculating an exponentially weighted moving average (EWMA) of the controller output signal $u_t$. Unoccupied demand module 66 may calculate the EWMA for at least a portion of control signal $u_t$ output by controller 30 during unoccupied state 402. In some embodiments, unoccupied demand module 66 may normalize the control signal $u_t$. For example, unoccupied demand module 66 may calculate a normalized control signal by dividing control signal $u_t$ by a controller output $u_{max}$ that provides maximum cooling or maximum heating for building zone 40. The EWMA of the normalized controller output can be calculated using the following equation:

$$\bar{u}_t = \bar{u}_{t-1} + \alpha\left(\frac{u_t}{u_{max}} - \bar{u}_{t-1}\right)$$

where $u_t$ is the controller output at time t, $u_{max}$ is the controller output that provides maximum heating or cooling, $\bar{u}_{t-1}$ is the value of the EWMA at the previous sampling time, and $\alpha$ is a smoothing constant. The value of $\alpha$ can be selected by a user, retrieved from memory, or automatically determined by another process or module. In some embodiments, $\alpha$ is set to a value of approximately 0.05. The value for $\alpha$ can be adjusted to give greater or lesser significance to previous EWMA values.

In some embodiments, the initial value for $\bar{u}_t$ may be reset to zero each time controller 30 transitions into unoccupied state 402. Resetting $\bar{u}_t$ upon each transition into unoccupied state 402 may help ensure that the heating or cooling demand calculated by unoccupied demand module 66 is an accurate representation of the actual demand during unoccupied state 402. In some embodiments, $\bar{u}_t$ may not be updated and may remain at zero for a predetermined time period (e.g., ten minutes, one hour, two hours, etc.) after unoccupied state 402 begins. By not updating $\bar{u}_t$ during the predetermined time period, unoccupied demand module 66 can prevent the calculated heating or cooling demand from being dependent on the heating or cooling loads during an occupied time period prior to the beginning of unoccupied state 402.

In some embodiments, unoccupied demand module 66 uses an arithmetic mean of the controller output signal $u_t$ to determine the heating or cooling demand. The arithmetic mean may be used for the first $1/\alpha$ samples after the predetermined time period, at which time the EWMA may be used for the remaining samples. The arithmetic mean gives greater significance to the initial sample values than the EWMA. For example, in the extreme case where the first sampled value of the normalized cooling demand equals one and $\alpha=0.05$, the arithmetic mean after the first sample is equal to one whereas the EWMA is 0.05. If the normalized cooling demand remains equal to one for twenty samples, the EWMA will equal 0.64, and after sixty samples the EWMA will equal 0.95. Twenty samples with the normalized cooling demand equal to one and a sampling time of sixty seconds is an indication the room has a significant cooling load. Such a conclusion cannot be supported by a single sample with the normalized cooling demand equal to one.

In the example above where the first sample is equal to one, using an arithmetic mean for the initial value of the controller output (i.e., $\bar{u}_t=1$), results in a larger estimated cooling demand than would occur if a cooling load resulted in the maximum normalized cooling demand for sixty consecutive samples and $\bar{u}_t$ was calculated using an EWMA (i.e., $\bar{u}_t=0.95$). Using on-off control during the unoccupied period could create such a scenario. Advantageously, calculating the heating or cooling demand using the EWMA exclusively may produce more accurate results than using the arithmetic mean to initialize the EWMA calculation.

Still referring to FIG. 10, unoccupied state module 54 is shown to include a return time estimator module 68. Return time estimator module 68 may be configured to estimate the return time return time $\hat{\tau}$ required to raise or lower $T_{zone}$ to be within the occupied setpoint range (i.e., $T_{h,set} \leq T_{zone} \leq T_{c,set}$). In some embodiments, return time estimator module 68 uses an empirical model to estimate the return time $\hat{\tau}$. The empirical model may be any type of model (e.g., a parametric model, a regression model, a neural network model, a state space model, a fuzzy logic model, etc.) and may include one or more empirical model parameters. The empirical model parameters may be learned from previous data (e.g., previous measurements of the actual return time $\tau$, etc.) and the estimated return time $\hat{\tau}$ may be a function of the one or more learned model parameters.

In some embodiments, return time estimator module 68 uses the same empirical model to estimate both the heating return time $\hat{\tau}_h$ (i.e., the time required to raise to the occupied heating setpoint $T_{h,set}$) and the cooling return time $\hat{\tau}_c$ (i.e., the time required to lower $T_{zone}$ to the occupied cooling setpoint $T_{c,set}$). In other embodiments, return time estimator module 68 uses different empirical models to estimate $\hat{\tau}_h$ and $\hat{\tau}_c$.

Return time estimator module 68 may estimate the cooling return time $\hat{\tau}_c$ using the equation $$\hat{\tau}_c = w_{c,1}(T_{zone} - T_{c,set}) + w_{c,2}\bar{u}_c$$

where $\bar{u}_c$ is an indication of the cooling demand for building zone 40 based on the controller output signal $u_t$ during unoccupied state 402 (e.g., an EWMA of the controller output signal) and where $w_{c,1}$ and $w_{c,2}$ are empirical parameters learned from previous data. The indication of the cooling demand $\bar{u}_c$ for building zone 40 may be calculated by occupied demand module 66 and stored in parameter module 62. The empirical model parameters $w_{c,1}$ and $w_{c,2}$ may be determined by parameter module 62, described in greater detail with reference to FIG. 13. The estimated cooling return time $\hat{\tau}$ may be a function of the empirical model parameters $w_{c,1}$ and $w_{c,2}$, the difference between the current temperature of the building zone and the occupied cooling setpoint (i.e., $T_{zone}-T_{c,set}$), and the cooling demand $\bar{u}_c$ for building zone 40 during unoccupied state 402. Return time estimator module 68 may store the estimated cooling return time $\hat{\tau}_c$ in parameter module 62.

Return time estimator module 68 may estimate the heating return time $\hat{\tau}_h$ using the equation $$\hat{\tau}_h = w_{h,1}(T_{h,set} - T_{zone})^3 + w_{h,2}\bar{u}_h$$

where $\bar{u}_h$ is an indication of the heating demand for building zone 40 based on the controller output signal $u_t$ during unoccupied state 402 (e.g., an EWMA of the controller output signal) and where $w_{h,1}$ and $w_{h,2}$ are empirical parameters learned from previous data. The indication of the heating demand $\bar{u}_h$ for building zone 40 may be calculated by occupied demand module 66 and stored in parameter module 62. The empirical model parameters $w_{h,1}$ and $w_{h,2}$ may be determined by parameter module 62, described in greater detail with reference to FIG. 13. The estimated heating return time $\hat{\tau}_h$ may be a function of the empirical model parameters $w_{h,1}$ and $w_{h,2}$, the cube of the difference between the occupied heating setpoint and the current temperature of the building zone (i.e., $(T_{h,set}-T_{zone})^3$), and the heating demand $\bar{u}_h$ for building zone 40 during unoccupied state 402. In some embodiments, the estimated heating return time $\hat{\tau}_h$ is a function of the cube of the difference between the occupied heating setpoint and the current temperature of the building zone $(T_{h,set}-T_{zone})^3$ whereas the estimated cooling return time $\hat{\tau}_c$ is a function of the non-cubed difference between the current temperature of the building zone and the occupied cooling setpoint ($T_{zone}-T_{c,set}$). Return time estimator module 68 may store the estimated heating return time $\hat{\tau}_h$ in parameter module 62.

Still referring to FIG. 10, unoccupied state module 54 is shown to include a return time corrector module 70. Return time corrector module 70 may correct the estimated return time $\hat{\tau}$ to generate a corrected return time $\tau_{start}$. Return time corrector module 70 may determine the corrected return time $\tau_{start}$ using the estimated return time $\hat{\tau}$ and an estimated deviation $\hat{\sigma}$ of the return time prediction error e. Prediction error e may be the absolute value of the difference between actual return time $\tau$ and estimated return time $\hat{\tau}$ (i.e., $e=|\hat{\tau}-\tau|$). For example, return time corrector module 70 may use the equation $$\tau_{start} = \hat{\tau} + n\hat{\sigma}$$

to calculate the corrected return time $\tau_{start}$. The estimated return time $\hat{\tau}$ may be the estimated heating return time $\hat{\tau}_h$ or the estimated cooling return time $\hat{\tau}_c$ determined by return time estimator module 68. Return time corrector module 70 may retrieve $\hat{\tau}_h$ and/or $\hat{\tau}_c$ from parameter module 62 for use in calculating $\tau_{start}$.

Return time corrector module 70 may estimate the deviation $\hat{\sigma}$ of the return time prediction error e using the difference between a previously-estimated return time $\hat{\tau}_d$ (e.g., an estimated return time for a previous day) and an actual return time $\tau_d$ (e.g., the actual return time for the previous day). In unoccupied state 402, the estimated return time $\hat{\tau}_d$ may be based on the temperature difference between the current temperature and the applicable setpoint temperature. In some embodiments, the deviation $\hat{\sigma}$ of the return time prediction error e is a standard deviation of an average prediction error $\overline{\Delta}_d$. For example, $\hat{\sigma}$ may be calculated using the equation $$\hat{\sigma} = \Delta_d \sqrt{\frac{2}{\pi}} \cong 1.25\Delta_d$$

where $\overline{\Delta}_d$ is an average (e.g., an arithmetic mean, an EWMA, etc.) of one or more prediction errors e. In other embodiments, $\hat{\sigma}$ may be any other deviation metric of the average prediction error $\overline{\Delta}_d$ (e.g., a variance, covariance, or other function or transformation of $\overline{\Delta}_d$ other than the standard deviation). Average prediction error $\overline{\Delta}$ may be calculated by cool down state module 56 and/or warm up state module 58, described in greater detail with reference to FIGS. 11-12.

Return time corrector module 70 may calculate the corrected return time $\tau_{start}$ by adding a multiple n of the estimated deviation $\hat{\sigma}$ to the estimated return time $\hat{\tau}$ (i.e., $\tau_{start}=\hat{\tau}+n\hat{\sigma}$). Advantageously, the value of the multiplier n can be adjusted (e.g., automatically, by a user, etc.) to increase or decrease the probability that the zone temperature will be within the occupied temperature setpoints at the time of occupancy. Higher values for n increase the probability of achieving the occupied setpoint temperature, but may result in a greater energy cost. For example, assuming that return time prediction errors are normally distributed, it is 50% likely that the occupied setpoint temperature will be achieved at the time of occupancy with a value of n=0. However, the likelihood that the occupied setpoint temperature will be achieved increases to 80% at n=0.842. The following table shows the probability of achieving the setpoint temperature at the time of occupancy for various values of n.

| Probability | n |
|---|---|
| 50% | 0.000 |
| 80% | 0.842 |
| 95% | 1.645 |
| 99% | 2.326 |
| 99.9% | 3.090 |

In some embodiments, return time corrector module 70 is configured to receive a user selection between a level of comfort and a level of energy savings for building zone 40. The user selection may be received via a user interface (e.g., a switch, a dial, a button, a slider, a touch sensitive panel, etc.) in communication with controller 30 and/or received electronically via communications interface 32. For example, the user interface may include a slider or switch movable between a "comfort" position and an "energy savings" position. A user may move the slider or switch between the two positions to adjust the probability of achieving the occupied setpoint temperature at the time of occupancy. The "comfort" position may correspond to higher values of n and a greater probability of achieving the setpoint temperature at the time of occupancy. The "energy savings" position may correspond to lower values of n and a lower probability of achieving the setpoint temperature at the time of occupancy. In other embodiments, a user may specify the desired probability (e.g., using a keyboard or other data entry device) and/or specify the value of n.

Return time corrector module 70 may be configured to calculate a correction factor based on the user selection. For example, return time corrector module 70 may determine a value for n based on the user input (e.g., based on a position of a user-operable switch or slider). Return time corrector module 70 may adjust the estimated return time $\hat{\tau}$ by applying the correction factor to the estimated return time $\hat{\tau}$. For example, return time corrector module 70 may add the correction factor to the estimated return time as shown above (e.g., $\tau_{start}=\hat{\tau}+n\hat{\sigma}$), multiply the estimated return time by the correction factor, or otherwise adjust the estimated return time using the correction factor. Return time corrector module 70 may store the corrected return time $\tau_{start}$ in parameter module 62.

Still referring to FIG. 10, unoccupied state module 54 is shown to include a return time comparison module 72. Return time comparison module 72 may compare the corrected return time $\tau_{start}$ with the time remaining until the beginning of the next occupied period $T_{next}$. If the corrected return time is greater than or equal to the time remaining until the next occupied period (i.e., $\tau_{start}\geq T_{next}$), return time comparison module 72 may determine that heating or cooling should be started in order to raise or lower $T_{zone}$ to be within the occupied setpoint range by the time of occupancy. If the corrected return time is less than the time remaining until the next occupied period (i.e., $\tau_{start}<T_{next}$), return time comparison module 72 may determine that heating or cooling should not be started until a later time.

Still referring to FIG. 10, unoccupied state module 54 is shown to include a variable update module 74. Variable update module 74 may be configured to update the current state parameter values in parameter module 62. For example, variable update module 74 may set unoccupied state status U to false in response to a determination (e.g., by return time comparison module 72) that heating or cooling should be started. Variable update module 74 may set either cool down state status C or warm up state status W to true, based on whether cooling or heating is required. In other embodiments, state transition module 52 determines whether the corrected return time is greater than or equal to the time remaining until the next occupied period (i.e., $\tau_{start}\geq T_{next}$) based on the values of $\tau_{start}$ and $T_{next}$ stored in parameter module 62 and updates the current state parameter values at the beginning of the next time step.

In some embodiments, variable update module 74 may store one or more variables used to update the empirical model parameters $w_{h,1}$, $w_{h,2}$, $w_{c,1}$ and $w_{c,2}$. Variable update module 74 may store the one or more variables used to update the model parameters if the conditions for transitioning to cool down state 404 or warm up state 406 are satisfied. For example, if return time comparison module 72 determines that $\tau_{start}\geq T_{next}$ variable update module 74 may store the current zone temperature $T_{zone}$ (i.e., the zone temperature at the beginning of either cool down state 404 or warm up state 406), an indication of the heating demand $\overline{u}_h$ during unoccupied state 402, and/or an indication of the cooling demand $\overline{u}_c$ during unoccupied state 402. In some embodiments, variable update module 74 updates the variables used to update $w_{h,1}$ and $w_{h,2}$ upon a transition into warm up state 406 and updates the variables used to update $w_{c,1}$ and $w_{c,2}$ upon a transition into cool down state 404. Variable update module 74 may store the variables used to update the empirical model parameters in parameter module 62.

Figure 11:
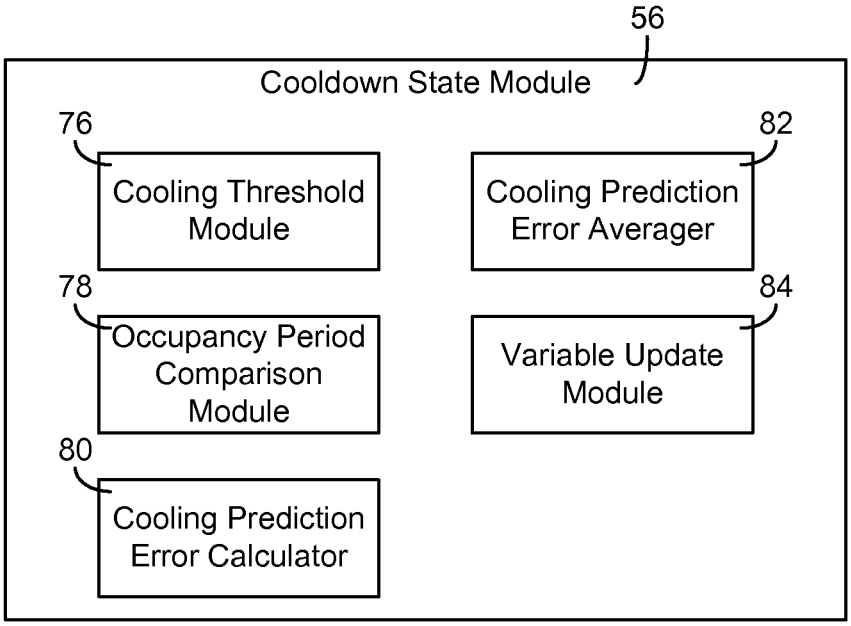
FIG. 11 is a block diagram illustrating the cool down state module of FIG. 3 in greater detail, according to an exemplary embodiment.

Referring now to FIG. 11, a block diagram illustrating cool down state module 56 in greater detail is shown, according to an exemplary embodiment. Cool down state module 56 may control system operation in cool down state 404. Cool down state module 56 may be activated (e.g., triggered, called, run, etc.) in response to a transition into cool down state 404 as described with reference to FIG. 4. Cool down state module 56 may operate HVAC system 12 to lower the zone temperature $T_{zone}$ to the occupied cooling setpoint $T_{c,set}$. Cool down state module 56 is shown to include a cooling threshold module 76, an occupancy period comparison module 78, a cooling prediction error calculator 80, a cooling prediction error averager 82, and a variable update module 84.

Cooling threshold module 76 may monitor the zone temperature $T_{zone}$ during cool down state 404. In some embodiments, cooling threshold module 76 determines whether the zone temperature $T_{zone}$ is less than or equal to the occupied cooling setpoint $T_{c,set}$ plus the temperature offset $\in$ (i.e., $T_{zone} \leq T_{c,set} + \in$). Cooling threshold module 76 may output and/or store an indication that transition condition 424 is satisfied in response to a determination that the zone temperature $T_{zone}$ is less than or equal to the occupied cooling setpoint $T_{c,set}$ plus the temperature offset $\in$.

While operating in cool down state 404, occupancy period comparison module 78 may determine whether the next scheduled occupancy period has begun. Occupancy period comparison module 78 may output and/or store an indication that transition condition 426 is satisfied in response to a determination that the scheduled occupancy period has begun. As described with reference to FIG. 4, satisfying either of transition conditions 424 or 426 may cause a transition from cool down state 404 to normal state 408.

Still referring to FIG. 11, cool down state module 56 is shown to include a cooling prediction error calculator 80. Cooling prediction error calculator 80 may be configured to determine an amount of time spent in cool down state 404. The amount of time spent in cool down state 404 may be determined prior to transitioning into normal state 408. In some embodiments, the amount of time spent in cool down state 404 may be defined by a cool down state start time and a cool down state end time. The cool down state start time may correspond to the time at which cool down state module 56 begins cooling building zone 40 in an attempt to lower the zone temperature $T_{zone}$ to the occupied cooling setpoint $T_{c,set}$. The cool down state end time may correspond to the time at which either of transition conditions 424 or 426 are satisfied. In some embodiments, the amount of time spent in cool down state 404 defines the actual cooling return time $\tau_c$.

Cooling prediction error calculator 80 may determine the cooling prediction error $e_c$ by calculating the difference between the model estimated cooling return time $\hat{\tau}_c$ and the actual cooling return time $\tau_c$ (e.g., $e_c = |\hat{\tau}_c - \tau_c|$). The model estimated cooling return time $\hat{\tau}_c$ may be determined by unoccupied state module 54 as previously described with reference to FIG. 10. In some embodiments, the model estimated cooling return time used by cooling prediction error calculator 80 is calculated differently than the estimated return time determined by unoccupied state module 54. For example, in unoccupied state 402, the estimated return time may be based on the temperature difference between the current temperature and the applicable setpoint temperature. The estimated cooling return time used by cooling prediction error calculator 80 may be based on the temperature difference between the zone temperature at the beginning of cool down state 404 and the zone temperature at the end of cool down state 404.

Still referring to FIG. 11, cool down state module 56 is shown to include a cooling prediction error averager 82. Cooling prediction error averager 82 may calculate an average cooling prediction error $\overline{\Delta}_{c,d}$ using a history of cooling return time prediction errors (e.g., for previous days d). In some embodiments, cooling prediction error averager 82 determines the average cooling prediction error $\overline{\Delta}_{c,d}$ by calculating the EWMA of one or more cooling prediction errors $e_c$. For example, cooling prediction error averager 82 may calculate the average prediction error $\overline{\Delta}_{c,d}$ using the equation $$\overline{\Delta}_{c,d} = \overline{\Delta}_{c,d-1} + \alpha(|\hat{\tau}_{c,d} - \tau_{c,d}| - \overline{\Delta}_{c,d-1})$$

where $\overline{\Delta}_{c,d-1}$ is the previous value of the EWMA from a previous day or time step, $\hat{\tau}_{c,d}$ is an estimate of the return time for a day d (without correction), $\tau_{c,d}$ is the actual return time for the day d, and $\alpha$ is the exponential smoothing constant (e.g., $\alpha$=0.05, $\alpha$=0.2, etc.). The estimated return time $\hat{\tau}_{c,d}$ may be based on the actual temperatures at the beginning and end of cool down state 404.

In some embodiments, cooling prediction error averager 82 does not calculate the average cooling prediction error $\overline{\Delta}_{c,d}$ for the first several return time predictions within an implementation threshold. For example, cooling prediction error averager 82 may not calculate $\overline{\Delta}_{c,d}$ for the first five, ten, or other threshold number of days and/or return time predictions upon first implementation (e.g., the first five days of cooling, etc.). Not calculating $\overline{\Delta}_{c,d}$ for the threshold number of days/predictions in the cooling mode may prevent the EWMA calculation from being biased with large return time prediction errors caused by inaccurate model parameters. After the threshold number of days/predictions has passed, the learned model parameters may be significantly more accurate and $\overline{\Delta}_{c,d}$ can be calculated without biasing the average.

In some embodiments, cooling prediction error averager 82 determines the average prediction error $\overline{\Delta}_{c,d}$ using an arithmetic mean of return time prediction errors e. The arithmetic mean may be calculated using the equation $$\Delta_{c,d} = \Delta_{c,d-1} + \frac{1}{k}(|\hat{\tau}_{c,d} - \tau_{c,d}| - \Delta_{c,d-1})$$

where k is the total number of days/predictions for which $\overline{\Delta}_{c,d}$ has been calculated. In some embodiments, cooling prediction error averager 82 calculates $\overline{\Delta}_{c,d}$ using the arithmetic mean for only the first $$1/\alpha$$

days and/or predictions after the threshold number of days/predictions for which $\overline{\Delta}_{c,d}$ is not calculated. For example, at the beginning of a cooling season (e.g., a one-time event or whenever the memory of cooling prediction averager 82 is cleared), cooling prediction error averager 82 may not calculate $\overline{\Delta}_{c,d}$ for the first five days. Then, after the five day non-calculation period has passed, cooling prediction error averager 82 may calculate $\overline{\Delta}_{c,d}$ using the arithmetic mean method for the next twenty days (e.g., if $\alpha$=0.05). Then, after the twenty day arithmetic mean period has passed, cooling prediction error averager 82 may calculate $\overline{\Delta}_{c,d}$ using the EWMA method. As described above, return time corrector module 70 may use $\overline{\Delta}_{c,d}$ to estimate the deviation $\hat{\sigma}$ for the next cooling return time estimation.

Still referring to FIG. 11, cool down state module 56 is shown to include a variable update module 84. Variable update module 84 may update the current state parameter values in parameter module 62 (e.g., by setting cool down state status C to false and setting normal state status N to true) when the conditions for transitioning into normal state 408 are satisfied. In other embodiments, state transition module 52 determines whether the transition conditions are satisfied and updates the current state parameter values at the beginning of the next time step.

Figure 12:
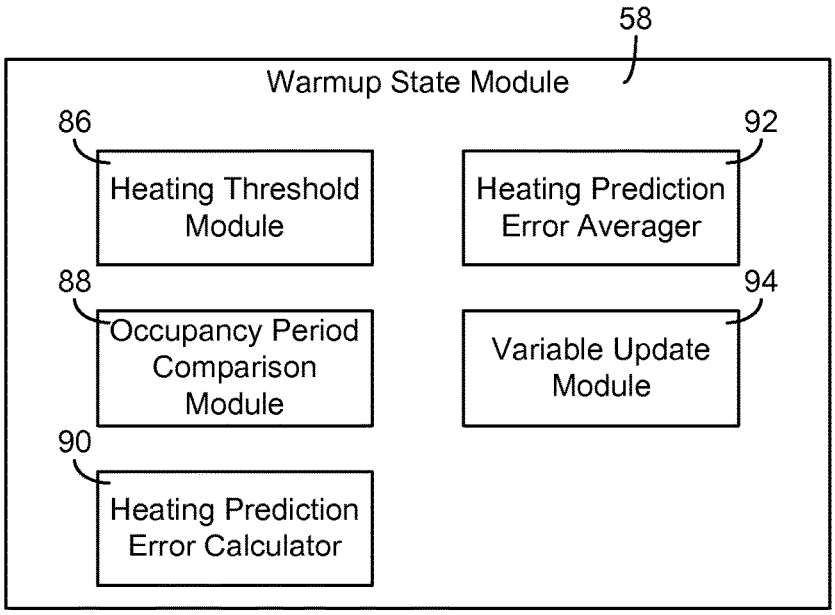
FIG. 12 is a block diagram illustrating the warm up state module of FIG. 3 in greater detail, according to an exemplary embodiment.

Referring now to FIG. 12, a block diagram illustrating warm up state module 58 in greater detail is shown, according to an exemplary embodiment. Warm up state module 58 may control system operation in warm up state 406. Warm up state module 58 may be activated (e.g., triggered, called, run, etc.) in response to a transition into warm up state 406 as described with reference to FIG. 4. Warm up state module 58 may operate HVAC system 12 to raise the zone temperature $T_{zone}$ to the occupied heating setpoint $T_{h,set}$. Warm up state module 58 is shown to include a heating threshold module 86, an occupancy period comparison module 88, a heating prediction error calculator 90, a heating prediction error averager 92, and a variable update module 94.

Heating threshold module 86 may monitor the zone temperature $T_{zone}$ during warm up state 406. In some embodiments, heating threshold module 86 determines whether the zone temperature $T_{zone}$ is greater than or equal to the occupied heating setpoint $T_{h,set}$ minus the temperature offset $\in$ (i.e., $T_{zone} \geq T_{h,set} - \in$). Heating threshold module 86 may output and/or store an indication that transition condition 430 is satisfied in response to a determination that the zone temperature $T_{zone}$ is greater than or equal to the occupied heating setpoint $T_{h,set}$ minus the temperature offset $\in$. As described with reference to FIG. 4, satisfying transition condition 430 may cause a transition from warm up state 406 to normal state 408.

While operating in warm up state 406, occupancy period comparison module 88 may determine whether the next scheduled occupancy period has begun and/or ended. Occupancy period comparison module 88 may output and/or store an indication that transition condition 434 is satisfied in response to a determination that the scheduled occupancy period has both begun and ended. Satisfying transition condition 434 may cause a transition from warm up state 406 to unoccupied state 402.

Still referring to FIG. 12, warm up state module 58 is shown to include a heating prediction error calculator 90. Heating prediction error calculator 90 may be configured to determine an amount of time spent in warm up state 406. The amount of time spent in warm up state 406 may be determined prior to transitioning into normal state 408 and/or unoccupied state 402. In some embodiments, the amount of time spent in warm up state 406 may be defined by a warm up state start time and a warm up state end time. The warm up state start time may correspond to the time at which warm up state module 58 begins heating building zone 40 in an attempt to raise the zone temperature $T_{zone}$ to the occupied heating setpoint $T_{h,set}$. The warm up state end time may correspond to the time at which either of transition conditions 430 or 434 are satisfied. In some embodiments, the amount of time spent in warm up state 406 defines the actual heating return time $\tau_h$.

Heating prediction error calculator 90 may determine the heating prediction error $e_h$ by calculating the difference between the model estimated heating return time $\hat{\tau}_h$ and the actual heating return time $\tau_h$ (e.g., $e_h = |\hat{\tau}_h - \tau_h|$). The model estimated heating return time $\tau_h$ may be determined by unoccupied state module 54 as previously described with reference to FIG. 10. In some embodiments, the model estimated heating return time used by heating prediction error calculator 90 is calculated differently than the estimated return time determined by unoccupied state module 54. For example, in unoccupied state 402, the estimated return time may be based on the temperature difference between the current temperature and the applicable setpoint temperature. The estimated heating return time used by heating prediction error calculator 90 may be based on the temperature difference between the zone temperature at the end of warm up state 406 and the zone temperature at the beginning of warm up state 406.

Still referring to FIG. 12, warm up state module 58 is shown to include a heating prediction error averager 92. Heating prediction error averager 92 may calculate an average heating prediction error $\overline{\Delta}_{h,d}$ using a history of heating return time prediction errors (e.g., for previous days d). In some embodiments, heating prediction error averager 92 determines the average heating prediction error $\overline{\Delta}_{h,d}$ by calculating the EWMA of one or more heating prediction errors $e_h$. For example, heating prediction error averager 92 may calculate the average heating prediction error $\overline{\Delta}_{h,d}$ using the equation $$\overline{\Delta}_{h,d} = \overline{\Delta}_{h,d-1} + \alpha(|\hat{\tau}_{h,d} - \tau_{h,d}| - \overline{\Delta}_{h,d-1})$$

where $\overline{\Delta}_{h,d-1}$ is the previous value of the EWMA from a previous day or time step, $\hat{\tau}_{h,d}$ is an estimate of the return time for a day d (without correction), $\tau_{h,d}$ is the actual return time for the day d, and $\alpha$ is the exponential smoothing constant (e.g., $\alpha$=0.05, $\alpha$=0.2, etc.). The estimated return time $\hat{\tau}_{h,d}$ may be based on the actual temperatures at the end and beginning of warm up state 406.

In some embodiments, heating prediction error averager 92 does not calculate the average heating prediction error $\overline{\Delta}_{h,d}$ for the first several return time predictions within an implementation threshold. For example, heating prediction error averager 92 may not calculate $\overline{\Delta}_{h,d}$ for the first five, ten, or other threshold number of days and/or return time predictions upon first implementation (e.g., the first five days of heating, etc.). In some embodiments, heating prediction error averager 92 determines the average prediction error $\overline{\Delta}_{h,d}$ using an arithmetic mean of return time prediction errors e. The arithmetic mean may be calculated using the equation $$\Delta_{h,d} = \Delta_{h,d-1} + \frac{1}{k}(|\hat{\tau}_{h,d} - \tau_{h,d}| - \Delta_{h,d-1})$$

where k is the total number of days/predictions for which $\overline{\Delta}_{h,d}$ has been calculated. In some embodiments, heating prediction error averager 92 calculates $\overline{\Delta}_{h,d}$ using the arithmetic mean for only the first $$1/\alpha$$

days and/or predictions after the threshold number of days/predictions for which $\overline{\Delta}_{h,d}$ is not calculated. For example, at the beginning of a heating season (e.g., a one-time event or whenever the memory of heating prediction averager 92 is cleared), heating prediction error averager 92 may not calculate $\overline{\Delta}_{h,d}$ for the first five days. Then, after the five day non-calculation period has passed, heating prediction error averager 92 may calculate $\overline{\Delta}_{h,d}$ using the arithmetic mean method for the next twenty days (e.g., if $\alpha$=0.05). Then, after the twenty day arithmetic mean period has passed, heating prediction error averager 92 may calculate $\overline{\Delta}_{h,d}$ using the EWMA method. As described above, return time corrector module 70 may use $\hat{\Delta}_{h,d}$ to estimate the deviation $\hat{\sigma}$ for the next heating return time estimation.

Still referring to FIG. 12, warm up state module 58 is shown to include a variable update module 94. Variable update module 94 may update the current state parameter values in parameter module 62 by setting warm up state status W to false and setting normal state status N to true when the condition for transitioning into normal state 408 is satisfied (i.e., condition 430). Variable update module 94 may set warm up state status W to false and set unoccupied state status U to true when the condition for transitioning into unoccupied state 402 is satisfied (i.e., condition 434). In other embodiments, state transition module 52 determines whether the transition conditions are satisfied and updates the current state parameter values at the beginning of the next time step.

Figure 13:
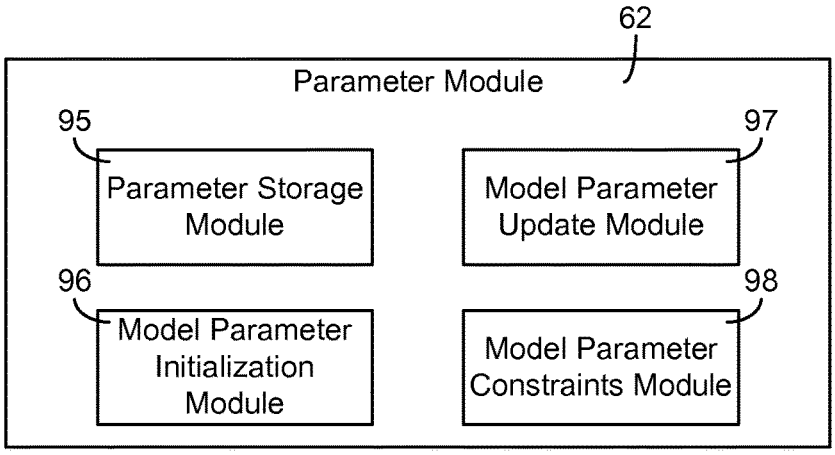
FIG. 13 is a block diagram illustrating the parameter module state module of FIG. 3 in greater detail, according to an exemplary embodiment.

Referring now to FIG. 13, a block diagram illustrating parameter module 62 in greater detail is shown, according to an exemplary embodiment. Parameter module 62 is shown to include a parameter storage module 95, a model parameter initialization module 96, a model parameter update module 97, and a model parameter constraints module 98.

Parameter storage module 95 may be configured to store the various parameters and parameter values used by controller 30 to estimate the return time $\hat{\tau}$ and the corrected estimate of the return time $\tau_{start}$. For example, parameter storage module 95 may be configured to store values for variable inputs such as the occupied temperature setpoints $T_{h,set}$ and $T_{c,set}$ and the unoccupied temperature setpoints $T_{h,set,unocc}$ and $T_{c,set,unocc}$. Parameter storage module 95 may store values for a current occupancy status O (e.g., true or false, based on a stored occupancy schedule), and/or a time to the next occupied period $T_{next}$. The variable inputs may be specified by a user (e.g., heating and cooling setpoints), received from another system or process (e.g., a supervisory controller, another module of controller 30, etc.), or automatically calculated and stored by various modules of controller 30 (e.g., by state transition module 52, unoccupied state module 54, cool down state module 56, warm up state module 58, etc.).

Parameter storage module 95 may store one or more persistent variables that are calculated and/or set by various modules of controller 30. Persistent variables may include, for example, a previous occupancy status $O_{prev}$ (e.g., true or false, based on an occupancy schedule) and one or more variables indicating the current operating state (e.g., unoccupied state status U, the cool down state status C, the warm up state status W, and the normal state status N). Unoccupied state module 54 may determine a corrected estimate of the time $\tau_{start}$ required to cool down or warm up building zone 40. In various embodiments, the corrected estimate $\tau_{start}$ may be stored in parameter storage module 95 or used without storing $\tau_{start}$ along with the persistent variables.

Still referring to FIG. 13, parameter module 62 is shown to include a model parameter initialization module 96. Model parameter initialization module 96 may be configured to initialize values for the one or more learned model parameters $w_{c,1}$, $w_{c,2}$, $w_{h,1}$, and $w_{h,2}$ (e.g., to provide default parameters for the empirical model). In some embodiments, model parameter initialization module 96 initializes at least one of the model parameters to a non-zero value.

Model parameter initialization module 96 may initialize $w_{c,1}$ by assuming that the cooling return time $\tau_c$ is approximately sixty minutes when the zone temperature $T_{zone}$ is equal to the unoccupied cooling setpoint $T_{c,set,unocc}$. Assuming that $w_{c,2}=0$, the initial value of $w_{c,1}$ can be calculated using the equation $$w_{c,1} = \frac{\tau_c}{T_{zone} - T_{c,set}} = \frac{60 \text{ min}}{T_{c,set,unocc} - T_{c,set}}$$

Model parameter initialization module 96 may initialize $w_{c,2}$ by assuming that the cooling return time $\tau_c$ is approximately six hours (i.e., 360 minutes) if the normalized controller output signal $\overline{u}_c$ is equal to its maximum value of one when cool down state 404 begins. Assuming that $w_{c,1}=0$, the initial value of $w_{c,2}$ can be calculated using the equation $$w_{c,2} = \frac{\tau_c}{\overline{u}_c} = \frac{360}{1} = 360 \text{ min}$$

Model parameter initialization module 96 may initialize the parameters used to predict the heating return time $\tau_h$ in the same manner as the parameters for cooling. For example, model parameter initialization module 96 may initialize $w_{h,1}$ by assuming that the heating return time $\tau_h$ is approximately four hours (i.e., 240 minutes) when the zone temperature $T_{zone}$ is equal to the unoccupied heating setpoint $T_{h,set,unocc}$. Assuming that $w_{h,2}=0$, the initial value of $w_{h,1}$ can be calculated using the equation $$w_{h,1} = \frac{\tau_h}{(T_{h,set} - T_{zone})^3} = \frac{240 \text{ min}}{(T_{h,set} - T_{h,set,unocc})^3}$$

Model parameter initialization module 96 may initialize $w_{h,2}$ by assuming that the heating return time $\tau_h$ is approximately one day (i.e., 1440 minutes) if the normalized controller output signal $\overline{u}_h$ is equal to its maximum value of one when warm up state 406 begins. Assuming that $w_{h,1}=0$, the initial value of $w_{h,2}$ can be calculated using the equation $$w_{h,2} = \frac{\tau_h}{\overline{u}_h} = \frac{1440}{1} = 1440 \text{ min}$$

Still referring to FIG. 13, parameter module 62 is shown to include a model parameter update module 97. Model parameter update module 97 may be configured to update the learned model parameters $w_{c,1}$, $w_{c,2}$, $w_{h,1}$, and $w_{h,2}$ based on previous data.

Model parameter update module 97 may retrieve one or more data values from parameter storage module 95 for use in updating the learned model parameters. For example, model parameter update module 97 may retrieve the previous values of the learned model parameters $w_{c,1,d-1}$, $w_{c,2,d-1}$, $w_{h,1,d-1}$, and $w_{h,2,d-1}$, where the "d−1" subscript denotes a model parameter value from a previous time step (e.g., the previous day). Model parameter update module 97 may retrieve one or more of temperature values $T_{zone,1,c}$ and $T_{zone,1,h}$ corresponding to the zone temperature at the beginning of the most recent cool down state 404 and the most recent warm up state 406, respectively. Model parameter update module 97 may retrieve one or more of temperature values $T_{zone,2,c}$ and $T_{zone,2,h}$ corresponding to the zone temperature at the end of the most recent cool down state 404 and the most recent warm up state 406, respectively. Model parameter update module 97 may retrieve one or more of $\bar{u}_c$ and $\bar{u}_h$ indicating the cooling demand and heating demand, respectively, of building zone 40 during the most recent unoccupied state 402. Model parameter update module 97 may retrieve the most recent measurement of the actual return time $\tau$ (e.g., stored by cool down module 56 and/or warm up module 58). In some embodiments, model parameter update module 97 also retrieves a regressor matrix P, described in greater detail below.

In some embodiments, model parameter update module 97 updates the model parameters in response to zone temperature $T_{zone}$ being less than the heating setpoint minus the temperature offset (i.e., $T_{zone}<T_{h,set}-\in$) at the beginning of warm up state 406 or greater than the cooling setpoint plus the temperature offset (i.e., $T_{zone}>T_{c,set}+\in$) at the beginning of cool down state 404.

In some embodiments, model parameter update module 97 uses a regression algorithm (e.g., a partial least squares regression, ridge regression, principal component regression, weighted least squares regression, ordinary least squares regression, least mean linear regression, exponentially weighted regularized least squares regression, etc.) to update the learned model parameters based on the data values retrieved from parameter storage module 95. For example, an exponentially weighted regularized least squares (EWRLS) regression process can be carried out using the following equations:

$$\gamma = \frac{1}{1+\lambda^{-1}uP_{d-1}u^T}$$

$$g = \lambda^{-1}P_{d-1}u^T\gamma$$

$$e = \tau - uw_{d-1}$$

$$w_d = w_{d-1} + g_e$$

$$p_d = \lambda^{-1}P_{d-1} - \frac{gg^T}{\gamma}$$

where $\tau$ is the most recent measurement of the actual return time, $\lambda$ is a forgetting factor (e.g., $\lambda=1$, $\lambda=0.98$, etc.), u is a vector of current inputs, $w_{d-1}$ is a vector of previous parameter weights, and $P_{d-1}$ is a matrix that summarizes previous regressor information. The values for $w_{d-1}$ and $P_{d-1}$ are determined during a previous iteration of the regression process (e.g., the previous day). The vector u is given by $$u=[u_1\ u_2]$$

the vector of previous parameter weights $w_{d-1}$ is given by $$w_{d-1} = \begin{bmatrix} w_{1,d-1} \\ w_{2,d-1} \end{bmatrix}$$

and the matrix $P_{d-1}$ is given by $$P_{d-1} = \begin{bmatrix} P_{11,d-1} & P_{12,d-1} \\ P_{21,d-1} & P_{22,d-1} \end{bmatrix}$$

Using the equations above, the prediction error e can be determined using the equation $$e=\tau-(u_1w_{1,d-1}+u_2w_{2,d-1})$$

and the expressions for determining the updated parameter weights $w_d$ and the regressor matrix $P_d$ can be expanded to yield $$w_{1,d} = w_{1,d-1} + \frac{(P_{12,d}u_2 + P_{11,d-1}u_1)e}{P_{22,d-1}u_2^2 + 2P_{12,d-1}u_1u_2 + P_{11,d-1}u_1^2 + \lambda}$$

$$w_{2,d} = w_{2,d-1} + \frac{(P_{22,d-1}u_2 + P_{12,d-1}u_1)e}{P_{22,d-1}u_2^2 + 2P_{12,d-1}u_1u_2 + P_{11,d-1}u_1^2 + \lambda}$$

$$P_{11,d} = \frac{(P_{11,d-1}P_{22,d-1} - P_{12,d-1}^2)u_2^2 + P_{11,d-1}\lambda}{\lambda(P_{22,d-1}u_2^2 + 2P_{12,d-1}u_1u_2 + P_{11,d-1}u_1^2 + \lambda)}$$

$$P_{12,d} = \frac{(P_{12,d-1}^2 - P_{11,d-1}P_{22,d-1})u_1u_2 + P_{12,d-1}\lambda}{\lambda(P_{22,d-1}u_2^2 + 2P_{12,d-1}u_1u_2 + P_{11,d-1}u_1^2 + \lambda)}$$

$$P_{21,d} = P_{12,d}$$

$$P_{22,d} = \frac{(P_{11,d-1}P_{22,d-1} - P_{12,d-1}^2)u_1^2 + P_{22,d-1}\lambda}{\lambda(P_{22,d-1}u_2^2 + 2P_{12,d-1}u_1u_2 + P_{11,d-1}u_1^2 + \lambda)}$$

At startup, matrix P can be initialized (e.g., by model parameter initialization module 96) as $$P_0 = \begin{bmatrix} 1\times10^6 & 0 \\ 0 & 1\times10^6 \end{bmatrix}$$

The equations presented above are general and applicable for updating the parameter weights for both cooling and heating. However, vector u may vary based on whether the regression procedure is used to calculate cooling model parameters $w_{c,1}$, $w_{c,2}$ or heating model parameters $w_{h,1}$, $w_{h,2}$. For the cooling model, the input vector u is given by $$u_c=[\delta_c\bar{u}_c]$$

where $\delta_c$ is the zone temperature at the beginning of cool down state 404 minus the zone temperature at the end of cool down state 404 (i.e., $\delta_c=T_{zone,1,c}-T_{zone,2,c}$) and $\bar{u}_c$ indicates the cooling demand of building zone 40 during the most recent unoccupied state 402.

For the heating model, the input vector u is given by $$u_h=[\delta_h{}^3\bar{u}_h]$$

where $\delta_h$ is the zone temperature at the end of warm up state 406 minus the zone temperature at the beginning of warm up state 406 (i.e., $\delta_h=T_{zone,2,h}-T_{zone,1,h}$) and $\bar{u}_h$ indicates the heating demand of building zone 40 during the most recent unoccupied state 402. Model parameter update module 97 may store and/or output updated values for the learned model parameters $w_{c,1}$, $w_{c,2}$, $w_{h,1}$, and $w_{h,2}$ for use (e.g., by return time estimator module 68) in estimating the return time $\hat{\tau}$.

Still referring to FIG. 13, parameter module 62 is shown to include a model parameter constraints module 98. Model parameter constraints module 98 may be configured to determine whether an updated parameter value has a value that violates a constraint condition. The constraint condition may be based on physical realities of the empirical model. For example, in the model $\hat{\tau}_c=w_{c,1}(T_{zone}-T_{c,set})+w_{c,2}\bar{u}_c$, both terms are expected to be greater than zero. For the first term $w_{c,1}(T_{zone}-T_{c,set})$, a greater temperature differential $(T_{zone}-T_{c,set})$ is expected to result in a greater return time $\hat{\tau}_c$. Thus, the value of model parameter $w_{c,1}$ is expected to be non-negative. For the second term $w_{c,2}\bar{u}_c$, a greater value for the zone cooling demand $\bar{u}_c$ is expected to result in a greater return time $\hat{\tau}_c$. Thus, the value of model parameter $w_{c,2}$ is also expected to be non-negative. The same arguments can be made to explain why the parameters $w_{h,1}$ and $w_{h,2}$ are expected to be greater than or equal to zero in the example described above.

In some embodiments, parameter constraints module 98 imposes maximum value constraints on one or more of the learned model parameters. For example, parameter constraints module 98 may impose a maximum value of approximately twelve hours (i.e., 720 minutes) for the parameter $w_{c,2}$ and a maximum value of two days (i.e., 2880 minutes) for the parameter $w_{h,2}$.

If an updated parameter value violates a constraint condition, model parameter constraints module 98 may be configured to replace the parameter value with a value that satisfies the constraint condition. For example, if any of model parameters $w_{c,1}$, $w_{c,2}$, $w_{h,1}$, and $w_{h,2}$ have a negative value, model parameter constraints module 98 may replace the value with a zero value or a positive value. Model parameter constraints module 98 may constrain the model parameters to within expected and/or permissible values after each update of the parameters by model parameter update module 97.

In various embodiments, controller 30 provides several advantages over existing setback controllers. First, controller 30 may predict the return time using only the zone temperature $T_{zone}$ (e.g., measured by a temperature sensor within the zone) and an indication of the cooling or heating demand (e.g., an EWMA of the controller output signal $u_t$). Controller 30 does not rely on a measurement of the outside air temperature and an outside air temperature sensor is not needed to predict the return time. The EWMA of the cooling or heating demand provides an indication of the recent history of the cooling or heating load on the zone and can account for intermittent heating or cooling that is required to keep the room temperature within the bounds of the unoccupied setpoints.

Second, controller 30 is configured to apply a correction term based on an estimate of the deviation of the prediction error. The correction term can include a multiplier for the deviation of the prediction error, with larger values of the multiplier yielding higher probabilities that comfort is satisfied at occupancy. The multiplier can be adjusted (e.g., by a user) to switch between energy efficiency (at relatively lower multiplier values) and comfort (at relatively higher multiplier values).

Another distinguishing feature of controller 30 is the difference between cool down state 404 and warm up state 406. Cool down state 404 may end at the beginning of an occupied period because the loads during the occupied period would tend to lengthen the return time and potentially result in unrealistically large parameter weights. The large parameter weights could potentially lead to an over-prediction of the return time and subsequent energy waste. However, warm up state 406 may extend into an occupied period because the loads during the occupied period will tend to reduce the return time. Such a reduction in the return time could contribute to under-predicting the return times for heating. However, the correction term can help mitigate this effect.

In both the cool down state 404 and the warm up state 406, an offset from the occupied temperature setpoints may be used to raise the temperature at which cool down state 404 ends by a small amount and to lower the temperature at which warm up state ends by a small amount. The offset may improve the performance of zones with sluggish control (e.g., an overdamped system). Without the offset, the recovery time may include a period of time (perhaps significant in length) during which the zone temperature is nearly equal to the setpoint, but is approaching the setpoint very slowly. Advantageously, the offset may slightly increase the temperature at which controller 30 determines that cool down is complete and slightly decrease the temperature at which controller 30 determines that warm up is complete, thereby reducing or eliminating the effects of a slow asymptotic change in zone temperature near the occupied setpoints.

Figure 14:
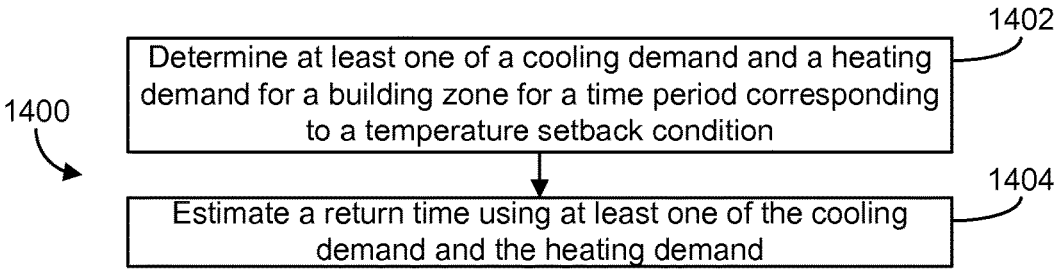
FIG. 14 is a flowchart of a process for estimating a time to cool down or warm up a building zone from a temperature setback condition, according to an exemplary embodiment.

Referring now to FIG. 14, a flow chart of a process 1400 for estimating a time to cool down or warm up a building zone from a temperature setback condition is shown, according to an exemplary embodiment. Process 1400 may be performed by controller 30 and the various modules thereof, as described with reference to FIGS. 3-13.

Process 1400 is shown to include determining at least one of a cooling demand and a heating demand for a building zone for a time period corresponding to a temperature setback condition (step 1402). In some embodiments, step 1402 is performed by unoccupied demand module 66 of controller 30. Step 1402 may include using an output signal $u_t$ from a controller for the building zone (e.g., controller 30) to determine the heating demand or the cooling demand for the building zone. The output signal $u_t$ may be highly correlated to the actual return time $\tau$ and can be used to significantly improve the estimated return time $\hat{\tau}$ relative to traditional return time estimation techniques. The output signal $u_t$ may provide an indication of the recent history of the cooling load or the heating load on the building zone and can account for intermittent heating or cooling that is required to maintain the zone temperature $T_{zone}$ between the unoccupied temperature setpoints $T_{h,set,unocc}$ and $T_{c,set,unocc}$. Advantageously, the output signal $u_t$ may provide a significantly better estimate of the actual heating or cooling load on the building zone than the predictor variables used by traditional return time estimation techniques (e.g., outside air temperature, a difference between $T_{zone}$ and outside air temperature, etc.). Additionally, because output signal $u_t$ is directly available from controller output data, no additional temperature sensors to measure the outside air temperature are required.

In some embodiments, step 1402 includes identifying and using a portion of output signal $u_t$ produced by the zone controller during an unoccupied state (e.g., unoccupied state 402) to determine the heating or cooling demand for the building zone. Step 1402 may include filtering the controller output signal $u_t$ (e.g., using a signal filter) to determine at least one of the cooling demand and the heating demand. For example, the heating or cooling demand may be a function of output signal $u_t$. In various embodiments, the signal filter may be at least one of an analog filter, a digital filter, a low pass filter, a band pass filter, a smoothing filter, a time window filter, a normalizing filter, and an averaging filter. The function of output signal $u_t$ may be at least one of a last value of $u_t$, an average of $u_t$, a normalized value of $u_t$, an integral of $u_t$, and a transformation $u_t$. Step 1402 may include determining the heating or cooling demand from control signal $u_t$ using any type and/or combination of filters, functions, transformations, or operations in addition to or in place of the exemplary filters and functions listed above.

In one embodiment, step 1402 includes determining the unoccupied heating or cooling demand by calculating an exponentially weighted moving average (EWMA) of the controller output signal $u_t$. Step 1402 may include calculating the EWMA for at least a portion of control signal $u_t$ during the unoccupied state. In some embodiments, step 1402 includes normalizing the control signal $u_t$. For example, step 1402 may include calculating a normalized control signal by dividing control signal $u_t$ by a controller output $u_{max}$ that provides maximum cooling or maximum heating for the building zone. The EWMA of the normalized controller output can be calculated using the following equation:

$$\bar{u}_t = \bar{u}_{t-1} + \alpha\left(\frac{u_t}{u_{max}} - \bar{u}_{t-1}\right)$$

where $u_t$ is the controller output at time t, $u_{max}$ is the controller output that provides maximum heating or cooling, $\bar{u}_{t-1}$ is the value of the EWMA at the previous sampling time, and $\alpha$ is a smoothing constant. The value of $\alpha$ can be selected by a user, retrieved from memory, or automatically determined by another process or module. In some embodiments, $\alpha$ is set to a value of approximately 0.05. The value for $\alpha$ can be adjusted to give greater or lesser significance to previous EWMA values.

In some embodiments, the initial value for $\bar{u}_t$ may be reset to zero each time the controller transitions into the unoccupied state. Resetting $\bar{u}_t$ upon each transition into the unoccupied state may help ensure that the heating or cooling demand calculated in step 1402 is an accurate representation of the actual demand during the unoccupied state. In some embodiments, step 1402 includes waiting to update $\bar{u}_t$ for a predetermined time period (e.g., ten minutes, one hour, two hours, etc.) after the unoccupied state begins. The average demand may not be updated and may remain at zero during the predetermined time period. By not updating $\bar{u}_t$ during the predetermined time period in step 1402, the controller can prevent the calculated heating or cooling demand from being dependent on the heating or cooling loads during an occupied time period prior to the beginning of the unoccupied state.

Still referring to FIG. 14, process 1400 is shown to include estimating a return time using at least one of the cooling demand and the heating demand (step 1404). The estimated return time may be the time to cool down or warm up the building zone from the temperature setback condition. In some embodiments, step 1404 is performed by return time estimator module 68 of controller 30.

In some embodiments, step 1402 includes using an empirical model to estimate the return time $\hat{\tau}$. The empirical model may be any type of model (e.g., a parametric model, a regression model, a neural network model, a state space model, a fuzzy logic model, etc.) and may include one or more empirical model parameters. The empirical model parameters may be learned from previous data (e.g., previous measurements of the actual return time $\tau$, etc.) and the estimated return time $\hat{\tau}$ may be a function of the one or more learned model parameters.

In some embodiments, step 1404 includes using the same empirical model to estimate both the heating return time $\hat{\tau}_h$ (i.e., the time required to raise $T_{zone}$ to the occupied heating setpoint $T_{h,set}$) and the cooling return time $\hat{\tau}_c$ (i.e., the time required to lower $T_{zone}$ to the occupied cooling setpoint $T_{c,set}$). In other embodiments, different empirical models may be used to estimate $\hat{\tau}_h$ and $\hat{\tau}_c$.

In some embodiments, step 1404 includes estimating the cooling return time $\hat{\tau}_c$ using the equation $$\hat{\tau}_c = w_{c,1}(T_{zone} - T_{c,set}) + w_{c,2}\bar{u}_c$$

where $\bar{u}_c$ is an indication of the cooling demand for the building zone based on the controller output signal $u_t$ during the unoccupied state (e.g., an EWMA of the controller output signal) and where $w_{c,1}$ and $w_{c,2}$ are empirical parameters learned from previous data. The indication of the cooling demand $\bar{u}_c$ for the building zone may be calculated in step 1402. The empirical model parameters $w_{c,1}$ and $w_{c,2}$ may be determined by parameter module 62, as described with reference to FIG. 13. The estimated cooling return time $\hat{\tau}_c$ may be a function of the empirical model parameters $w_{c,1}$ and $w_{c,2}$, the difference between the current temperature of the building zone and the occupied cooling setpoint (i.e., $T_{zone} - T_{c,set}$), and the cooling demand $\bar{u}_c$ for the building zone during the unoccupied state.

In some embodiments, step 1404 includes estimating the heating return time $\hat{\tau}_h$ using the equation $$\hat{\tau}_h = w_{h,1}(T_{h,set} - T_{zone})^3 + w_{h,2}\bar{u}_h$$

where $\bar{u}_h$ is an indication of the heating demand for the building zone based on the controller output signal $u_t$ during the unoccupied state (e.g., an EWMA of the controller output signal) and where $w_{h,1}$ and $w_{h,2}$ are empirical parameters learned from previous data. The indication of the heating demand $\bar{u}_h$ for the building zone may be calculated in step 1402. The empirical model parameters $w_{h,1}$ and $w_{h,2}$ may be determined by parameter module 62, as described with reference to FIG. 13. The estimated heating return time $\hat{\tau}_h$ may be a function of the empirical model parameters $w_{h,1}$ and $w_{h,2}$, the cube of the difference between the occupied heating setpoint and the current temperature of the building zone (i.e., $(T_{h,set} - T_{zone})^3$), and the heating demand $\bar{u}_h$ for the building zone during the unoccupied state. In some embodiments, the estimated heating return time $\hat{\tau}_h$ is a function of the cube of difference between the occupied heating setpoint and the current temperature of the building zone $(T_{h,set} - T_{zone})^3$ whereas the estimated cooling return time $\hat{\tau}_c$ is a function of the non-cubed difference between the current temperature of the building zone and the occupied cooling setpoint $(T_{zone} - T_{c,set})$. In some embodiments, step 1402 includes storing the estimated return time (e.g., in a data storage device) and/or outputting the estimated return time (e.g., via a data communications interface, to a user via a user interface device such as an electronic display, etc.).

Referring now to FIG. 15, a flowchart of a process 1500 for controlling a HVAC system in an unoccupied state is shown, according to an exemplary embodiment. Process 1500 may be performed by controller 30 and the various modules thereof, as described with reference to FIGS. 3-13. In some embodiments, process 1500 is performed by unoccupied state module 54 to control HVAC system 12 in unoccupied state 402.

Process 1500 is shown to include starting the unoccupied state (step 1502). Step 1502 may correspond to a transition into the unoccupied state and may be performed in response to satisfying one or more conditions for transitioning into the unoccupied state. For example, step 1502 may be performed in response to a determination (e.g., by controller 30) that an occupied period has ended based on a current occupancy schedule.

Still referring to FIG. 15, process 1500 is shown to include determining whether a scheduled occupancy period has begun (step 1504). Step 1504 may be performed in the unoccupied state to determine whether to transition into the normal state. If a scheduled occupancy period has begun, process 1500 may include setting the normal state to active and setting the unoccupied state to inactive (step 1506). Step 1506 may include updating the unoccupied state status variable U (e.g., setting U=false) and the normal state status variable N (e.g., setting N=true) in parameter module 62. Upon setting the normal state to active and setting the unoccupied state to inactive, process 1500 may end (step 1508). At the beginning of the next time step, state transition module 52 may read the updated state status variables and transition the system into the normal operating state.

Still referring to FIG. 15, process 1500 is shown to include determining whether the zone temperature $T_{zone}$ is greater than the occupied cooling setpoint $T_{c,set}$ (step 1510) and determining whether the zone temperature $T_{zone}$ is less than the occupied heating setpoint $T_{h,set}$(step 1512). Steps 1510 and 1512 may be performed in response to a determination in step 1504 that the scheduled occupancy period has not yet begun. In some embodiments, steps 1510 and 1512 are performed sequentially (e.g., step 1510 and then step 1512, step 1512 and then step 1510, etc.). In other embodiments, steps 1510 and 1512 may be performed concurrently and/or in any order relative to each other.

If the zone temperature $T_{zone}$ is neither greater than the occupied cooling setpoint $T_{c,set}$ nor less than the occupied heating setpoint $T_{h,set}$, process 1500 may include determining that the zone temperature is between the occupied heating and cooling setpoints (i.e., $T_{h,set} \leq T_{zone} \leq T_{c,set}$) (step 1514). If the zone temperature is between the occupied heating and cooling setpoints, it may be unnecessary to heat or cool the building zone to raise or lower the zone temperature $T_{zone}$ to be within the occupied setpoint temperature range. Accordingly, if the zone temperature is between the occupied heating and cooling setpoints (i.e., $T_{h,set} \leq T_{zone} \leq T_{c,set}$), process 1500 may end (step 1516). At the beginning of the next time step, conditions may be reevaluated and process 1500 may be repeated, starting with step 1502.

Still referring to FIG. 15, process 1500 is shown to include calculating the EWMA of the cooling control signal (step 1518). Step 1518 may be performed in response to a determination in step 1510 that the zone temperature is greater than the occupied cooling setpoint (i.e., $T_{zone} > T_{c,set}$). The EWMA of the cooling control signal may represent the cooling demand of the building zone during the unoccupied state. The EWMA of the cooling control signal may be calculated by unoccupied demand module 66 as previously described with reference to FIG. 10. In various embodiments, step 1518 may include using other indications of the zone cooling demand in place of the EWMA of the cooling control signal (e.g., arithmetic mean, last value, low pass filtered value, etc.). Advantageously, the cooling control signal may be highly correlated with the cooling return time and may provide an accurate indication of the time required to lower $T_{zone}$ to the occupied cooling setpoint $T_{c,set}$.

Still referring to FIG. 15, process 1500 is shown to include calculating the estimated cooling return time $\hat{\tau}_c$ (step 1520). Step 1520 may be performed by return time estimator module 68 as previously described with reference to FIG. 10. In some embodiments, step 1520 includes using an empirical model to estimate the cooling return time $\hat{\tau}_c$. The empirical model may be any type of model (e.g., a parametric model, a regression model, a neural network model, a state space model, a fuzzy logic model, etc.) and may include one or more empirical model parameters. The empirical model parameters may be learned from previous data such as previous measurements of the actual cooling return time $\tau_c$.

In some embodiments, step 1520 includes estimating the cooling return time $\hat{\tau}_c$ using the equation $$\hat{\tau}_c = w_{c,1}(T_{zone} - T_{c,set}) + w_{c,2}\bar{u}_c$$

where $\bar{u}_c$ is an indication of the cooling demand for the building zone based on the controller output signal $u_t$ during the unoccupied state (e.g., an EWMA of the controller output signal) and where $w_{c,1}$ and $w_{c,2}$ are empirical parameters learned from previous data. The indication of the cooling demand $\bar{u}_c$ for the building zone may be calculated in step 1518. The empirical model parameters $w_{c,1}$ and $w_{c,2}$ may be determined by parameter module 62, as described with reference to FIG. 13. The estimated cooling return time $\hat{\tau}_c$ may be a function of the empirical model parameters $w_{c,1}$ and $w_{c,2}$, the difference between the current temperature of the building zone and the occupied cooling setpoint (i.e., $T_{zone} - T_{c,set}$), and the cooling demand for the building zone during the unoccupied state.

Still referring to FIG. 15, process 1500 is shown to include calculating a corrected estimate of the return time (step 1522). In some embodiments, step 1522 is performed by return time corrector module 70, as described with reference to FIG. 10. Step 1522 may include calculating a corrected return time $\tau_{start}$ using the estimated cooling return time $\hat{\tau}_c$ and an estimated deviation $\hat{\sigma}$ of the cooling return time prediction error $e_c$. Prediction error $e_c$ may be the absolute value of the difference between estimated cooling return time $\hat{\tau}_c$ and actual cooling return time $\tau_c$ (i.e., $e_c = |\hat{\tau}_c - \tau_c|$).

In some embodiments, step 1522 includes calculating the corrected return time $\tau_{start}$ by adding a multiple n of the estimated deviation $\hat{\sigma}$ to the estimated cooling return time $\hat{\tau}_c$. For example, the equation $$\tau_{start} = \bar{\tau}c + n\bar{\sigma}$$

may be used in step 1522 to calculate the corrected return time $\tau_{start}$. Advantageously, the value of the multiplier n can be adjusted (e.g., automatically, by a user, etc.) to increase or decrease the probability that the zone temperature $T_{zone}$ will be less than or equal to the occupied cooling setpoint $T_{c,set}$ at the time of occupancy. Higher values for n increase the probability of achieving the occupied setpoint temperature, but may result in a greater energy cost. Lower values for n use less energy but decrease the probability of achieving the setpoint temperature at the time of occupancy.

Still referring to FIG. 15, process 1500 is shown to include determining whether the time until occupancy is less than or equal to the corrected return time (step 1524). Step 1524 may be performed by return time comparison module 72 as previously described with reference to FIG. 10. Step 1524 includes comparing the value of $\tau_{start}$ calculated in step 1522 with the time $T_{next}$ until the beginning of the next scheduled occupancy period. $T_{next}$ may be calculated by subtracting the current time from the time of the next scheduled occupancy (e.g., based on a stored occupancy schedule).

If the time until the next occupancy period is less than or equal to the corrected return time (i.e. $T_{next} \leq \tau_{start}$), process 1500 may include setting the cool down state to active and setting the unoccupied state to inactive (step 1526). Step 1526 may include updating the unoccupied state status variable U (e.g., setting U=false) and the cool down state status variable C (e.g., setting C=true) in parameter module 62. Upon setting the cool down state to active and setting the unoccupied state to inactive, process 1500 may end (step 1528). At the beginning of the next time step, state transition module 52 may read the updated state status variables and transition the system into the cool down operating state.

If the time until the next occupancy period is greater than the corrected return time (i.e., $T_{next} > \tau_{start}$), process 1500 may end (step 1528) without setting the cool down state to active or setting the unoccupied state to inactive. Process 1500 may be repeated at the beginning of the next time step so long as the unoccupied state remains active.

Still referring to FIG. 15, process 1500 is shown to include calculating the EWMA of the heating control signal (step 1530). Step 30 may be performed in response to a determination in step 1512 that the zone temperature is less than the occupied heating setpoint (i.e., $T_{zone}<T_{h,set}$). The EWMA of the heating control signal may represent the heating demand of the building zone during the unoccupied state. The EWMA of the heating control signal may be calculated by unoccupied demand module 66 as previously described with reference to FIG. 10. In various embodiments, step 1530 may include using other indications of the zone heating demand in place of the EWMA of the heating control signal (e.g., arithmetic mean, last value, low pass filtered value, etc.). Advantageously, the heating control signal may be highly correlated with the heating return time and may provide an accurate indication of the time required to raise $T_{zone}$ to the occupied heating setpoint $T_{h,set}$.

Still referring to FIG. 15, process 1500 is shown to include calculating the estimated heating return time $\hat{\tau}_h$ (step 1532). Step 1532 may be performed by return time estimator module 68 as previously described with reference to FIG. 10. In some embodiments, step 1532 includes using an empirical model to estimate the heating return time $\hat{\tau}_h$. The empirical model may be any type of model (e.g., a parametric model, a regression model, a neural network model, a state space model, a fuzzy logic model, etc.) and may include one or more empirical model parameters. The empirical model parameters may be learned from previous data such as previous measurements of the actual heating return time $\tau_h$.

In some embodiments, step 1532 includes estimating the heating return time $\hat{\tau}_h$ using the equation $$\hat{\tau}_h=w_{h,1}(T_{h,set}-T_{zone})^3+w_{h,2}\bar{u}_h$$

where $\bar{u}_h$ is an indication of the heating demand for the building zone based on the controller output signal $u_t$ during the unoccupied state (e.g., an EWMA of the controller output signal) and where $w_{h,1}$ and $w_{h,2}$ are empirical parameters learned from previous data. The indication of the heating demand $\bar{u}_h$ for the building zone may be calculated in step 1530. The empirical model parameters $w_{h,1}$ and $w_{h,2}$ may be determined by parameter module 62, as described with reference to FIG. 13. The estimated heating return time $\hat{\tau}_h$ may be a function of the empirical model parameters $w_{h,1}$ and $w_{h,2}$, the cube of the difference between the occupied heating setpoint and the current temperature of the building zone (i.e., $(T_{h,set}-T_{zone})^3$), and the heating demand $\bar{u}_h$ for the building zone during the unoccupied state.

Still referring to FIG. 15, process 1500 is shown to include calculating a corrected estimate of the return time (step 1534). In some embodiments, step 1534 is performed by return time corrector module 70, as described with reference to FIG. 10. Step 1534 may include calculating a corrected return time $\tau_{start}$ using the estimated heating return time $\hat{\tau}_h$ and an estimated deviation $\hat{\sigma}$ of the heating return time prediction error $e_h$. Prediction error $e_h$ may be the absolute value of the difference between estimated heating return time $\hat{\tau}_h$ and actual heating return time $\tau_h$ (i.e., $e_h=|\hat{\tau}_h-\tau_h|$).

In some embodiments, step 1534 includes calculating the corrected return time $\tau_{start}$ by adding a multiple n of the estimated deviation $\hat{\sigma}$ to the estimated heating return time $\hat{\tau}_h$. For example, the equation $$\tau_{start}=\hat{\tau}_h+n\hat{\sigma}$$

may be used in step 1534 to calculate the corrected return time $\tau_{start}$. Advantageously, the value of the multiplier n can be adjusted (e.g., automatically, by a user, etc.) to increase or decrease the probability that the zone temperature $T_{zone}$ will be greater than or equal to the occupied heating setpoint $T_{h,set}$ at the time of occupancy. Higher values for n increase the probability of achieving the occupied setpoint temperature, but may result in a greater energy cost. Lower values for n use less energy but decrease the probability of achieving the setpoint temperature at the time of occupancy.

Still referring to FIG. 15, process 1500 is shown to include determining whether the time until occupancy is less than or equal to the corrected return time (step 1536). Step 1536 may be performed by return time comparison module 72 as previously described with reference to FIG. 10. Step 1536 includes comparing the value of $\tau_{start}$ calculated in step 1534 with the time $T_{next}$ until the beginning of the next scheduled occupancy period. $T_{next}$ may be calculated by subtracting the current time from the time of the next scheduled occupancy (e.g., based on a stored occupancy schedule).

If the time until the next occupancy period is less than or equal to the corrected return time (i.e., $T_{next}\leq\tau_{start}$), process 1500 may include setting the warm up state to active and setting the unoccupied state to inactive (step 1538). Step 1538 may include updating the unoccupied state status variable U (e.g., setting U=false) and the warm up state status variable W (e.g., setting W=true) in parameter module 62. Upon setting the warm up state to active and setting the unoccupied state to inactive, process 1500 may end (step 1540). At the beginning of the next time step, state transition module 52 may read the updated state status variables and transition the system into the warm up operating state.

If the time until the next occupancy period is greater than the corrected return time (i.e., $T_{next}>\tau_{start}$), process 1500 may end (step 1540) without setting the warm up state to active or setting the unoccupied state to inactive. Process 1500 may be repeated at the beginning of the next time step so long as the unoccupied state remains active.

Referring now to FIG. 16, a flowchart of a process 1600 for controlling a HVAC system in a cool down state is shown, according to an exemplary embodiment. Process 1600 may be performed by controller 30 and the various modules thereof, as described with reference to FIGS. 3-13. In some embodiments, process 1600 is performed by cool down state module 56 to control HVAC system 12 in cool down state 404.

Process 1600 is shown to include starting the cool down state (step 1602). Step 1602 may correspond to a transition into the cool down state and may be performed in response to satisfying one or more conditions for transitioning into the cool down state. For example, step 1602 may be performed in response to a determination (e.g., by controller 30) that the current zone temperature is greater than an occupied cooling setpoint (i.e., $T_{zone}>T_{c,set}$) and that the time until the next occupancy period is less than or equal to the estimated cooling return time (i.e., $T_{next}\leq\tau_{start}$).

Still referring to FIG. 16, process 1600 is shown to include determining whether the zone temperature is less than or equal to the occupied cooling setpoint plus a temperature offset (step 1604) and determining whether a scheduled occupancy period has begun (step 1606). In some embodiments, step 1604 is performed by cooling threshold module 76 and step 1606 is performed by occupancy period comparison module 78, as described with reference to FIG. 11. Step 1604 may include monitoring the zone temperature $T_{zone}$ to determine whether the zone temperature $T_{zone}$ is less than or equal to the occupied cooling setpoint $T_{c,set}$ plus the temperature offset $\in$ (i.e., $T_{zone}\leq T_{c,set}+\in$).

Still referring to FIG. 16, process 1600 is shown to include setting the normal state to active and setting the cool down state to inactive (step 1608). Step 1608 may be performed in response to a determination that the zone temperature is less than or equal to the occupied cooling setpoint plus a temperature offset (e.g., in step 1604) and/or that the scheduled occupancy period has begun (e.g., in step 1606). Step 1608 may include updating the cool down state status variable C (e.g., setting C=false) and the normal state status variable N (e.g., setting N=true) in parameter module 62.

If the zone temperature is greater than the occupied cooling setpoint plus the temperature offset and the scheduled occupancy period has not yet begun, process 1600 may end (step 1622) without updating the state status variables. Process 1600 may be repeated at the beginning of the next time step so long as the cool down state remains active.

Still referring to FIG. 16, process 1600 is shown to include calculating an actual cooling return time $\tau_c$ (step 1610). The actual cooling return time $\tau_c$ may be defined by the amount of time spent in the cool down state. In some embodiments, the amount of time spent in the cool down state may be determined by subtracting a cool down state start time from a cool down state end time. The cool down state start time may correspond to the time at which controller 30 begins cooling the building zone in an attempt to lower the zone temperature $T_{zone}$ to the occupied cooling setpoint $T_{c,set}$. The cool down state end time may correspond to the time at which either of the determinations in step 1604 and step 1606 yield a positive result (i.e., the zone temperature is less than or equal to the occupied cooling setpoint plus a temperature offset and/or the scheduled occupancy period has begun).

Still referring to FIG. 16, process 1600 is shown to include calculating a cooling prediction error $e_c$ (step 1612). The cooling prediction error $e_c$ may be determined by calculating the difference between the model estimated cooling return time $\hat{\tau}_c$ and the actual cooling return time $\tau_c$ (e.g., $e_c=|\hat{\tau}_c-\tau_c|$). The model estimated cooling return time $\hat{\tau}_c$ may be determined by unoccupied state module 54 as previously described with reference to FIG. 10. In some embodiments, the model estimated cooling return time used by in step 1612 is calculated differently than the estimated return time determined by unoccupied state module 54. For example, in unoccupied state 402, the estimated return time may be based on the temperature difference between the current temperature and the applicable setpoint temperature. In step 1612, the estimated return time may be based on the temperature difference between the zone temperature at the beginning of cool down state 404 and the zone temperature at the end of cool down state 404.

Process 1600 is shown to further include determining whether the zone temperature at startup is greater than the occupied cooling setpoint plus the temperature offset (step 1614). The zone temperature at startup may be the temperature $T_{zone}$ measured at the beginning of the cool down state (e.g., upon a transition from the unoccupied state to the cool down state).

Still referring to FIG. 16, process 1600 is shown to include calculating an average cooling prediction error (step 1616) and calculating updates for the model parameters (step 1618). Steps 1616 and 1618 may be performed in response to a determination in step 1614 that the zone temperature at startup is greater than the occupied cooling setpoint plus the temperature offset (i.e., $T_{zone}>T_{c,set}+\in$). In some embodiments, steps 1616 and 1618 are performed only if $T_{zone}>T_{c,set}+\in$ at the beginning of the cool down state. In other embodiments, steps 1616 and 1618 may be performed even if $T_{zone}\leq T_{c,set}+\in$ at the beginning of the cool down state.

In some embodiments, step 1616 includes calculating an average cooling prediction error $\overline{\Delta}_{c,d}$ using a history of cooling return time prediction errors (e.g., for previous days d). In some embodiments, step 1616 includes determining the average cooling prediction error $\overline{\Delta}$ by calculating the EWMA of one or more cooling prediction errors $e_c$. For example, step 1616 may include calculating the average prediction error $\overline{\Delta}_{c,d}$ using the equation $$\overline{\Delta}_{c,d}=\overline{\Delta}_{c,d-1}+\alpha(|\hat{\tau}_{c,d}-\tau_{c,d}|-\overline{\Delta}_{c,d-1})$$

where $\overline{\Delta}_{c,d-1}$ is the previous value of the EWMA from a previous day or time step, $\hat{\tau}_{c,d}$ is an estimate of the return time for a day d (without correction), $\tau_{c,d}$ is the actual return time for the day d, and $\alpha$ is the exponential smoothing constant (e.g., $\alpha$=0.05, $\alpha$=0.2, etc.).

In some embodiments, step 1616 includes waiting to calculate the average cooling prediction error $\overline{\Delta}_{c,d}$ for the first several return time predictions within an implementation threshold. For example, $\overline{\Delta}_{c,d}$ may not be calculated for the first five, ten, or other threshold number of days and/or return time predictions upon first implementation (e.g., the first five days of cooling, etc.). Not calculating $\overline{\Delta}_{c,d}$ for the threshold number of days/predictions in the cooling mode may prevent the EWMA calculation from being biased with large return time prediction errors caused by inaccurate model parameters. After the threshold number of days/predictions has passed, the learned model parameters may be significantly more accurate and $\overline{\Delta}_{c,d}$ can be calculated without biasing the average.

In some embodiments, step 1616 includes determining the average prediction error $\overline{\Delta}_{c,d}$ using an arithmetic mean of cooling return time prediction errors $e_c$. The arithmetic mean may be calculated using the equation $$\overline{\Delta}_{c,d}=\overline{\Delta}_{c,d-1}+\frac{1}{k}(|\hat{\tau}_{c,d}-\tau_{c,d}|-\overline{\Delta}_{c,d-1})$$

where k is the total number of days/predictions for which $\overline{\Delta}_{c,d}$ has been calculated. In some embodiments, step 1616 includes calculating $\overline{\Delta}_{c,d}$ using the arithmetic mean for only the first $$1/\alpha$$

days and/or predictions after the threshold number of days/predictions for which $\overline{\Delta}_{c,d}$ is not calculated. For example, at the beginning of a cooling season (e.g., a one-time event or any time the model parameters are reinitialized), $\overline{\Delta}_{c,d}$ may not be calculated for the first five days. Then, after the five day non-calculation period has passed, $\overline{\Delta}_{c,d}$ may be calculated using the arithmetic mean method for the next twenty days (e.g., if $\alpha$=0.05). Then, after the twenty day arithmetic mean period has passed $\overline{\Delta}_{c,d}$ may be calculated using the EWMA method.

Step 1618 may include using a regression algorithm (e.g., a partial least squares regression, ridge regression, principal component regression, weighted least squares regression, ordinary least squares regression, least mean linear regression, exponentially weighted regularized least squares regression, etc.) to update the learned model parameters. For example, an exponentially weighted regularized least squares (EWRLS) regression process can be carried out using the following equations:

$$\gamma = \frac{1}{1 + \lambda^{-1} u P_{d-1} u^T}$$

$$g = \lambda^{-1} P_{d-1} u^T \gamma$$

$$e = \tau - u w_{d-1}$$

$$w_d = w_{d-1} + g_e$$

$$p_d = \lambda^{-1} P_{d-1} - \frac{g g^T}{\gamma}$$

where $\tau$ is the most recent measurement of the actual return time, $\lambda$ is a forgetting factor (e.g., $\lambda=1$, $\lambda=0.98$, etc.), u is a vector of current inputs, $w_{d-1}$ is a vector of previous parameter weights, and $P_{d-1}$ is a matrix that summarizes previous regressor information. The values for $w_{d-1}$ and $P_{d-1}$ are determined during a previous iteration of the regression process (e.g., the previous day).

For the cooling model, the input vector u is given by $$u_c = [\delta_c \bar{u}_c]$$

where $\delta_c$ is the zone temperature at the beginning of cool down state 404 minus the zone temperature at the end of cool down state 404 (i.e., $\delta_c = T_{zone,1,c} - T_{zone,2,c}$) and $\bar{u}_c$ indicates the cooling demand of building zone 40 during the most recent unoccupied state 402.

Still referring to FIG. 16, process 1600 is shown to include resetting heating and cooling input EWMA values and counters to initial values (step 1620) and ending process 1600 (step 1622). Step 1620 may include resetting the history of controller output values used to determine the cooling demand of building zone 40 during the most recent unoccupied state 402. At the beginning of the next time step, the system may transition into the normal state (e.g., if the normal state is set to active in step 1608) or continue in the cool down state (e.g., if step 1608 is not performed).

Referring now to FIG. 17, a flowchart of a process 1700 for controlling a HVAC system in a warm up state is shown, according to an exemplary embodiment. Process 1700 may be performed by controller 30 and the various modules thereof, as described with reference to FIGS. 3-13. In some embodiments, process 1700 is performed by warm up state module 58 to control HVAC system 12 in warm up state 406.

Process 1700 is shown to include starting the warm up state (step 1702). Step 1702 may correspond to a transition into the warm up state and may be performed in response to satisfying one or more conditions for transitioning into the warm up state. For example, step 1702 may be performed in response to a determination (e.g., by controller 30) that the current zone temperature is less than an occupied heating setpoint (i.e., $T_{zone} < T_{h,set}$) and that the time until the next occupancy period is less than or equal to the estimated heating return time (i.e., $T_{next} \leq \tau_{start}$).

Still referring to FIG. 17, process 1700 is shown to include determining whether the zone temperature is greater than or equal to the occupied heating setpoint minus a temperature offset (step 1704) and determining whether a scheduled occupancy period has begun and ended (step 1706). In some embodiments, step 1704 is performed by heating threshold module 86 and step 1706 is performed by occupancy period comparison module 88, as described with reference to FIG. 12. Step 1704 may include monitoring the zone temperature $T_{zone}$ to determine whether the zone temperature $T_{zone}$ is greater than or equal to the occupied heating setpoint $T_{h,set}$ minus the temperature offset $\in$ (i.e., $T_{zone} \geq T_{h,set} - \in$).

Still referring to FIG. 17, process 1700 is shown to include setting the normal state to active and setting the warm up state to inactive (step 1708). Step 1708 may be performed in response to a determination in step 1704 that the zone temperature is greater than or equal to the occupied heating setpoint minus the temperature offset. Step 1708 may include updating the warm up state status variable W (e.g., setting W=false) and the normal state status variable N (e.g., setting N=true) in parameter module 62.

Process 1700 is shown to further include setting the unoccupied state to active and setting the warm up state to inactive (step 1710). Step 1710 may be performed in response to a determination in step 1706 that the scheduled occupancy has begun and ended. Step 1710 may include updating the warm up state status variable W (e.g., setting W=false) and the unoccupied state status variable U (e.g., setting U=true) in parameter module 62. Step 1710 may be performed to transition directly from the warm up state to the unoccupied state without an intermediate transition through the normal state.

If the zone temperature is less than the occupied heating setpoint minus the temperature offset (i.e., 1704=no) and the scheduled occupancy period has not yet begun and ended (i.e., 1706=no), process 1700 may end (step 1724) without updating the state status variables. Process 1700 may be repeated at the beginning of the next time step so long as the warm up state remains active.

Still referring to FIG. 17, process 1700 is shown to include calculating an actual heating return time $\tau_h$ (step 1712). The actual heating return time $\tau_h$ may be defined by the amount of time spent in the warm up state. In some embodiments, the amount of time spent in the warm up state may be determined by subtracting a warm up state start time from a warm up state end time. The warm up state start time may correspond to the time at which controller 30 begins heating the building zone in an attempt to raise the zone temperature $T_{zone}$ to the occupied heating setpoint $T_{h,set}$. The warm up state end time may correspond to the time at which either of the determinations in step 1704 or step 1706 yield a positive result (i.e., the zone temperature is greater than or equal to the occupied heating setpoint minus a temperature offset and/or the scheduled occupancy period has begun and ended).

Still referring to FIG. 17, process 1700 is shown to include calculating a heating prediction error $e_h$ (step 1714). The heating prediction error $e_h$ may be determined by calculating the difference between the actual heating return time $\tau_h$ and the model estimated heating return time $\hat{\tau}_h$ (e.g., $e_h = |\hat{\tau}_h - \tau_h|$). The model estimated heating return time $\tau_h$ may be determined by unoccupied state module 54 as previously described with reference to FIG. 10. In some embodiments, the model estimated heating return time used in step 1714 is calculated differently than the estimated return time determined by unoccupied state module 54. For example, in unoccupied state 402, the estimated return time may be based on the temperature difference between the current temperature and the applicable setpoint temperature. The estimated heating return time used in step 1714 may be based on the temperature difference between the zone temperature at the end of warm up state 406 and the zone temperature at the beginning of warm up state 406.

Process 1700 is shown to further include determining whether the zone temperature at startup is less than the occupied heating setpoint minus the temperature offset (step 1716). The zone temperature at startup may be the temperature $T_{zone}$ measured at the beginning of the warm up state (e.g., upon a transition from the unoccupied state to the warm up state).

Still referring to FIG. 17, process 1700 is shown to include calculating an average heating prediction error (step 1718) and calculating updates for the model parameters (step 1720). Steps 1718 and 1720 may be performed in response to a determination in step 1716 that the zone temperature at startup is less than the occupied heating setpoint minus the temperature offset (i.e., $T_{zone}<T_{h,set}-\in$). In some embodiments, steps 1718 and 1720 are performed only if $T_{zone}<T_{h,set}-\in$ at the beginning of the warm up state. In other embodiments, steps 1718 and 1720 may be performed even if $T_{zone}\geq T_{h,set}-\in$ at the beginning of the warm up state.

In some embodiments, step 1718 includes calculating an average heating prediction error $\overline{\Delta}_{h,d}$ using a history of heating return time prediction errors (e.g., for previous days d). In some embodiments, step 1718 includes determining the average heating prediction error $\overline{\Delta}_{h,d}$ by calculating the EWMA of one or more heating prediction errors $e_h$. For example, step 1718 may include calculating the average prediction error $\overline{\Delta}_{h,d}$ using the equation $$\overline{\Delta}_{h,d}=\overline{\Delta}_{h,d-1}+\alpha(|\hat{\tau}_{h,d}-\tau_{h,d}|-\overline{\Delta}_{h,d-1})$$

where $\overline{\Delta}_{h,d-1}$ is the previous value of the EWMA from a previous day or time step, $\hat{\tau}_{h,d}$ is an estimate of the return time for a day d (without correction), $\tau_{h,d}$ is the actual return time for the day d, and $\alpha$ is the exponential smoothing constant (e.g., $\alpha$=0.05, $\alpha$=0.2, etc.).

In some embodiments, step 1718 includes waiting to calculate the average heating prediction error $\overline{\Delta}_{h,d}$ for the first several return time predictions within an implementation threshold. For example, $\overline{\Delta}_{h,d}$ may not be calculated for the first five, ten, or other threshold number of days and/or return time predictions upon first implementation (e.g., the first five days of heating, etc.). Not calculating $\overline{\Delta}_{h,d}$ for the threshold number of days/predictions in the heating mode may prevent the EWMA calculation from being biased with large return time prediction errors caused by inaccurate model parameters. After the threshold number of days/predictions has passed, the learned model parameters may be significantly more accurate and $\overline{\Delta}_{h,d}$ can be calculated without biasing the average.

In some embodiments, step 1718 includes determining the average prediction error $\overline{\Delta}_{h,d}$ using an arithmetic mean of return time prediction errors e. The arithmetic mean may be calculated using the equation $$\Delta_{h,d}=\Delta_{h,d-1}+\frac{1}{k}(|\hat{\tau}_{h,d}-\tau_{h,d}|-\Delta_{h,d-1})$$

where k is the total number of days/predictions for which $\overline{\Delta}_{h,d}$ has been calculated. In some embodiments, step 1718 includes calculating $\overline{\Delta}_{h,d}$ using the arithmetic mean for only the first $$1/\alpha$$

days and/or predictions after the threshold number of days/predictions for which $\overline{\Delta}_{h,d}$ is not calculated. For example, at the beginning of a heating season (e.g., a one-time event or any time the model parameters are reinitialized), $\overline{\Delta}_{h,d}$ may not be calculated for the first five days. Then, after the five day non-calculation period has passed, $\overline{\Delta}_{h,d}$ may be calculated using the arithmetic mean method for the next twenty days (e.g., if $\alpha$=0.05). Then, after the twenty day arithmetic mean period has passed $\overline{\Delta}_{h,d}$ may be calculated using the EWMA method.

Step 1720 may include using a regression algorithm (e.g., a partial least squares regression, ridge regression, principal component regression, weighted least squares regression, ordinary least squares regression, least mean linear regression, exponentially weighted regularized least squares regression, etc.) to update the learned model parameters. For example, an exponentially weighted regularized least squares (EWRLS) regression process can be carried out using the following equations:

$$\gamma=\frac{1}{1+\lambda^{-1}uP_{d-1}u^T}$$

$$g=\lambda^{-1}P_{d-1}u^T\gamma$$

$$e=\tau-uw_{d-1}$$

$$w_d=w_{d-1}+g_e$$

$$p_d=\lambda^{-1}P_{d-1}-\frac{gg^T}{\gamma}$$

where $\tau$ is the most recent measurement of the actual return time, $\lambda$ is a forgetting factor (e.g., $\lambda$=1, $\lambda$=0.98, etc.), u is a vector of current inputs, $w_{d-1}$ is a vector of previous parameter weights, and $P_{d-1}$ is a matrix that summarizes previous regressor information. The values for $w_{d-1}$ and $P_{d-1}$ are determined during a previous iteration of the regression process (e.g., the previous day).

For the heating model, the input vector u is given by $$u_h=[\delta_h^3\overline{u}_h]$$

where $\delta_h$ is the zone temperature at the end of warm up state 406 minus the zone temperature at the beginning of warm up state 406 (i.e., $\delta_h=T_{zone,2,h}-T_{zone,1,h}$) and $\overline{u}_n$ indicates the heating demand of building zone 40 during the most recent unoccupied state 402.

Still referring to FIG. 17, process 1700 is shown to include resetting heating and cooling input EWMA values and counters to initial values (step 1722) and ending process 1700 (step 1724). Step 1722 may include resetting the history of controller output values used to determine the heating demand of building zone 40 during the most recent unoccupied state 402. At the beginning of the next time step, the system may transition into the normal state (e.g., if the normal state is set to active in step 1708), the unoccupied state (e.g., if the unoccupied state is set to active in step 1710), or continue in the warm up state (e.g., if steps 1708 and 1710 are not performed).

Embodiments of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on one or more computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium may be tangible and non-transitory.

The operations described in this specification can be implemented as operations performed by a data processing apparatus on data stored on one or more computer-readable storage devices or received from other sources.

The term "client or "server" include all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube), LCD (liquid crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an embodiment of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

While this specification contains many specific embodiment details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product embodied on a tangible medium or packaged into multiple such software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain embodiments, multitasking and parallel processing may be advantageous.

What is claimed is:

1. A method for estimating a time to cool down or warm up a building zone from a temperature setback condition, the method comprising:

monitoring an output signal from a controller for the building zone during a time period corresponding to the temperature setback condition, wherein the output signal is provided from the controller to HVAC equipment that [operate] *operates* to cool down or warm up the building zone;

using the output signal from the controller to determine, by the controller for the building zone, at least one of a cooling demand for the building zone and a heating demand for the building zone for the time period corresponding to the temperature setback condition;

estimating a return time using at least one of the cooling demand and the heating demand, wherein the return time is the time to cool down or warm up the building zone from the temperature setback condition;

calculating an estimated deviation of a return time prediction error using a difference between the estimated return time and an actual return time;

calculating a correction factor based on a user selection and the estimated deviation of the return time prediction error, wherein the user selection defines a multiplier for the estimated deviation of the return time prediction error;

using the estimated return time to transition into a cool down state or a warm up state prior to a time of next scheduled occupancy for the building zone; and operating the HVAC equipment to cool down the building zone in the cool down state or warm up the building zone in the warm up state.

2. The method of claim 1, further comprising:

identifying a current temperature of the building zone; and estimating the return time using the current temperature of the building zone and at least one of the cooling demand and the heating demand.

3. The method of claim 1, further comprising:

comparing the estimated return time with a difference between a current time and a time of next scheduled occupancy for the building zone; and transitioning from an unoccupied state into at least one of the cool down state and the warm up state in response to the estimated return time being greater than or equal to the difference between the current time and the time of next scheduled occupancy.

4. The method of claim 1, wherein determining at least one of the cooling demand and the heating demand comprises:

filtering the output signal from the controller using a signal filter to determine at least one of the cooling demand and the heating demand, wherein at least one of the cooling demand and the heating demand is a function of the output signal.

5. The method of claim 4, wherein the signal filter is at least one of: an analog filter, a digital filter, a low pass filter, a band pass filter, a smoothing filter, a time window filter, a normalizing filter, and an averaging filter; and wherein the function of the output signal from the controller is at least one of: a last value of the controller output signal, an average of the controller output signal, a normalized value of the controller output signal, an integral of the controller output signal, and a transformation of the output signal from the controller.

6. The method of claim 4, wherein at least one of the cooling demand and the heating demand is an exponentially weighted moving average based on the output signal from the controller for at least a portion of the time period corresponding to the temperature setback condition.

7. The method of claim 1, wherein determining at least one of the cooling demand and the heating demand comprises:

identifying the output signal from the controller for the building zone for at least a portion of the time period corresponding to the temperature setback condition;

calculating a normalized controller output by comparing the output signal from the controller with a controller output that provides maximum cooling or maximum heating for the building zone; and determining an exponentially weighted moving average of the normalized controller output using the calculated normalized controller output and a normalized controller output for a previous sampling time.

8. The method of claim 1, wherein the return time is estimated using an empirical model having one or more model parameters learned from previous data, wherein the estimated return time is a function of the one or more learned model parameters.

9. The method of claim 8, further comprising:

initializing values for the one or more model parameters to provide default parameters for the empirical model, wherein at least one of the model parameters is initialized to a non-zero value.

10. The method of claim 8, wherein the empirical model is at least one of: a statistical model, a parametric model, a regression model, a neural network model, a state space model, and a fuzzy logic model.

11. The method of claim 1, further comprising:

determining the return time prediction error, wherein the return time prediction error is a difference between the estimated return time and the actual return time;

estimating the deviation of the return time prediction error using a plurality of return time prediction errors; and correcting the estimated return time by adding a function of the estimated deviation to the estimated return time.

12. The method of claim 11, further comprising:

determining the multiplier for the estimated deviation of the return time prediction error, wherein the multiplier is based on a probability of achieving an occupied setpoint temperature at a time of occupancy; and calculating the function of the estimated deviation of the return time prediction error by multiplying the estimated deviation of the return time prediction error by the determined multiplier.

13. The method of claim 1, further comprising:

receiving the user selection between a level of energy savings and a level of comfort for the building zone, wherein the user selection corresponds to a probability of achieving an occupied setpoint temperature at a time of occupancy;

calculating the correction factor based on the user selection; and adjusting the estimated return time by applying the correction factor to the estimated return time.

14. The method of claim 1, further comprising:

comparing a measured temperature of the building zone with an offset temperature setpoint, wherein the offset temperature setpoint is at least one of a heating setpoint minus a temperature offset and a cooling setpoint plus the temperature offset;

updating learned model parameters of an empirical model for estimating the return time in response to at least one of: the measured temperature of the building zone being less than the heating setpoint minus the temperature offset, and the measured temperature of the building zone being greater than the cooling setpoint plus the temperature offset.

15. The method of claim 14, wherein the measured temperature of the building zone that is compared with the offset temperature setpoint is at least one of: a temperature of the building zone measured at a beginning of a warm up period, and a temperature of the building zone measured at a beginning of a cool down period.

16. The method of claim 14, wherein updating the learned model parameters of the empirical model comprises:

calculating updated model parameters using at least one of: partial least squares regression, ridge regression, principal component regression, weighted least squares regression, ordinary least squares regression, least mean linear regression, and exponentially weighted regularized least squares regression.

17. The method of claim 14, further comprising:

determining whether an updated model parameter has a value that violates a constraint condition, wherein the constraint condition is based on [physical realities] *expected values of parameters* of the empirical model; and setting the updated model parameter to a value that satisfies the constraint condition in response to a positive determination.

18. A method for adjusting an estimated time to cool down or warm up a building zone from a temperature setback condition, the method comprising:

receiving a user selection between a level of energy savings and a level of comfort for the building zone;

calculating an estimated deviation of a return time prediction error using a difference between an estimated return time and an actual return time;

calculating a correction factor based on the user selection and the estimated deviation of the return time prediction error, wherein the user selection defines a multiplier for the estimated deviation of the return time prediction error; and adjusting the estimated return time by applying the correction factor to the estimated return time, wherein the return time is the time to cool down or warm up the building zone from the temperature setback condition;

using the adjusted estimated return time to transition into a cool down state or a warm up state prior to a time of next scheduled occupancy for the building zone; and operating HVAC equipment to cool down the building zone in the cool down state or warm up the building zone in the warm up state.

19. The method of claim 18, wherein adjusting the estimated return time comprises:

increasing the estimated return time in response to a user selection of a level of comfort for the building zone; and decreasing the estimated return time in response to a user selection of a level of energy savings for the building zone.

20. The method of claim 18, wherein calculating a correction factor based on the user selection comprises:

identifying a probability of achieving an occupied setpoint temperature at a time of occupancy, the probability corresponding to the user selection; and using the identified probability of achieving the occupied setpoint temperature at the time of occupancy to determine the correction factor.

21. A system for estimating a time to cool down or warm up a building zone from a temperature setback condition, the system comprising:

HVAC equipment that [operate] *operates* to cool down or warm up the building zone; and a controller configured to:

monitor an output signal provided from the controller to the HVAC equipment during a time period corresponding to the temperature setback condition;

use the output signal from the controller to determine at least one of a cooling demand for the building zone and a heating demand for the building zone for the time period corresponding to the temperature setback condition;

estimate a return time using at least one of the cooling demand and the heating demand, wherein the return time is the time to cool down or warm up the building zone from the temperature setback condition;

calculate an estimated deviation of a return time prediction error using a difference between the estimated return time and an actual return time;

calculate a correction factor based on a user selection and the estimated deviation of the return time prediction error, wherein the user selection defines a multiplier for the estimated deviation of the return time prediction error;

use the estimated return time to transition into a cool down state or a warm up state prior to a time of next scheduled occupancy for the building zone; and operate the HVAC equipment to cool down the building zone in the cool down state or warm up the building zone in the warm up state.

*22. A controller for HVAC equipment that operates to cool down or warm up a building zone, the controller comprising:*

*one or more processors; and*

*memory storing instructions that, when executed by the one or more processors, cause the one or more processors to perform operations comprising:*

*monitoring a control signal provided from the controller to the HVAC equipment during a time period corresponding to a temperature setback condition;*

*estimating a return time as a function of one or more values of the control signal provided to the HVAC equipment, wherein the return time is an amount of time required to cool down or warm up the building zone from the temperature setback condition; and*

*adjusting the control signal to cause the HVAC equipment to begin cooling down or warming up the building zone at a start time based on the return time, the start time prior to a time of next scheduled occupancy for the building zone.*

*23. The controller of claim 22, wherein estimating the return time comprises:*

*determining at least one of a cooling demand for the building zone or a heating demand for the building zone as a function of the one or more values of the control signal provided to the HVAC equipment; and*

*estimating the return time based on the cooling demand or the heating demand.*

*24. The controller of claim 23, wherein determining the cooling demand or the heating demand comprises:*

*generating one or more normalized values of the control signal by comparing the one or more values of the control signal to a value of the control signal that provides maximum cooling or maximum heating for the building zone; and*

*calculating an average of the one or more normalized values of the control signal.*

*25. The controller of claim 22, wherein the return time is estimated without requiring a measurement of an outside air temperature.*

*26. The controller of claim 22, wherein the return time is an estimated amount of time required to drive a temperature of the building zone to a temperature setpoint from the temperature setback condition;*

*the operations further comprising determining the start time at which to begin cooling down the building zone or warming up the building zone by subtracting the return time from a time at which the temperature setpoint is to be achieved.*

*27. The controller of claim 22, the operations further comprising:*

*receiving a user selection between a level of comfort and a level of energy savings for the building zone; and*

*adjusting the return time based on the user selection.*

*28. A controller for HVAC equipment that operates to cool down or warm up a building zone, the controller comprising:*

*one or more processors; and*

*memory storing instructions that, when executed by the one or more processors, cause the one or more processors to perform operations comprising:*

*monitoring an output signal provided from the controller to the HVAC equipment during a time period corresponding to a temperature setback condition;*

*using the output signal to determine at least one of a cooling demand for the building zone or a heating demand for the building zone for the time period corresponding to the temperature setback condition;*

*determining a start time at which to begin cooling down the building zone or warming up the building zone using an estimated return time based on the cooling demand or the heating demand; and*

*operating the HVAC equipment to begin cooling down the building zone or warming up the building zone at the start time prior to a time of next scheduled occupancy for the building zone.*

*29. The controller of claim 28, wherein determining the start time comprises:*

*estimating the return time based on the cooling demand or the heating demand, wherein the return time is an amount of time required drive a temperature of the building zone to a temperature setpoint from the temperature setback condition; and*

*calculating the start time by subtracting the return time from a time at which the temperature setpoint is to be achieved.*

*30. The controller of claim 28, wherein the cooling demand or the heating demand is estimated without requiring a measurement of an outside air temperature.*

*31. The controller of claim 28, wherein the cooling demand or the heating demand for the building zone is determined as a function of one or more values of a control signal provided to the HVAC equipment.*

*32. The controller of claim 28, wherein determining the cooling demand or the heating demand comprises:*

*obtaining one or more values a control signal provided to the HVAC equipment during the time period corresponding to the temperature setback condition; and*

*calculating the cooling demand or the heating demand as a function of the one or more values of the control signal.*

*33. The controller of claim 28, the operations further comprising:*

*receiving a user selection between a level of comfort and a level of energy savings for the building zone; and*

*adjusting the start time based on the user selection.*

*34. A controller for HVAC equipment that operates to cool down or warm up a building zone, the controller comprising:*

*one or more processors; and*

*memory storing instructions that, when executed by the one or more processors, cause the one or more processors to perform operations comprising:*

*receiving a user selection between a level of comfort and a level of energy savings for the building zone;*

*adjusting an estimated return time based on the user selection by increasing the estimated return time in response to a user selection of the level of comfort or decreasing the estimated return time in response to a user selection of the level of energy savings, wherein the estimated return time is an estimated amount of time required to drive a temperature of the building zone to a temperature setpoint from a temperature setback condition; and*

*operating the HVAC equipment to begin cooling down the building zone or warming up the building zone at a start time based on the estimated return time.*

*35. The controller of claim 34, wherein the user selection corresponds to a probability that the temperature of the building zone will reach the temperature setpoint at or before a time of occupancy of the building zone.*

*36. The controller of claim 34, the operations further comprising estimating the return time based on at least one of a cooling demand for the building zone or a heating demand for the building zone for a time period corresponding to the temperature setback condition.*

*37. The controller of claim 34, the operations further comprising estimating the return time as a function of one or more values of a control signal provided to the HVAC equipment during a time period corresponding to the temperature setback condition.*

*38. The controller of claim 34, wherein the return time is estimated without requiring a measurement of an outside air temperature.*

*39. The controller of claim 34, the operations further comprising calculating the start time by subtracting the estimated return time from a time at which the temperature setpoint is to be achieved.*

*40. The controller of claim 34, wherein:*

*the time period corresponding to the temperature setback condition is a time period during which the building zone is unoccupied; and*

*the time at which the temperature setpoint is to be achieved is a beginning of a time period during which the building zone is occupied.*

* * * * *